United States Patent
Naqvi et al.

(10) Patent No.: US 10,853,507 B2
(45) Date of Patent: *Dec. 1, 2020

(54) SOFTWARE-BASED SWITCH FOR PROVIDING PRODUCTS AND/OR SERVICES TO USERS WITHOUT COMPROMISING THEIR PRIVACY

(71) Applicant: Sensoriant, Inc., Cedar Knolls, NJ (US)

(72) Inventors: Shamim A. Naqvi, Morristown, NJ (US); Robert F. Raucci, New York, NY (US)

(73) Assignee: Sensoriant, Inc., Cedar Knolls, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/536,614

(22) Filed: Aug. 9, 2019

(65) Prior Publication Data

US 2020/0074090 A1 Mar. 5, 2020

Related U.S. Application Data

(63) Continuation of application No. 15/700,744, filed on Sep. 11, 2017, now Pat. No. 10,380,359, which is a
(Continued)

(51) Int. Cl.
*G06F 21/00* (2013.01)
*G06F 21/60* (2013.01)
(Continued)

(52) U.S. Cl.
CPC ........ *G06F 21/604* (2013.01); *G06F 21/6245* (2013.01); *G06Q 20/027* (2013.01); *G06Q 20/12* (2013.01); *G06Q 20/356* (2013.01); *G07F 9/006* (2013.01); *G07G 1/0009* (2013.01); *H04L 9/08* (2013.01); *H04L 9/0844* (2013.01);
(Continued)

(58) Field of Classification Search
CPC ........... G06F 21/604; G06F 2221/2143; G06F 9/45533; G06F 21/6245; H04L 9/3231; H04L 9/0844; H04L 63/0861; H04L 63/0428; H04L 9/08; H04L 2209/56; H04L 2209/38; G06Q 20/027; G06Q 20/356; G06Q 20/12; G06Q 10/083;
(Continued)

(56) References Cited

U.S. PATENT DOCUMENTS 6,012,144 A 1/2000 Pickett
7,433,832 B1 10/2008 Bezos
(Continued)

FOREIGN PATENT DOCUMENTS

KR 10-2011-0068058 6/2011
KR 10-2014-0010960 1/2014

*Primary Examiner* — Mahfuzur Rahman
(74) *Attorney, Agent, or Firm* — Stuart H. Mayer; Mayer & Williams PC

(57) ABSTRACT

An online service provisioning process is provided during which the service provider's knowledge about the user to whom the service is delivered does not increase. This is accomplished by presenting user attribute information to the service provider as obfuscated objects that can be independently verified and which are privacy preserving.

20 Claims, 43 Drawing Sheets

| Step | Action Taking Entity | Business Entity Visited | Input | Output |
|---|---|---|---|---|
| 1 | Consumer | Payment Processor | Financial Information | Account# |
| 2 | Consumer | LCA | Location | Token-1 |
| 3 | Consumer | Seller | Title, Token-1 | Token-2 |
| 4 | Consumer | Payment Processor | Account#, Token-2 | Token-3 |
| 5 | Consumer | Seller | Token-3 | Token-4 |
| 6 | Consumer | Shipper | Address, Token-4 | Receipt |
| 7 | Shipper | Seller | Token-4 | Delivery |

Related U.S. Application Data continuation-in-part of application No. 15/671,021, filed on Aug. 7, 2017.

(60) Provisional application No. 62/371,403, filed on Aug. 5, 2016, provisional application No. 62/385,515, filed on Sep. 9, 2016.

(51) Int. Cl.

| | | |
|---|---|---|
| *H04L 29/06* | (2006.01) | |
| *H04L 9/08* | (2006.01) | |
| *H04W 12/02* | (2009.01) | |
| *G06Q 20/12* | (2012.01) | |
| *G06F 21/62* | (2013.01) | |
| *G06Q 20/02* | (2012.01) | |
| *G07G 1/00* | (2006.01) | |
| *G06Q 20/34* | (2012.01) | |
| *G07F 9/00* | (2006.01) | |
| *H04L 9/32* | (2006.01) | |
| *H04W 12/00* | (2009.01) | |
| *H04W 12/06* | (2009.01) | |
| *G06F 9/455* | (2018.01) | |
| *G06Q 30/06* | (2012.01) | |
| *G06Q 10/08* | (2012.01) | |

(52) U.S. Cl.
CPC ........ *H04L 9/3231* (2013.01); *H04L 63/0428* (2013.01); *H04L 63/0861* (2013.01); *H04W 12/001* (2019.01); *H04W 12/02* (2013.01); *H04W 12/0608* (2019.01); *G06F 9/45533* (2013.01); *G06F 2221/2143* (2013.01); *G06Q 10/083* (2013.01); *G06Q 30/0635* (2013.01); *H04L 2209/38* (2013.01); *H04L 2209/56* (2013.01)

(58) Field of Classification Search
CPC ... G06Q 30/0635; G07F 9/006; H04W 12/02; H04W 12/06; G07G 1/0009
See application file for complete search history.

(56) References Cited

U.S. PATENT DOCUMENTS

| | | |
|---|---|---|
| 7,661,106 B1 | 2/2010 | Ankireddipally |
| 8,959,510 B2 | 2/2015 | Berrange |
| 9,286,082 B1 | 3/2016 | Hobbs |
| 2003/0055723 A1 | 3/2003 | English |
| 2003/0200202 A1 | 10/2003 | Hsiao et al. |
| 2004/0003247 A1 | 1/2004 | Fraser et al. |
| 2005/0049969 A1 | 3/2005 | Kane |
| 2007/0050635 A1 | 3/2007 | Popp |
| 2007/0245414 A1 | 10/2007 | Chan et al. |
| 2008/0133935 A1 | 6/2008 | Elovici et al. |
| 2008/0170695 A1 | 7/2008 | Adler et al. |
| 2009/0254971 A1 | 10/2009 | Herz |
| 2010/0011431 A1 | 1/2010 | Cynkin et al. |
| 2011/0153838 A1 | 6/2011 | Belkine |
| 2012/0030094 A1 | 2/2012 | Khalil |
| 2012/0042365 A1 | 2/2012 | Shoval |
| 2012/0096271 A1 | 4/2012 | Ramarathinam |
| 2012/0239728 A1 | 9/2012 | Dor et al. |
| 2012/0304172 A1 | 11/2012 | Greifeneder |
| 2013/0198822 A1 | 8/2013 | Hitchcock |
| 2015/0094039 A1* | 4/2015 | Jung ................ H04M 3/42102 455/414.1 |
| 2015/0094040 A1* | 4/2015 | Jung ...................... H04W 8/18 455/414.1 |
| 2015/0094041 A1* | 4/2015 | Jung ................ H04M 3/42229 455/414.1 |
| 2015/0094046 A1* | 4/2015 | Jung ................ H04W 36/0022 455/415 |
| 2015/0094047 A1* | 4/2015 | Jung ...................... H04W 4/16 455/415 |
| 2015/0120674 A1 | 4/2015 | Lavoie |
| 2015/0134537 A1 | 5/2015 | Hammad |
| 2015/0222625 A1 | 8/2015 | Ford |
| 2016/0105290 A1 | 4/2016 | Khalil |

\* cited by examiner

| Step | Action Taking Entity | Business Entity Visited | Input | Output |
|---|---|---|---|---|
| 1 | Consumer | Payment Processor | Financial Information | Account# |
| 2 | Consumer | LCA | Location | Token-1 |
| 3 | Consumer | Seller | Title, Token-1 | Token-2 |
| 4 | Consumer | Payment Processor | Account#, Token-2 | Token-3 |
| 5 | Consumer | Seller | Token-3 | Token-4 |
| 6 | Consumer | Shipper | Address, Token-4 | Receipt |
| 7 | Shipper | Seller | Token-4 | Delivery |

FIG. 1

| Step | Action Taking Entity | Business Entity Visited | Input | Output |
|---|---|---|---|---|
| 1. (Initial Phase only) | Consumer | Payment Processor | Financial Information | Account# |
| 2 | Consumer | LSA | Location | Token-1 |
| 3 | Consumer | Seller | Title, Token-1 | Token-2 |
| 4 | | Payment Processor | Token-2 | Token-3 |
| 5 | | Seller | Token-3 | Token-4 |
| 6 | | Shipper | Address, Token-4 | Receipt |
| 7 | Shipper | Seller | | Delivery |

FIG. 2

| Overall Service Name | Overall Service Description | User Info List | Descriptive Keywords | Address & Name of supplier | Program Name Matching | Search Attributes |
|---|---|---|---|---|---|---|
| Book Seller | Buy Books Online | <User Name, Credit card, Amount, Location, Shipping-address> | <Book Seller, Fiction Leather Bound Books, Best Prices, Privacy of Information> | Supplier-1, Address 1 | Name=Book | <Cheap Books, Best rated books, Bargain Books> |
| Payment-Service | Pay for services | <amount, Account#, Name> | <Pay for purchased items> | Supplier-5 | Name=Payment | <Payment, Private, Payment> |
| Shipment-Service | Items delivery service | <shipping address> | <Bought items delivered to your address> | Supplier-4 | Name=Shipment | <shipment, private shipment> |
| Smart Car Garage | Smart Car Services | <User name, Car license plate, ...> | <Smart Car Services, Oil Change, Best Prices, Porsche Specialist> | Supplier-2, Address 2 | Name=Porsche | <Best deals> |
| Online Lab | Medical Services | <user name, social security number,...> | <Medical Services, Lab Facilities, X-Ray Facilities, Insurance, Payment> | Supplier-3, Address 3 | Name=Cardiologist | <Privacy Preserving, Medical Treatments> |

FIG. 6

| Instruction | Meaning |
|---|---|
| Get | Execute procedure to get information from a sensor device associated with a user device; Execute procedure to get encryption/decryption keys from user device. |
| Ask | Request information from user computing device |
| Input | Read encrypted information from list TL |
| Output | Write name of computer program (identifier) to list PL |
| Token | Write encrypted information to list TL |
| Display | Display service related data on user device |

FIG. 8B

Legend
401, 402 and 403 are components of service 400 of FIG. 13A
200 is user device from FIG. 13A

| 37 | i | 42 | ii | 64 | iii |
|---|---|---|---|---|---|
| 31 | iv | 48 | v | 34 | vi |
| 36 | vii | 47 | viii | 33 | ix |

FIG. 19A i,37 -> 1
ii,42 -> 2
iii,64 -> 3
iv,31 -> 1
v,48 -> 2
vi,34 -> 3
vii,36 -> 1
viii,47 -> 2
ix,33 -> 3

FIG. 19B

| 1 | 2 | 3 |
|---|---|---|
| 2 | 1 | 3 |
| 3 | 2 | 1 |

FIG. 19C

|   |   |   |
|---|---|---|
| 1 | — | 2 |
| — | 3 | — |
| — | 2 | — |

Constraint = sum of each row and column is equal.

FIG. 20A

|   |   |   |
|---|---|---|
| — | 3 | — |
| 1 | 1 | 2 |
| 1 | — | 3 |

FIG. 20B

Legend:
"—" missing cell value

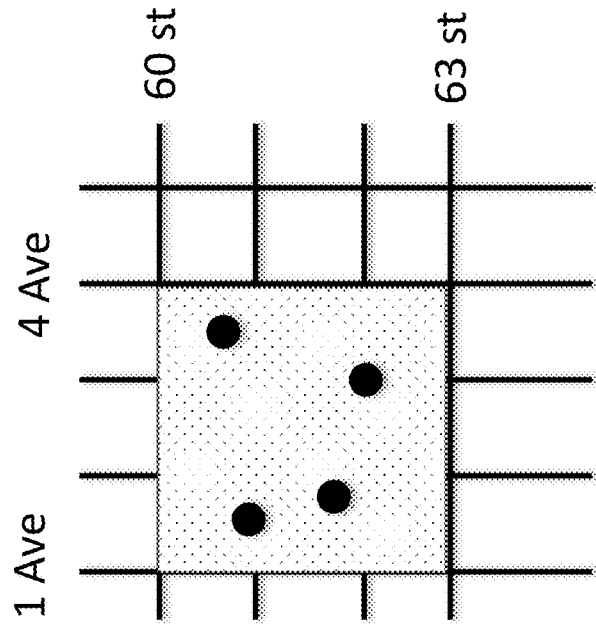

Legend:
User device is located in region bounded by 60 & 63 streets and 1 & 4 Ave.
User device selects the dots.
The dots represent the locations represented in the approximate object. The user device is at one of the dotted locations.

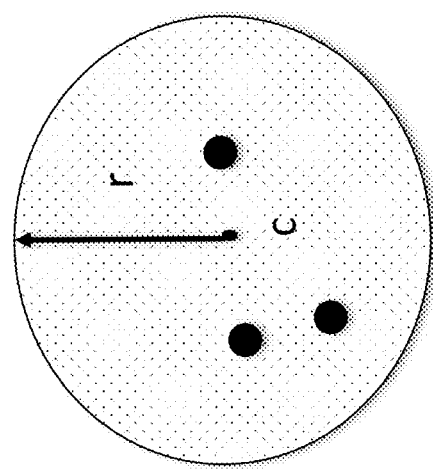

Legend:
User device is located within region bounded by a circle with center "c" and radius "r".
User device selects the dots.
The dots represent the locations represented by the approximate object.
The user device is at one of the dotted locations.

FIG. 23

SOFTWARE-BASED SWITCH FOR PROVIDING PRODUCTS AND/OR SERVICES TO USERS WITHOUT COMPROMISING THEIR PRIVACY

CROSS-REFERENCE

This application is a continuation of application Ser. No. 15/700,744, filed Sep. 11, 2017, which is a continuation-in-part of U.S. patent application Ser. No. 15/671,021, filed Aug. 7, 2017 and claims the benefit of Provisional Application Ser. No. 62/385,515, filed Sep. 9, 2016, the contents of both applications being incorporated herein by reference.

BACKGROUND

Service experiences abound on the Internet and the Web. New inventions such as block-chain based systems envision computer programs called smart contracts to provide services to smart devices such as autonomous cars. It is further envisioned that an overall service experience may be dis-aggregated into multiple components wherein more than one service provider may provide the individual components. Many smart devices, smart computer programs and service experiences also utilize data obtained from sensor devices located in user computing devices or physical environments wherein user devices are proximately located. Thus, service experiences entailing the use of autonomous cars may collect increasing amounts of user data. Most service experiences are also based on user provided information. Consumers have increasingly shown signs of being concerned with preserving user data privacy. A service provisioning system that preserves user data privacy in online networks with sensor devices collecting increasingly larger amounts of user data will thus be of great social value and commercial benefit.

SUMMARY

In accordance with one aspect of the subject matter described herein, a system and method is provided for facilitating delivery of a product and/or service to a user. In accordance with the method a first executable computer code is caused to be inserted into a computing environment in which a user session is established. The first executable computer code is associated with an entity that provides the product and/or service. A user session is established in the computing environment. In response to the first executable computer code being inserted into the user session, a first virtual machine is created in the user session. The first executable computer code is executed in the first virtual machine, wherein executing the first executable computer code includes obtaining, over a communications network and from a user computing device of the user, a first proper subset of all information needed from the user computing device that is required to fulfill delivery of the product and/or service. The first proper subset of all the information is less than a complete set of all the information needed from the user computing device that is required to fulfill delivery of the product and/or service. The first proper subset of the information is processed by the first executable computer code. The first executable computer code produces first output data. Mediation of the information in the first proper subset of information is selectively enabled or disabled through an entity that obfuscates user information attributes of the user before the first information is obtained by the first executable computer code. The first virtual machine is terminated upon completion of executing the first executable computer code. A second executable computer code is obtained based at least on a first portion of the first output data produced by the first executable computer code. The second executable computer code is caused to be inserted into the user session established in the computing environment. In response to the second executable computer code being inserted into the user session, a second virtual machine is created in the user session. The second executable computer code is executed in the second virtual machine, wherein executing the second executable computer code includes obtaining, over the communications network and from the user computing device, a second proper subset of all the information needed from the user computing device that is required to fulfill delivery of the product and/or service. The second proper subset of all the information is less than the complete set of all the information needed from the user computing device that is required to fulfill delivery of the product and/or service and includes information not included in the first proper subset of the information. The second proper subset of the information is processed by the second executable computer code. The second executable computer code produces second output data. Mediation of the information in the second proper subset of information is selectively enabled or disabled through the entity that obfuscates user information attributes of the user before the second information is obtained by the second executable computer code. The second virtual machine terminates upon completion of executing the second executable computer code. Based at least in part on the second output data produced by the second executable computer code, the product and/or service is caused to be delivered to the user of the user computing device.

In accordance with another aspect of the subject matter described herein, a system and method is provided for performing a transaction over a communications network. In accordance with the method, responsive to a user request received over the communications network, a user session is established in a computing environment. A plurality of executable computer codes is executed in the computing environment that each perform a portion of the transaction, wherein executing each of the executable computer codes includes obtaining over a communications network and from a user computing device of the user, a different proper subset of all information needed from the user computing device that is required to complete the transaction. Each of the proper subsets of all the information is less than a complete set of all the information needed from the user computing device that is required to complete the transaction. Each of the executable computer codes processes the respective subset of information that it obtains. Mediation of the information in the different proper subsets of information is selectively enabled or disabled through an entity that obfuscates user information attributes of the user before the information is obtained by the executable computer codes. Information is only exchanged between and among the plurality of executable computer codes during execution of each of the executable computer codes by obtaining encrypted output information that was previously output from one of the executable computer codes. The encrypted output information is encrypted such that one or more decryption keys are required from the user in order to decrypt the output information. After completing execution of a final one of the executable computer codes necessary to complete the transaction, the user session is terminated so that each of the subsets of information no longer exist in the computing environment.

In accordance with yet another aspect of the subject matter described herein, a system and method is provided for a computer emulation system running on one or more processors to facilitate delivery of a product and/or service to a user by a service provider over a communications network. In accordance with the method, a product/service delivery process is initiated by creating a session. A first virtual machine is run in the session. The first virtual machine is configured to support only a pre-determined set of operations. The first virtual machine runs a first computer program. A user computing device is caused to be invited into the session with the first computer program. Obfuscated user data is obtained over the communications network from the user computing device. The user data that is obfuscated is user data that is required in order for the first computer program to cause delivery of the product and/or service to the user. Responsive to a request from the first computer program, the user data included in the obfuscated user data is caused to be verified. The verification is achieved without revealing any of the user data included in the obfuscated user data such that the first computer program is able to provision delivery of the product and/or service to the user without being in possession of any information about the user after the product and/or service has been delivered that the first computer program did not possess before initiation of the delivery provisioning process. The user computing device is caused to be removed from the session with the first computer program upon receiving a request from the user computing device.

BRIEF DESCRIPTION OF THE DRAWINGS

FIG. 1 shows elements of a decentralized transaction in an online purchase of a book.

FIG. 2 shows exemplary linking information implicit in a decentralized transaction.

FIG. 6 shows an example of the contents that may be included in the directory.

FIG. 8B shows examples of computer program instructions and their semantics.

FIGS. 19A, 19B and 19C show illustrative components that are inputted to and outputted by KGE.

FIGS. 20A and 20B show illustrative components that are inputted to and outputted by PGE.

FIG. 23 shows exemplary approximate objects.

Figure 3:
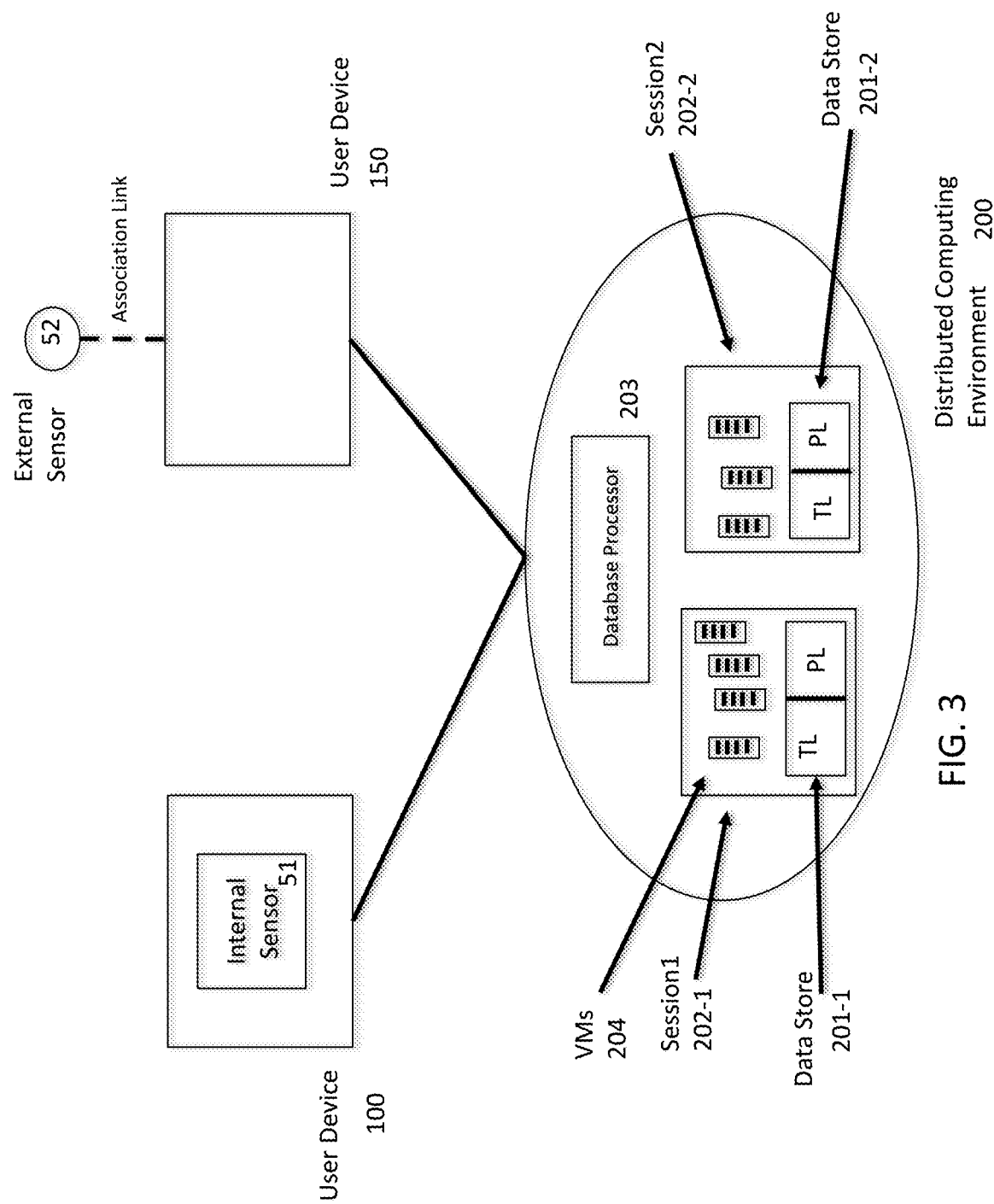
FIG. 3 shows one example of the overall operating environment of the present invention.

Some drawings show message sequence diagrams depicting exemplary interactions between computer programs. Such drawings do not, in general, depict the physical computers on which these programs, i.e., computational entities, may run.

DETAILED DESCRIPTION

Motivation

Web services and the business model of the web are critically dependent on data gathered from and about consumers. Customized, personalized services and user experiences are crafted using data gathered from consumers and, in some cases, acquired from third party providers. Advertisements, marketing of content and services, recommendations, etc., are all based in part on user data and the results of its analysis. As the web evolves to support sensors and sensor-based devices such as smart cars, smart household appliances, etc., the gathering of user data is expected to increase.

Concomitantly, the user community is becoming aware of the fact that web enterprises store large amounts of their personal data and this awareness is leading many users to question the storing and use of user data. Concerns regarding privacy of data are on the rise. Outages and breaches of data at enterprises and hacking of enterprise software systems exacerbate such concerns.

In some embodiments, the present invention describes system and methods by which an open decentralized marketplace may be constructed that offers several features that address these concerns. The term "open" refers to the possibility of having multiple service providers interacting without proprietary interfaces. The term "decentralized" refers to the notion that no single entity is in control and that various entities may combine to offer an overall service.

The invention described herein allows users to reveal selected elements of personal data to one or more service providers and obtain services. However, such provisioning of user data is controlled by the user who reveals his data to a computational entity that, by design, cannot retain the provisioned data or its memory. That is, the computational construct receives the user data, executes itself in an environment that is "sterile" in a sense described later, and then terminates itself.

The one or more service providers may be organized as individual entities performing distinct functions that taken together constitute the product and/or service provided to the user. As an example of such an arrangement, consider an online book seller, payment processor and shipper that enter into a business arrangement by which a user may purchase a book from the seller, pay for it using a payment processor and receive it in a shipment managed by the shipper.

In the present invention, the book seller, payment processor and shipper are represented by executable computer code such as computer programs or apps that are specially configured (described in more detail later) and which are received, e.g., downloaded, by user devices. The user devices then inject the programs into a (distributed) computing environment containing a database processor. For purposes of illustration the individual executable computer codes will be referred to as computer programs, but more generally any suitable type of computer code may be employed that is configured in the manner described herein.

Before proceeding further, it will be helpful to define a number of terms that will be used throughout the description.

As used herein, the term "virtual machine" is to be given its conventional meaning as used by those of ordinary skill in the art. Generally, a virtual machine is an emulation of a physical computer system using hardware, firmware, software or a combination thereof. For instance, "operating system level virtualization" is one known technique for implementing virtual machines. In this technique, a physical computer is virtualized at the operating system level, enabling multiple "isolated" and "secure" "guest" (software) machines, i.e., virtual machines, to run on a single physical computer. The term "secure" implies that only pre-determined operations can be executed in the guest machine. The term "isolated" means that the operations may not access resources in other guest machines. All guest machines share the same kernel, but may have individual user spaces. Thus, computer/application programs running in a guest/virtual machine view it as a standalone computer system. Examples of software systems using operating system level virtualization techniques include Solaris Containers, iCore Virtual Accounts, Linux-VServer, etc.

We note that another known technique for supporting virtual machines uses a hypervisor or virtual machine monitor that allows guest machines to run their own kernels. For example, hypervisor may support three guest/virtual machines running macOS, Windows, Linux, respectively, on a single physical computer. Major Unix vendors sell virtualized hardware, e.g., Sun Microsystems, HP, etc.

In the descriptions that follow, a computing environment (or simply, environment) is a programmable arrangement of hardware, software and/or firmware. The term "distributed computing environment" refers to an inter-connected programmable arrangement of hardware, firmware and software. The term "database processor" may denote, in one embodiment, an operating system (OS) of a (distributed) computing environment, the OS being suitably configured to support features such as virtual machines, session management, etc., as described herein.

The term "session" as used herein refers to a process of information exchange between two or more communicating devices or computer programs in which information used in the exchange may be stored in a specific memory or set of registers that are then cleared ("torn down" or "terminated") later. Devices and/or computer programs may also be invited and removed from a session or may initiate or terminate one or more dialogs during a session where a dialog is a sequence of data items exchanged between devices and/or computer programs.

Certain operations in common use such as login, logout, registration, de-registration, etc., may incorporate or entail one or more aspects of our notion of a session. Thus, a client device logging in to a server may incorporate establishing a session between the client and server. A computer program may register itself with a server providing instant messaging services; such an action may also entail establishing a session.

We will also have occasion to use the term "ephemeral". The term denotes a data item that comes into existence in a session created by a computer program and is cleared before the session is terminated or as a part of the termination process of the session. For example, a computer program operating in a session may receive and store an input data item from a user, or it may read a data item from a memory unit. The computer program may then finish execution and the session may be terminated, cleared or torn down. As a part of the session termination process, the memory unit and any internal registers of the computer system are also cleared. In this way, the data items are deemed to be ephemeral.

It should be noted that the data processor performs various actions that are not performed by conventional database processors. In particular, the database processor is configured to carry out three actions.

First, when connected to a user computing device that is seeking service, the database processor creates a session between the user computing device and itself. In some embodiments, the communication channel used to exchange data between the user device and the database processor is preferably secured. One example of such a secure protocol that may be employed is discussed below.

Second, the database processor produces one or more virtual machines (VMs) that are provisioned with one of the aforementioned computer programs. The VMs may be produced sequentially or in parallel. Each VM executes one of the provisioned computer programs, each of which may produce output that is restricted as explained later. The VMs are configured to terminate themselves at the conclusion of the execution of the provisioned computer program.

Finally, the database processor terminates the session established between the user device and the database processor. This action may occur if, e.g., the database processor determines that the service request from the user device has been satisfied, or if the database processor receives a special command from the user device. The database processor clears any data outputted by the various VMs during the session. We may say that the session has been "cleared" or that we "tear-down" the session to stand for the operation of clearing the outputted data.

Thus, while the term "database processor" is known in prior art, it will be seen that its use in the present invention requires several new innovations and features, e.g., the creation and management of virtual machines, etc.

Illustrative Example (Purchasing Books Online)

We begin by considering an illustrative example of a web service provider such as an online bookstore. Currently several such establishments exist and they typically allow consumers to browse and select books and purchase titles through an in-house payment system. Purchased books may then be delivered by another in-house shipping operation. The online bookstore, thus, provides a "single stop" service.

The information that consumers are required to provide to such service providers may comprise user name, billing address, shipping address, telephone number, credit card information, email address, and user ID/password. (The service provider may also acquire additional information about consumers and their actions from third-party providers who gather information about users from cookies and other mechanisms.)

A consumer may be entitled to ask if all such information needs to be provided. If we assume the enterprise to be decentralized into separate entities such as Seller, Payment and Shipper entities then a consumer may be able to provide only proper subsets of information to the individual entities. For example, only his shipping address may be provided to the Shipper who has no need for any other information. Similarly, the Seller needs only the title being purchased if the payment for the title can be authenticated. The Payment processor needs only to authenticate the consumer and the funds.

Thus, by decentralizing the online service provider into separate entities, a consumer may be able to provide subsets of his information, as needed, to the various entities.

However, the consumer is now burdened with performing actions to manage "linking information" that binds the individual actions (or sub-transactions) into a single transaction. In other words, the individual sub-transactions may comprise selecting a book, making a payment and arranging a shipment. The linking information tells the Payment processor which Seller and title is being bought. Another piece of linking information tells the Shipper what title and where to pick up the shipment. The Seller needs to be told by the Payment processor which title is being paid for and on behalf of whom. Etc.

Since consumers do not want to be burdened by such actions, online systems allow state information to be passed between entities, e.g., Seller, Payment and Shipper. The state information contains contextual information that allows individual sub-transactions to be linked together into a single transaction. In prior art, terms such as tags or tokens have been used to describe computational constructs that contain shared state information.

Automated sharing of tokens and tags between business entities allows consumers to be freed from managing the "linking information" associated with the individual sub-transactions. However, on the downside, it is possible for a third-party to use the shared token/tags to re-construct the entire transaction, resulting in the gathering of user information into a user profile. For example, user information contained in browser "cookies" is routinely used to construct integrated profiles of users.

A related problem is that entities receiving and using shared tokens/tags must trust these instruments. Malicious users may insert spurious or malicious information into a token or a tag, e.g., re-direct funds or shipments to a malicious address.

It would, therefore, appear that decentralizing a service provider into separate entities still allows third-party enterprises to aggregate user information. It also introduces additional security and trust concerns regarding shared information.

Thus, it would be desirable to have an invention that provides a system and methods providing the following features.

Online services are provided by a group of computer programs organized as an open decentralized marketplace, i.e., a distributed computing environment or network of computer programs. That is, business entities are represented by computer programs that are inter-connected by an open networking environment.

User information is partitioned into two classes (i) explicit information, and (ii) latent information. Explicit information is provided to a computer program by the consumer so that it may perform its functions, e.g., shipping address provided by a consumer as it is needed by a program so that the consumer may receive goods at the indicated address. Latent information, e.g., location information, is provided by sensor devices associated with a user device.

It is not possible to link information outputted by the computer programs to obtain an integrated user profile.

The user may experience an integrated experience despite the above requirements.

An exemplary online transaction by which a consumer purchases a book and has it delivered to his address comprises the following. (Names beginning with a capital letter in the descriptions below denote computer programs.)

The Seller requires that the customer must be located within a pre-determined geographical area at the time of ordering, e.g., state of New York. (One reason for such a restriction may be local tax laws.)

The customer must arrange payment from the online Payment Processor. Seller needs proof of payment, i.e., payment amount and title.

Payment Processor needs to authenticate the user.

Purchased titles will be made available by Seller to be picked up by the Shipper. Shipper needs a token (provided by the consumer in one embodiment) information to pick up shipment and the delivery address. Shipper needs verification that Seller has authorized the title to be picked up.

We assume consumers interact with the computer programs in the computing environment using devices, e.g., smart phones, hereinafter referred to as user computing devices. Thus, a consumer may also be thought of as being represented by a computer program running on his computing device. A consumer, John, wishing to purchase a title from Seller, utilizing prior art, may undertake the following sequence of steps (cf. FIG. 1).

In step 1, John visits Payment Processor and establishes an account by providing information, as needed, to the Payment Processor. (Note: This action may be considered as being a part of an initial setup phase.) John is issued an account number for future use.

In step 2, John visits a Location Certifying Authority (LCA) and provides data from his GPS-enabled mobile device. LCA issues a token (Token-1) to John indicative of his location.

In step 3, John visits Seller and provides Token-1 to the Seller who verifies that the token is valid and that John's location satisfies Seller's constraint. John selects a title to be purchased. Seller issues him a token (Token-2).

In step 4, John provides Token-2 to the Payment Processor who verifies that the token is valid, authenticates John, and provides a token (Token-3) to John indicating that he has processed a payment as per information contained in Token-2.

In step 5, John re-visits the Seller and presents Token-3. Seller verifies that Token-3 is valid and that he has received the payment for the selected title. As a by-product of the verification, Seller receives information about the title being purchased, payment amount and some information about the purchaser, e.g., John's name or customer number. Seller issues a new token to John (Token-4).

In step 6, John visits Shipper and presents Token-4. Shipper verifies that the token is valid and that the shipment is ready and obtains a delivery address as a by-product of the verification process (as explained later).

In step 7, using Token-4, Shipper picks up the shipment from Seller and delivers it to the delivery address provided in step 6.

(We have assumed a certain distributed arrangement of service providing entities above for illustrative purposes; in practice, one or more of the service providing entities may be combined or further partitioned without limiting the present invention.)

The following observations are noteworthy about the above process.

The user must perform six of the seven steps (including the initial setup step).

The total amount of information the user provides is the same whether the consumer is provided service by a single provider or a collection of providers.

It should also be observed that the computer programs may verify information by using the various tokens. First, the Seller can verify that the purchaser satisfies the location constraint using token-1. Next, the Seller can verify that a purchaser has paid for a purchase (using token-3) and that the purchaser satisfies the location constraint (token-1). As a further example of the linking phenomenon, note that the Shipper can verify that a shipment is ready, that the shipment has been paid for, and that the purchaser satisfies the location constraint. The arrows marked A, B, C and D in FIG. 2 depict the linking phenomenon.

In other words, an entity that has access to all the tokens may effectively re-construct the entire transaction and, thus, derive an integrated user profile.

It is worthwhile here to note that advanced decentralized and open systems and environments such as Bitcoin and ledger-based block-chain systems have reported that certain entities have been able to link information from computer programs, e.g., smart contracts or transactions, and create composite user profiles.

Thus, to protect the user's private data, it would be desirable to have a solution that prevents a third-party to construct such integrated/composite user profiles using customer data, e.g., by putting together the linking information A, B, C and D in FIG. 2. This is the goal of the present invention.

In the following descriptions, we note two cases.
1. User data may be obtained by computer programs from sensors located within a user device, e.g., GPS location data from a smartphone, or from sensor devices external to the user device, e.g., a fitness bracelet associated with a user's smartphone.
2. A consumer may provide information by user input to a service provider, e.g., by entering a shipping address, or the user's device may provide user data via one or more applications running on the user device.

Some embodiments of the subject matter described herein address both the above cases.

General System and Methods of Invention

FIG. 3 depicts a high level schematic diagram of one example of an operating environment in which the subject matter described herein may be implemented. Illustrative user computing devices 100 and 150 may be associated with internal sensors, e.g., sensor 51, or external sensors, e.g., sensor 52. The external sensors may communicate with its respective user device over a communication link such as Bluetooth, Wi-Fi, etc. Examples of user computing devices include, without limitation, mobile communication devices (e.g., cellular phones, smart phones), personal computers, laptops, tablet computers, smart watches, wearable computers (e.g., fitness bands), personal digital assistants (PDAs), wearable medical devices such as smart bandages and the like.

User computing devices may be connected, using wireless and/or wired networking links, to a distributed computing environment 200 that contains a database processor 203, i.e., a hardware processor that runs a computer program that executes computer programs supplied to it, akin to a compiler that executes computer programs. To carry the analogy forward, a compiler executes programs written using computer programming or specification languages such as FORTRAN. The database processor executes computer programs using a specification language described below.

The database processor 203 when requested to execute a suitably specified computer program produces a computational object called a session, such as sessions 202-1 and 202-2 shown in FIG. 3. The database processor 203 may have any number of sessions operating at any given time within the distributed computing environment 200. A session may contain one or more virtual machines VMs. In the example of FIG. 3 the two sessions 202-1 and 202-2 contain several VMs 204.

A session also contains a data store in which the data is categorized into two lists, called TL (Token List) and PL (Program List). For instance, session 202-1 includes data store 201-1 and session 202-2 includes data store 201-2. Typically, only one data store per session is created. Details of the operations performed by the database processor on data in the TL and PL lists are provided later.

In practice, in some embodiments the database processor may be implemented as a computer virtualization program in which the kernel of an operating system allows the creation and termination of one or more user spaces wherein one or more session objects may be created. The database processor creates one or more VMs in a session object that operate on the TL and PL lists in the data store in the session. Computer software virtualization is well-known in prior art.

Data from Sensor Devices

A user computing device is a device containing one or more processors with one or more network connections (fixed and/or wireless) and possibly one or more sensors that detect the state of the device or its environment. As previously mentioned, examples of user computing devices include smart phones, tablet computers, laptop/desktop computers, smart cars, smart household appliances, wearable computers, etc.

Referring to the illustrative example in FIG. 3, we note that the sensor 51 may produce data such as e.g., geographic location data, ambient temperature, user motion data, etc., that is received by the distributed computing environment 200 from the user device 100 and stored in data store 201.

A computer program operating on such sensor data may need to ensure that the data is being produced by a trusted sensor. To achieve a trust model, one implementation proceeds as follows.

We require that a sensor (internal or external) associated with a user computing device that is to provide data to a computer program must first be registered with the computer program.

Establishing a secure connection between two entities is well-known in prior art. For example, we may use the Diffie-Hellman (DH) method. The DH algorithm operates by constructing a secret that is shared by the two communicating parties. It works as follows.

Let the two parties be named as A and B. (We may assume the A and B to be computer programs.) A and B agree on two prime numbers, "g" and "p". Next, A generates a secret number, say "a", and B generates a secret number "b". "A" computes:

$$g^a (\mod p) = x$$

and B computes:

$$g^b (\mod p) = y$$

A and B exchange the computed numbers "x" and "y". "A" discovers that the number, "y", he receives from "B" is equal to the number he had generated, viz., "x". Similarly, B discovers that the number he receives, "x", from A is equal to the number, "y", he had generated. The mutually agreeing discovery is based on the mathematical property of exponentiation and commutativity of integer multiplication:

$$(g^a \mod p)^b (\mod p) = g^{ab} (\mod p)$$

$$(g^b \mod p)^a (\mod p) = g^{ba} (\mod p)$$

Figure 4A:
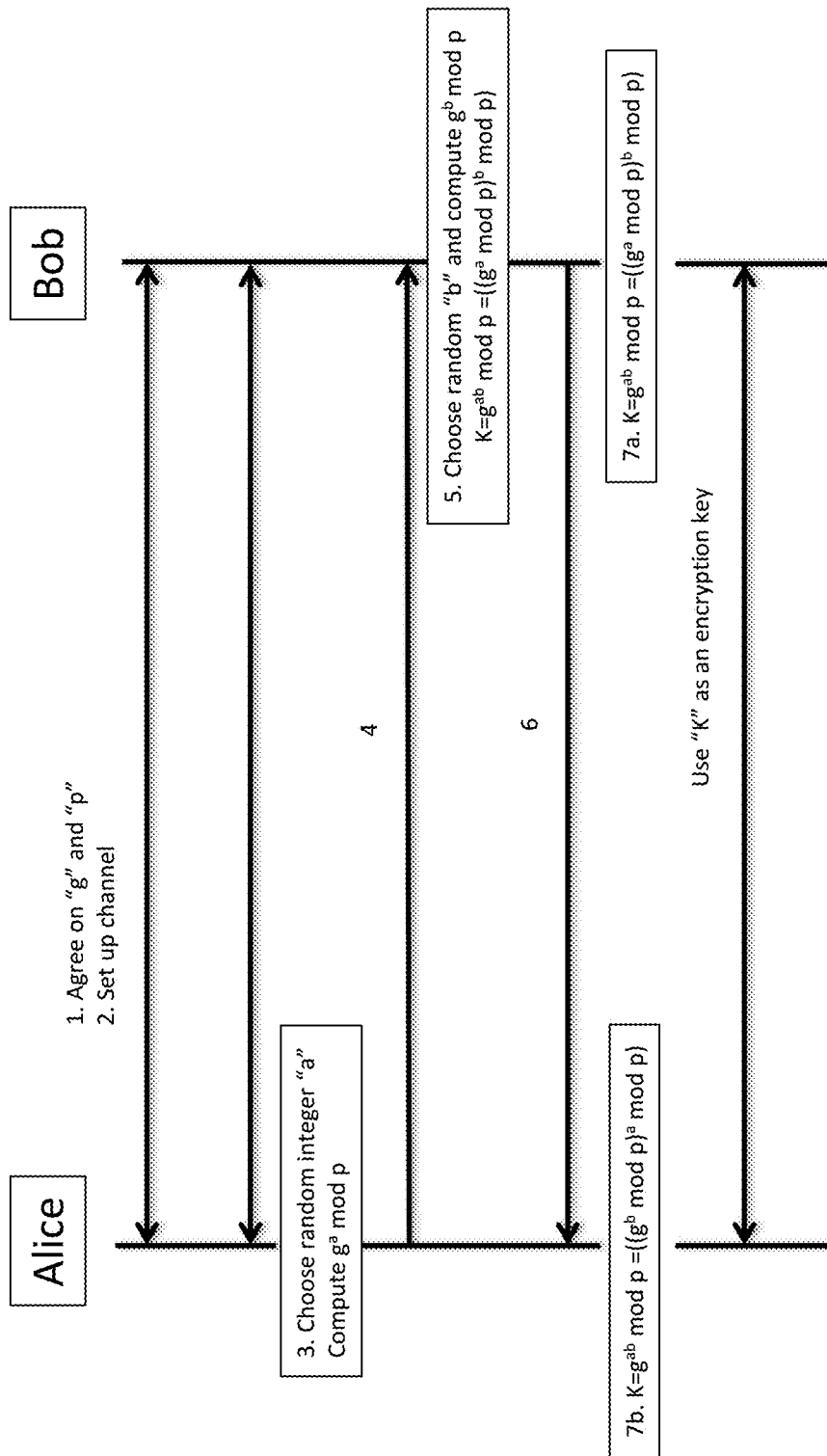
FIG. 4A shows a conventional DH algorithm.

FIG. 4A shows two computer programs named Alice and Bob using the conventional DH protocol/method to secure an open channel. We briefly describe the DH protocol to familiarize the reader with the notion of protocols.

In step 1, both Alice and Bob agree on the integers "g" and "p" and in step 2, a secure channel is set up between them using the standard DH algorithm. In step 3, Alice chooses a random integer "a", computes ($g^a$ mod p) and sends the result to Bob in step 4. Bob chooses a random integer "b" in step 5, computes ($g^b$ mod p) and sends the result to Alice in step 6. In steps 7a and 7b, both Alice and Bob compute K=($g^{ab}$ mod p) as indicated. In step 8 both agree to use the computed "K" as an encryption key for future messages exchanged between them.

Use of the DH protocol assures programs Alice and Bob that they may securely exchange messages between themselves over an open public channel if they use the computed key "K". That is, Alice wishing to send a message "m1" to Bob, encrypts it using a function encrypt(m1, K)=m2. Bob, upon receiving "m2", may decrypt it using a function decrypt(m2, K)=m1.

Whereas the DH algorithm for secure communications between two parties is well-known, it may also be extended for three or more parties. However, such extensions may involve extra exponentiation/encryption steps to be carried out by the participating parties. In some cases, we may also need multiple messages to be broadcast between all the communicating entities. Since, exponentiation is an expensive process, and we may have many sensor devices associated with a user device, such extensions to DH may become prohibitively expensive. Also, hardware capable of doing exponentiation operations (or do them quickly) may not be available in sensor devices. Thus, when considering the use of DH in channels with multiple sensor devices, we may wish to use less computationally expensive methods.

It is known that the DH algorithm has vulnerabilities in certain situations. (Techniques are also known that may be used to mitigate these vulnerabilities.) However, our method of associating sensor devices with a first party that has established a secure channel with a second party does not depend on using the DH algorithm to set up the secure channel; any algorithm that establishes a secure channel between two parties may be used.

Thus, our description of the DH algorithm above is purely pedagogical and serves as an enabling example. Any method that establishes a secure channel between two parties may be used in conjunction with our method.

We now present our method and note that it is light weight and allows associating multiple sensor devices with a user computing device. That is, we consider channels in which sensor devices (s1, s2, s3, etc.) may be associated with a user computing device "ud" that, in turn, has a secure connection to a computer program "A" operating on data stored in database "db". We may depict this situation as follows.

[s1,s2,s3, . . . ]---ud---db---A

Figure 4B:
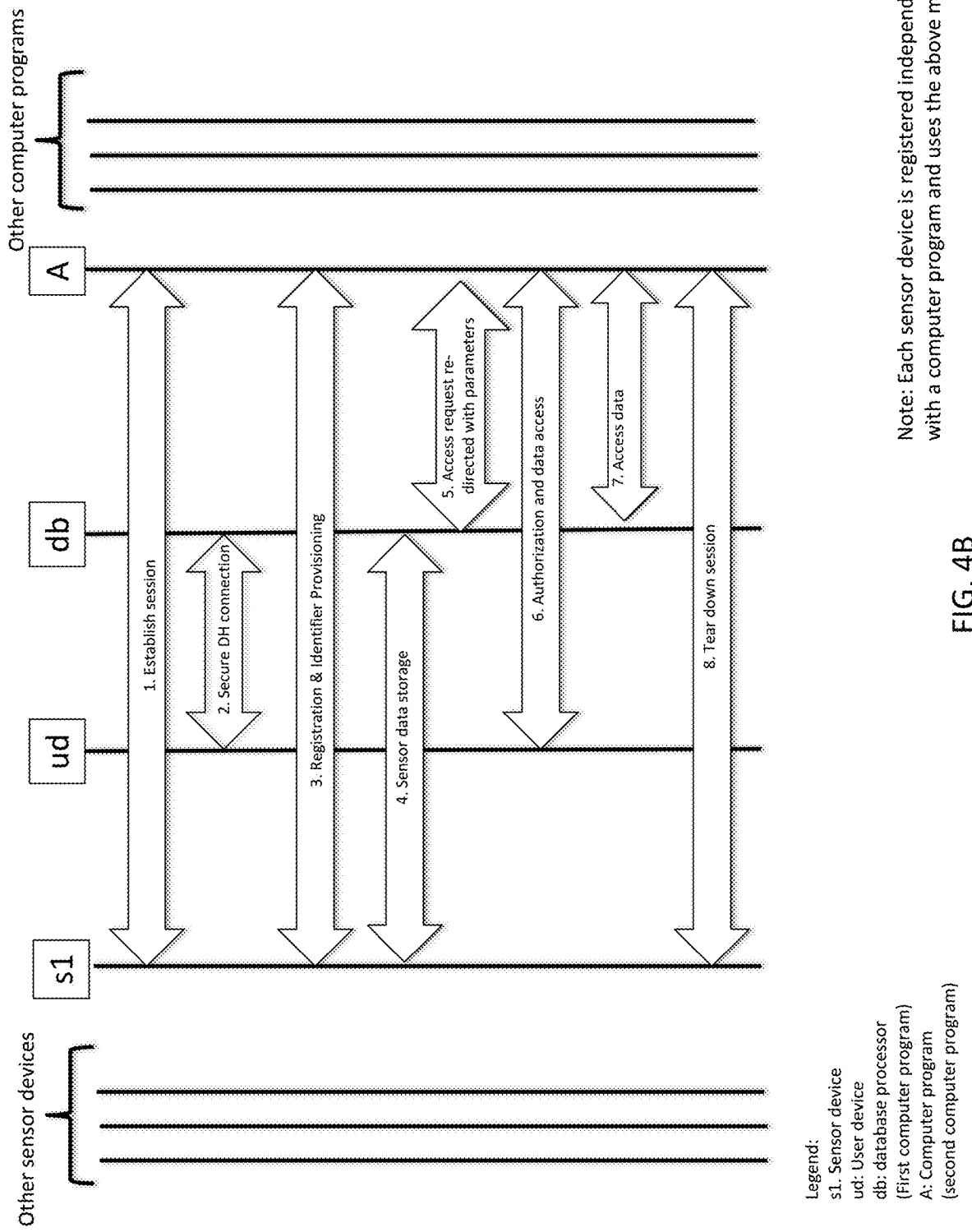
FIG. 4B shows an illustrative extension of DH algorithm.

Our approach may be generally described as the following sequence of steps (FIG. 4B). The illustration shows a single sensor device registered with a computer program. In practice, several sensor devices may be registered with a single computer program. A sensor device may also be registered with more than one computer program.

1. Establish a session between the "ud", the "db" and the computer program "A".
2. Establish a secure connection between "ud" and "db" using a suitable algorithm. In one embodiment, we use the DH algorithm to establish the secure connection, thus the "ud" and "db" agree on an encryption function, say K (based on the shared secret), the prime base "g" and modulus "p".
3. The program "A" requests the sensor device to register itself and issues a registration identifier to the sensor device. The latter provides a hashed version of the identifier to the user device. Note that the function used herein is different than the agreed upon hash function in step 2 above.
4. The sensor device sends sensor data to "db" that causes it to be stored.
5. "A" requests sensor data from "db" and is re-directed to "ud" along with certain parameters.
6. "A" requests and receives authorization from "ud" based on the parameters from step 5 and its previously issued identifier (that is only known to "A" and sensor device, "s1").
7. Upon being authorized, "A" accesses data from "db".
8. The session established in step 1 above is cleared.

Figure 5A:
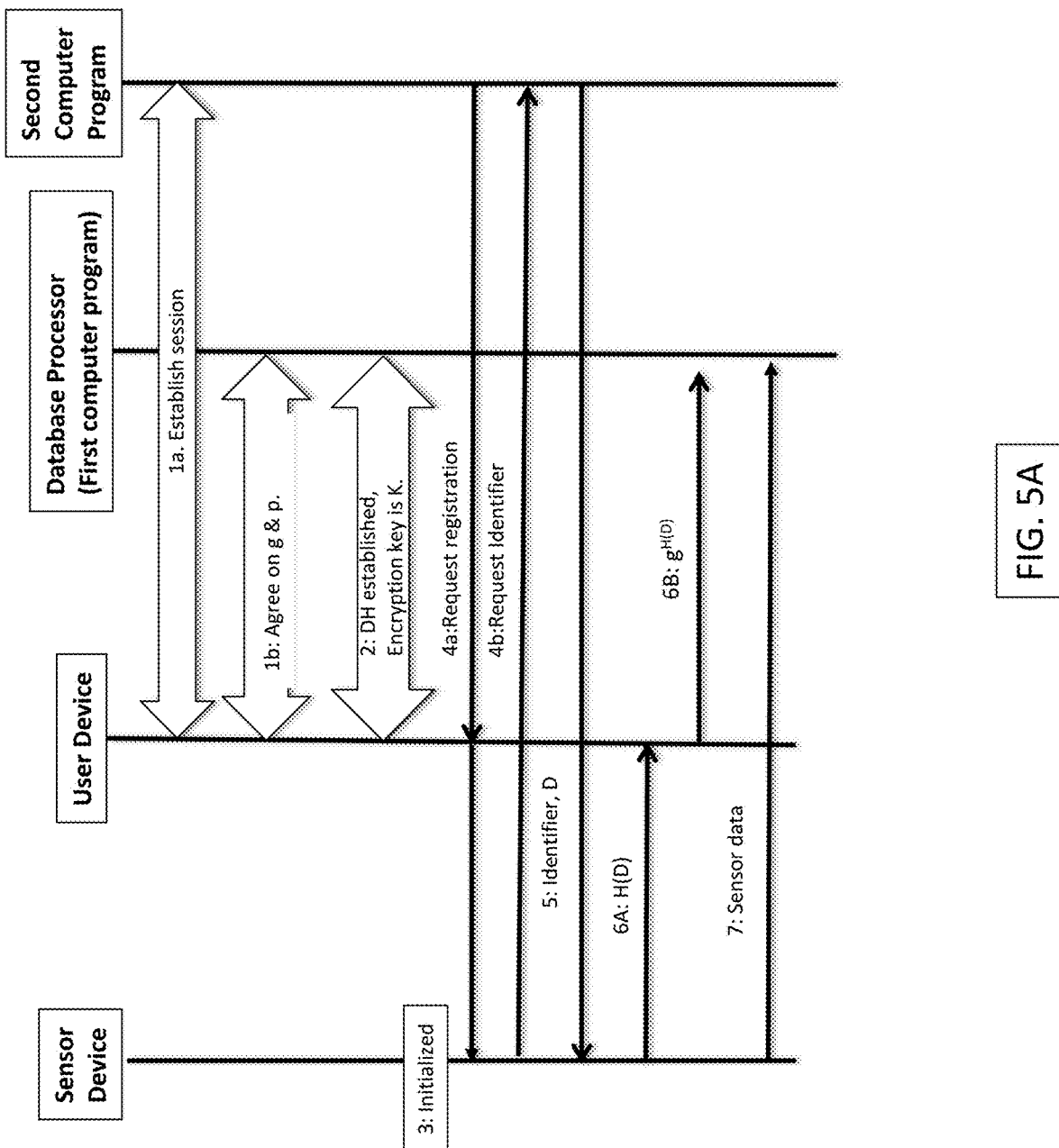
FIGS. 5A, 5B and 5C illustrate the operation of the extension to the DH algorithm.

We now provide a fuller description of the above process with reference to FIG. 5A.

In steps 1a, we establish a session between the user device, a first computer program (which in some embodiments may be the database processor referred to herein), and a second computer program. In step 1b, the user device and the first computer program agree on "g" (prime base) and "p" (prime modulus).

In step 2, we establish a secure channel between the user device and the first computer program. Either DH or some suitable algorithm may be used. We assume the use of DH for illustrative purposes.

In step 3, the sensor device is initialized, i.e., its software logic is triggered or launched, and in step 4a, the second program issues a registration request to the sensor device. We may assume that the second computer program needs the sensor data. The request is sent to the user device since the second computer program may not know the address of the sensor device. The user device forwards the request to the sensor device, along with the address of the second computer program.

In step 4b, the sensor device requests the second computer program for an identifier and it is provided the identifier denoted "D" in step 5. It is also provided with the name of an encryption function, say H, (or the executable code of the encryption function). (For example, the sensor device may have been pre-provisioned with one or more encryption functions by its manufacturer). In step 6a, the sensor device hashes "D" using function "H" and sends the result to the user device. Note that the user device is unaware of "D", it only receives H(D). It is required that the encryption function "H" be different from the encryption function "K" from step 2.

In step 6b, the user device computes g^H (D) ("^" denotes the exponentiation operation) and sends the result to the database processor. In step 7, the sensor device starts to generate sensor data and sends it to the database processor who causes it to be stored for later retrieval by other computer programs.

Figure 5B:
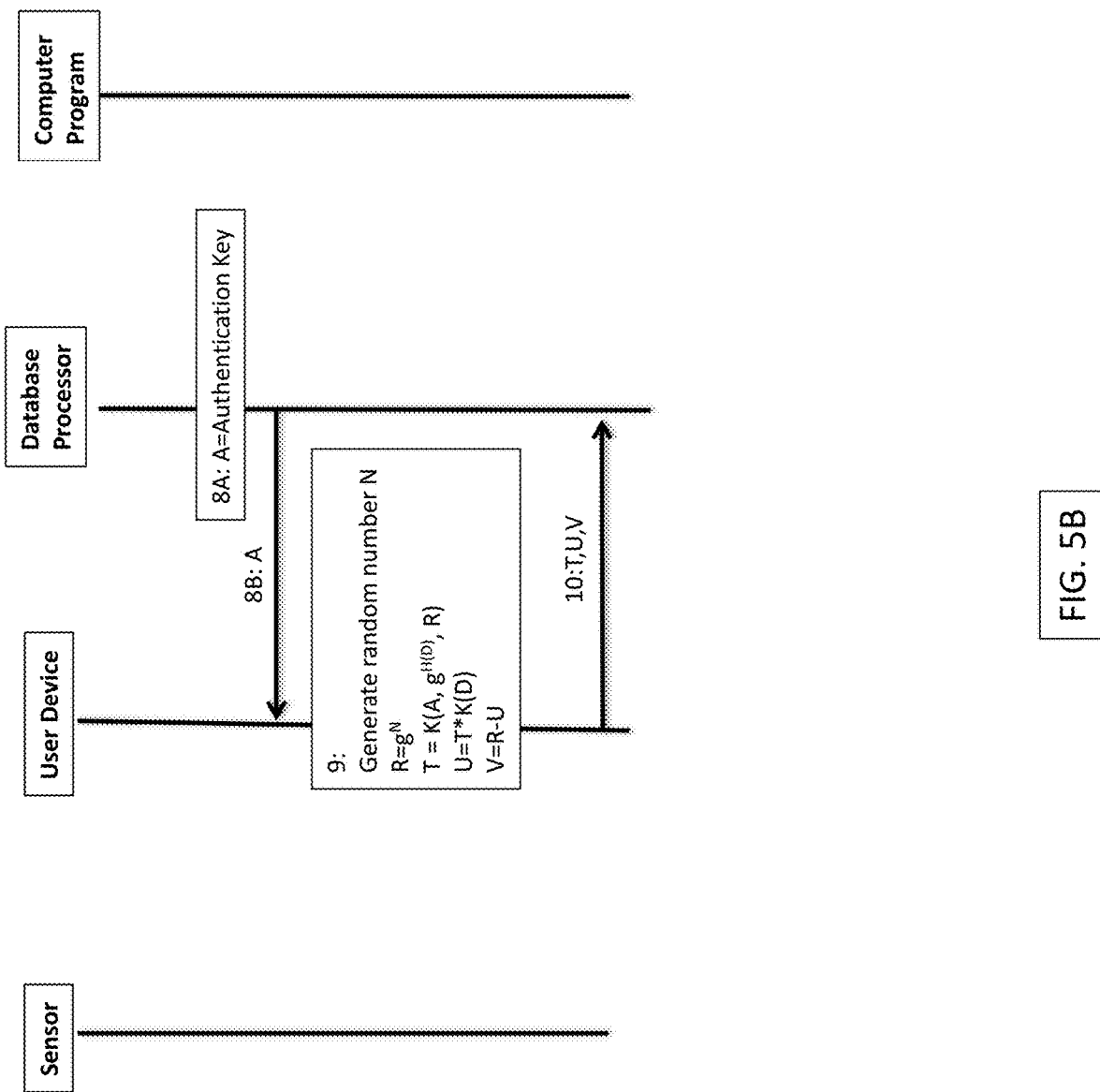

Anticipating that one or more computer programs may request access to the sensor data and that it will use the user device to authorize the requests of such computer programs, the database processor generates an authentication identifier, A, and sends it to the user device (steps 8A and 8B, cf. FIG. 5B).

The user device now performs the series of computations shown in step 9 (FIG. 5B). The goal of these steps is twofold. First, we wish to incorporate the sensor device identifier and the authentication identifier into a secret. This will allow the user device to verify the sensor device when requested by the database processor.

Second, incorporating the authentication identifier into a secret will allow the user device to verify the sensor device to a second computer program (different than the database processor) when requested (as shown below).

The computation shown in step 9 (cf. FIG. 5B) results in the derivation of 3 parameters T, U and V that are associated with the authentication identifier produced by the database processor and the identifier "D" assigned to the sensor device. (Note, that all identifiers are required to be integers so that we may perform the stated computations.)

In step 10, the user device sends the parameters T, U and V to the database processor for storage. It is to be noted that the database processor and the user device have previously agreed upon the prime base "g" when setting up the DH secure channel, and that it is computationally hard for an entity, e.g., the computer program shown in FIG. 5B, that does not know "g" to derive the parameters T, U and V. Note also that the authentication identifier "A" provided by the database processor to the user device is needed for computing the parameters.

Figure 5C:
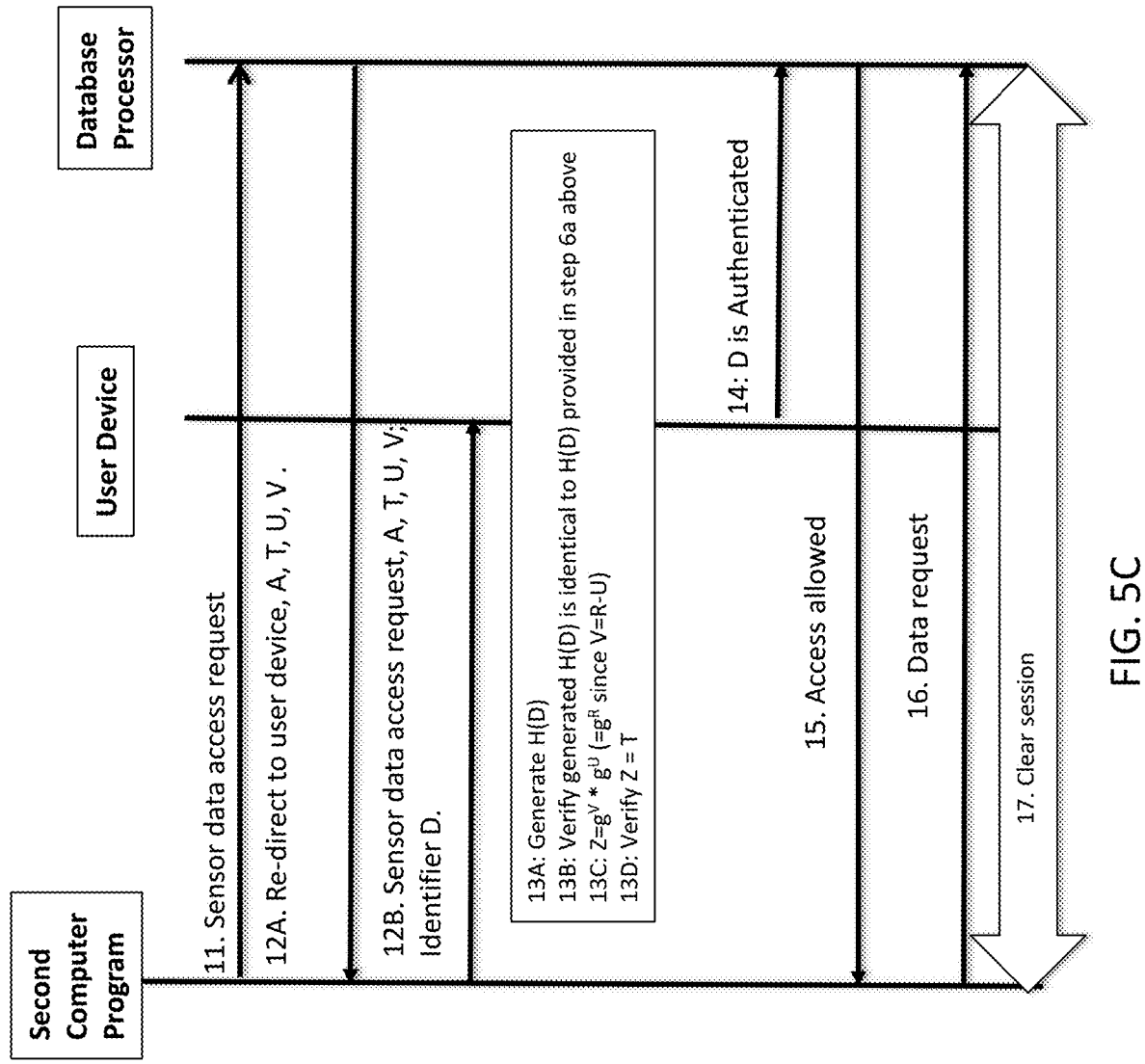

Having set up the channel and stored the various derived parameters, we now consider the case wherein a second computer program requests access to the sensor data (step 11, FIG. 5C). The database processor, by one of the tenets of the present invention, needs permission from the user device. Contemporaneously, the second computer program wishes to be ensured that the sensor device is authorized to provide the requested information.

To achieve these two goals, the computer program is re-directed (step 12A) to seek permission from the user device. The re-direction instruction is overloaded by providing it the parameters A, T, U and V previously associated with the sensor device and stored in the database by the user device, as shown in FIG. 5B.

In step 12B, the second computer program sends the identifier "D" (only known to the second computer program and the sensor device) and the parameters A, T, U and V to the user device. The latter (steps 13C and 13D) uses U and V and the prime base (known only to it and the database processor) to derive Z (as shown) and compares it to the value of T (received from the second computer program). (Note that Z depends on knowledge of U and V that in turn depend on knowing U, V, A, etc.) A successful match assures the user device that the A, T, U and V parameters were provided to the second computer program by the database processor. (Recall that it is computationally hard for a computer program to generate T, U and V without knowing "g" and the encryption key K.)

Furthermore, the user device computes H(D) in step 13A and in step 13B compares it to the hashed value of "D" it received from the sensor device in step 6a. A successful match indicates that the second computer program provided the identifier to the sensor device.

In step 14, the user device marks the identifier "D" as having been authenticated and sends it to the database processor who may in step 15 allow access to the second computer program. The second computer program may now, in step 16, use the authorization provided by the database processor to issue a data access request to the database processor.

Once data access is complete, the session established in step 1a may be cleared (step 17).

Illustrative Embodiment Involving Sensor Devices

As a practical example of the use of the above method, consider a person who owns a smart car (e.g., a self-driving vehicle) that comes equipped with a key fob that allow the person to control various functions of the car, e.g., unlock the car, summon the car to a location where the owner is waiting, etc.

We assume the following correspondences using some of the terms from the descriptions provided above.
1. The key fob of a car corresponds to the sensor device.
2. The owner's smart phone corresponds to the user computing device.
3. A computer program running in a computer environment is to be referred to as a "first computer program".
4. An application program running on one or more processors inside the smart car is to be referred to as the second program.

As another example of a sensor device (different from a key fob), a smart car may have an installed device to manage payment to toll booths, i.e., the toll paying device is triggered by equipment in a toll lane and the device interacts with the equipment to make a payment based on a pre-provisioned bank/credit card account. That is, in this case we may have two sensor devices (i) the toll paying device installed in the car, and (ii) the key fob which is carried by the owner/driver. As explained above, the two sensor devices may establish independent registrations with the second computer program, i.e., the program running in the car's processor(s).

Current toll paying devices, e.g., EZ-Pass in New York, are permanently linked to a user's bank account irrespective of who may be driving or controlling the car at any given moment. Using the inventions described herein, a suitably configured toll paying device may be preferentially installed in the car and tied to a user device carried by the driver. The user device then authorizes the toll paying device to use the bank account designated by the user/owner of the user device. Thus, if user John is driving the car and has his smart phone with him, the toll paying device charges John's account. If the same car were being driven by a different user, say Mary, who is carrying her smart phone then Mary's bank account would be charged for tolls. Thus, e.g., car manufacturer's may provide cars with pre-installed toll paying devices. Furthermore, car rental companies may utilize such cars since, in current practice, the rental companies are liable for toll payments since they "own" the toll paying devices, i.e., a toll paying device in the rental car is associated with the rental company's bank account or credit card.

The protocol described above associates the sensor device, e.g., the key fob or the toll paying device, with the user computing device. The user computing device, the first and second computer programs establish a session with a secure channel between the user device and the first computer program. The first computer program may be executed by, e.g., a car manufacturer's cloud computing environment, and the second computer program, e.g., may run on processors provided in the smart car. (In certain embodiments, the cloud computing environment may periodically provide—e.g., using a download operation—executable codes to one or more processors in the car so that no connection is needed to the cloud computing environment.) The second program needs data from the sensor device to provide services to the driver/owner. In some cases, the second program may need to ascertain that the key fob is within a certain distance of the car. In other cases, the second program may need to ensure that the key fob is authorized, e.g., is the key fob authorized by the user device to make a toll payment?

The key fob may be used to launch various services by the owner/driver without being present in the car. For example, a command issued from the key fob may cause the car to be driven to a designated location, or to heat the car's interior to a certain temperature, etc.

It is important to note that the owner/driver's information is not stored in the second program that runs in the car's processor(s). The second program may read the data stored by the first program and use the data. (This aspect is explained further in later descriptions.) At the end of the execution of the second program, the memory of the processor executing the latter program is cleared. At the end of the owner/driver session, session data is also cleared as will be explained below.

Thus, the car's equipment only has access to the user's data whilst its processors are executing services for the user and these processors do not retain the user's data after their execution.

A Note on Encryption Keys

In addition to the encryption key agreed upon by the database processor and the user computing device as per the description above, we assume that the user device is provisioned with one or more additional encryption/decryption keys. In examples provided later, we will have occasion to discuss the need to encrypt or decrypt data. To that purpose, such programs are required to seek the relevant keys from the user device that, in turn, may provide the keys using an internal policy, e.g., choose to provide a key at random from the list of provisioned keys, or choose to provide a key that has not been used for some pre-determined amount of time, etc.

Database Processor and Virtual Machines

Having handled sensor data, we now turn to describe the handling of user provided information. For instance, in the example in which the online service provider is an online bookstore, the user provided information will include a shipping address, payment account number, etc. To this purpose, we need to describe further the details of the database processor, i.e., the sessions, VMs and the executable computer codes (e.g., computer programs) that it creates and manages.

One or more service providers create computer programs or apps using a specification language described later which are stored in a directory. In one embodiment, the directory is an internal component of the distributed computing environment 200, FIG. 3. In other embodiments, the directory may be implemented as a standalone system. In one embodiment, the directory contains addresses of online locations (servers, websites, etc.) from which the computer programs may be accessed. Thus, the directory may contain a searchable list of computer programs.

Exemplary computer programs may perform actions of a "Book Seller" or "Payment Processor", "Shipper", etc. Other exemplary service providers may provide programs that enable "smart car services" or "medical services", etc. FIG. 6 shows a few exemplary entries in the proposed directory of programs.

The column titled "Program Name Matching" represents the name of a computer program. The column title "Overall Service Description" represents a general phrase describing the service provided by the named program. The "User Info List" column provides a list of all the user data attributes that will be required from the user for the provisioning of the service if it is requested. It should be noted that proper subsets of these user data attributes are to be provided to the different computer programs that are required to deliver the service to the user. That is, none of the individual programs, including the program provided by the online service provider from whom the user initially requests the service (e.g., the bookseller), is to receive all of the user data attributes included in the "user info list" of FIG. 6. The latter is further discussed below.

It is envisioned that the directory is organized as to enable online searching by the database processor. For example, the column "Program Name Matching" may be organized as a searchable data structure, enabling the database processor to efficiently search and verify the existence of an entry, i.e., a computer program, in the directory. The column labeled "Name & Address of Supplier" is meant to describe the name of the supplier and its online locations, e.g., IP addresses, website addresses, etc., from whom the named computer programs may be obtained. It is envisioned that users may search the directory to find computer programs, e.g., by names of suppliers.

Searching and discovering programs in the directory further implies that a user may state searchable attributes, e.g., find a program enabling buying books. For example, assume a program named "Book" in the directory. It may have associated search attributes such as "buying a book", "cheap books", etc. The column "Search Attributes" in the table of FIG. 6 is intended to convey this notion.

We will also have occasion for computer programs to find "matching" names or other identifiers of computer programs in the directory, e.g., given a name of a program, N, find a computer program in the directory whose name matches the name "N". Thus, we assume that the directory contains entries that contain names or other identifiers of computer programs. The column "Program Name Matching" in FIG. 6 is intended to convey this notion.

In practice, all the various kinds of search mechanisms described above may be combined using Boolean connectives such as AND, OR and NOT. Thus, e.g., find a program with name N, supplied by supplier-3, with attributes "buying books", etc.

A user may search the directory, find a program and may download the program to his user computing device. When seeking service from a service provider, a user may ask the database processor to initiate a session and inject the discovered program into the PL list of the data store of the session (FIG. 3). Alternatively, the user may take actions or issue commands when searching the directory that cause the database processor to create a session and inject the discovered computer program into the PL list of that session. We use the phrase "user device causes the injection of a computer program" to denote either of these embodiments.

To obtain a service or product or otherwise perform any online transaction, a user device issues a request to the database processor. The request causes the database processor to initiate a session, create one or more virtual machines, say VM1, VM2, etc., and initialize the TL and PL lists in the data store in the session (FIG. 3). Note that initially the TL and PL lists are empty. The user device causes a name of a discovered program to be injected into the list PL.

The database processor is further configured to begin monitoring the list PL for names of programs as described later. If a name is found in the list PL, the database attempts to find one or more computer programs in the directory whose names match the name inserted into the PL list.

Since the database processor is monitoring the PL list, it may find one or more computer programs in the directory whose names match the name that was caused to be injected by the user device.

The database processor fetches the one or more matching programs in the directory and inserts each such program into one virtual machine in the session and requests each virtual machine to execute the injected program. As the injected programs begin execution in VM1, VM2, they may produce output. As will be shown later, the output of such programs is generally constrained to be of two forms: tokens that contain encrypted data and the names or other identifiers of computer programs. The names or other identifiers are in the clear.

The database processor is configured to store the (encrypted) tokens that may be outputted by a program executing in a VM into the TL list of that session. Any names of programs outputted by an executing program in a VM are stored in the PL list of that session.

We may thus state a monitoring condition that specifies operation of the database processor:

[Monitoring Condition, MC]. The database processor searches the PL list in each session for the names of computer programs and finds computer programs in the directory whose names match the name(s) in the PL list.

For example, consider a computer program in the directory whose name is "P", i.e., Program: Name="P"

Now suppose PL contains the name "P". The matching condition in this case would be satisfied.

When a program executing in a VM terminates its execution, the program and the VM in which it executes are both cleared. When all VMs in a session have been cleared, the session is terminated.

The above process of monitoring the program list, creating sessions and VMs in which programs run and produce outputs that populate PL and TL, etc., continues until no new matches can be found using the MC condition. We may encapsulate the above described process by the following method denoted Method RM:

1. Receive a user request. Create a session and its data store containing the lists PL and TL.
2. User causes the name of a program to be injected in PL.
3. The database processor runs the monitoring process using the condition MC.
4. If successful matches are found, the matched computer programs are fetched from the directory, each program is inserted into a VM that is created for this purpose and the VM is configured to execute the inserted program. The programs may operate on the data in the TL list. Their outputs may comprise names of programs that are inserted into the PL list, or tokens that are inserted into the TL list.
5. A name in the PL list that has been matched against the contents of the directory is removed from the PL list so that duplicate matches do not occur.
6. If a program executing in a VM finished execution, the VM is cleared.
7. Repeat steps 4, 5 and 6 until the PL list becomes empty.
8. Clear the session.

Figure 7:
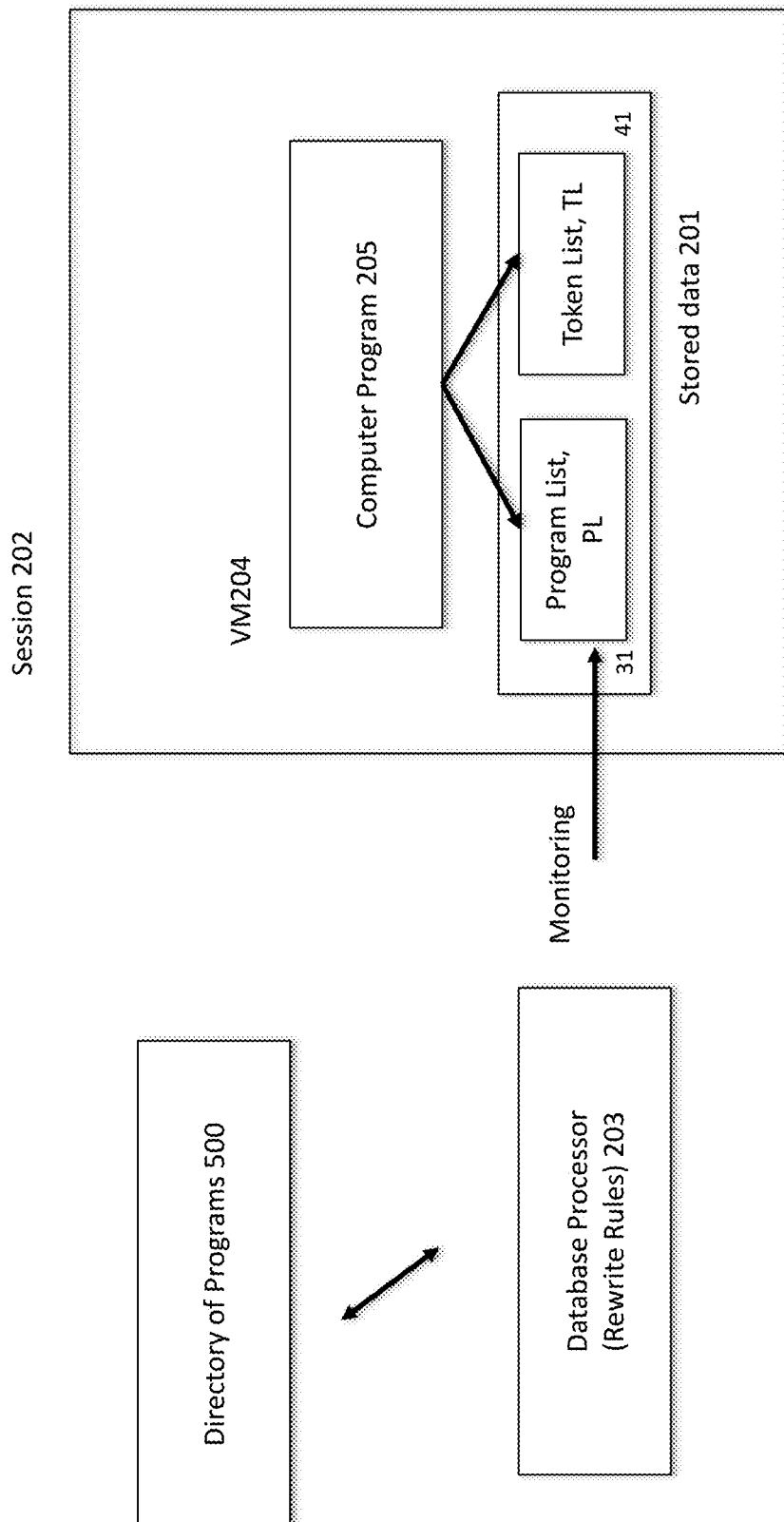
FIG. 7 shows the working of the database processor with respect to a single session containing a single VM.

Thus, the above operations of the database processor for a single session may be depicted as shown in FIG. 7. The session object 202 contains a VM 204 executing a program 205 operating on and storing tokens in TL 41, and outputting program names to PL 31. The database processor 203 has access to a directory server 500. Note that the directory server 500 may also be accessed by user computing devices desirous of searching or discovering computer programs as described above. The database processor 203 is configured to operate according to method RM as described above.

It remains to describe the computer programs executed in VMs created by the database processor. We first describe an exemplary case.

Figure 8A:
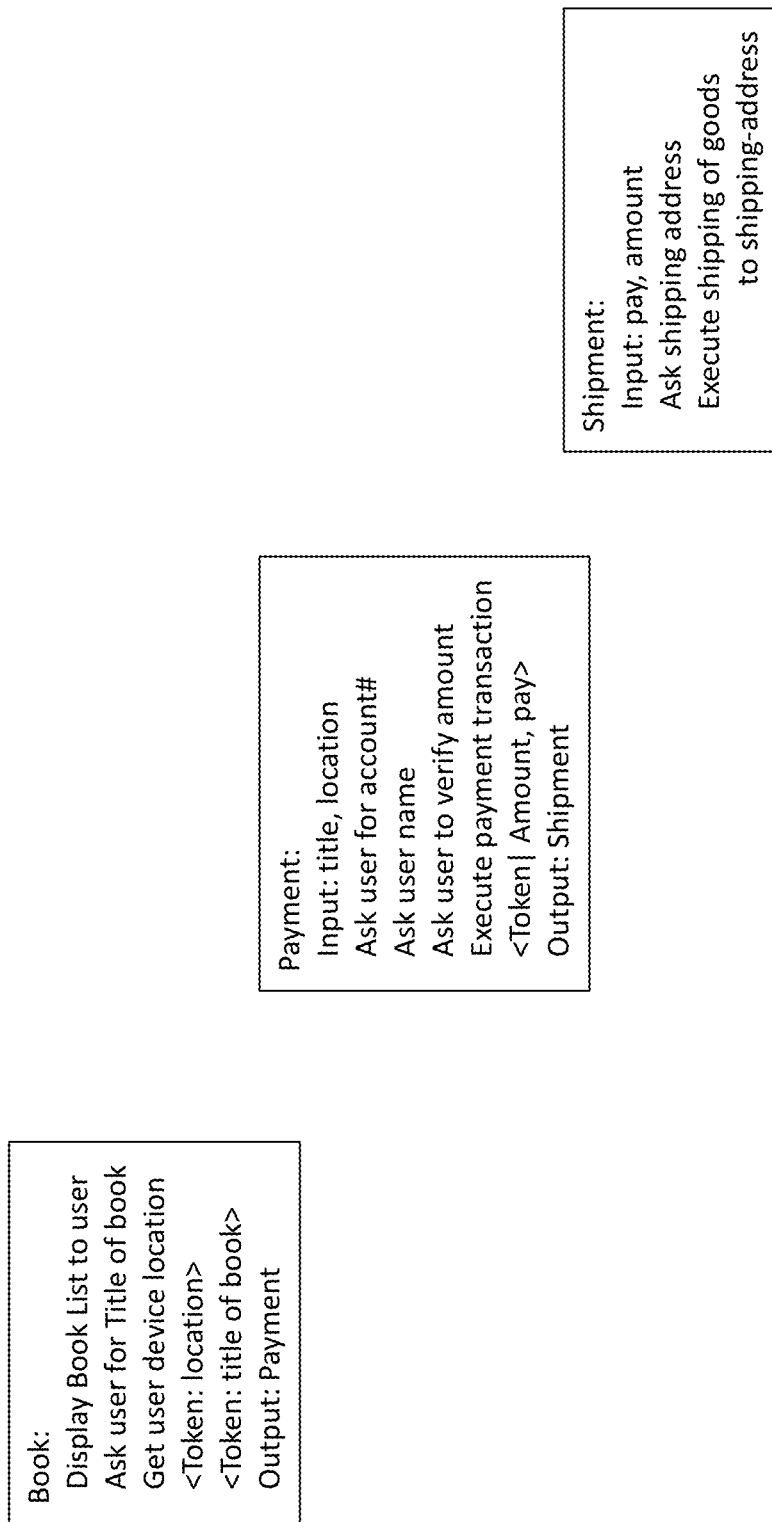
FIG. 8A shows exemplary computer programs.

Consider the three computer programs named Book, Payment and Shipment of FIG. 8A.

The program "Book" comprises instructions that are mostly self-explanatory. Thus, "Display Book List to user" is interpreted to mean that when the computer program executes the indicated instruction, a list of books is displayed on the user device. Note that the data in the list is assumed to be provided, a priori, to the computer program, e.g., the program may be initially provisioned with such a list. (The specification of the user device will be "bound" at run-time—the binding of variables in computer instructions to specific entities is well-known in prior art.) As another example, the instruction "Ask user for title of book" seeks input from user device. Such information is provided by the user at run-time.

The instruction "Get user device location" is an instruction to execute a procedure akin to the one described earlier by means of which sensor data from a user device is accessed.

The instruction "Token: location" bears further description. The instruction is meant to indicate the encapsulation of the data "location" into an encrypted form that is outputted to TL 41 (FIG. 7). Generally, token instructions contain a list of data elements that are to be encrypted and then outputted to the list 41. The encryption key is to be obtained from the user device that initiates the session in which the program is executing, e.g., by using the instruction "get" as a subroutine.

The instruction "Output: Payment" is similar to the token instruction above, except that the name "Payment" is not encrypted.

The program labeled "Payment" in FIG. 8A contains the instruction "Input: title, location" that conveys the instruction to read tokens "title" and "location" from the token list 41 (FIG. 7) and, since the indicated elements are encrypted as per above, to decrypt the indicated elements using a key obtained from the user device again, e.g., using the "get" instruction as a subroutine). Note that program "Payment" creates tokens for "amount" and "pay" that are stored in encrypted form in list 41 (FIG. 7). Furthermore, whereas the program acquires the data "user name" from the user device, it does not create a token for it. This is a design feature of the program specification language described herein, i.e., data acquired or computed by a program may not be, optionally, outputted.

The instructions of program "Shipment" may be similarly described. It is to be noted that "Shipment" does not create any tokens and does not have any "Output" instructions.

FIG. 8B summarizes the new kinds of instructions shown in the exemplary program of FIG. 8A along with their semantics.

Given the exemplary descriptions above of the computer programs, a specification language for computer programs suitable for the purposes of this invention may be taught. The language in question consists of programming instructions similar to most conventional programming languages with the exception of the new instructions "token", "display", "get", "ask", "output" and "input" whose general operations have been described above and which may be implemented using conventional means of subroutines, encryption and decryption.

The instructions "get" and "ask" that obtain information from user devices have an additional functionality as follows.

The execution of both instructions is monitored by the database processor. Such monitoring may be enabled, e.g., by ensuring that both instructions, when attempting to access a user device, are configured to first access the database processor and the latter accesses the user computing device. That is, the database processor mediates the access requests from "get" and "ask" to the user device.

The monitoring of the "get" and "ask" instructions is further configured to ensure the following two conditions.

1. The informational attributes asked of the user device by "get" and "ask" instructions are contained within the specified "User Info List" associated with the service (cf. FIG. 5).
2. No single computer program may ask and obtain ALL of the informational attributes from the user device.

The above two conditions compel service providers to provide services that utilize more than one computer program and limit the totality of information that a single computer program may receive from a user device. The above two conditions, along with the actions of encrypting the identifiers in the token list and the termination and clearing of the VMs and the session object constitute the trust model provided by the database processor to the user community.

The database processor operates in a manner as to preserve the trust model. In this sense, the latter represents a contract between the user community and the database processor, i.e., the trust model specifies the meaning of the phrase "user data privacy", the contract being enforced by the database processor.

Figure 9:
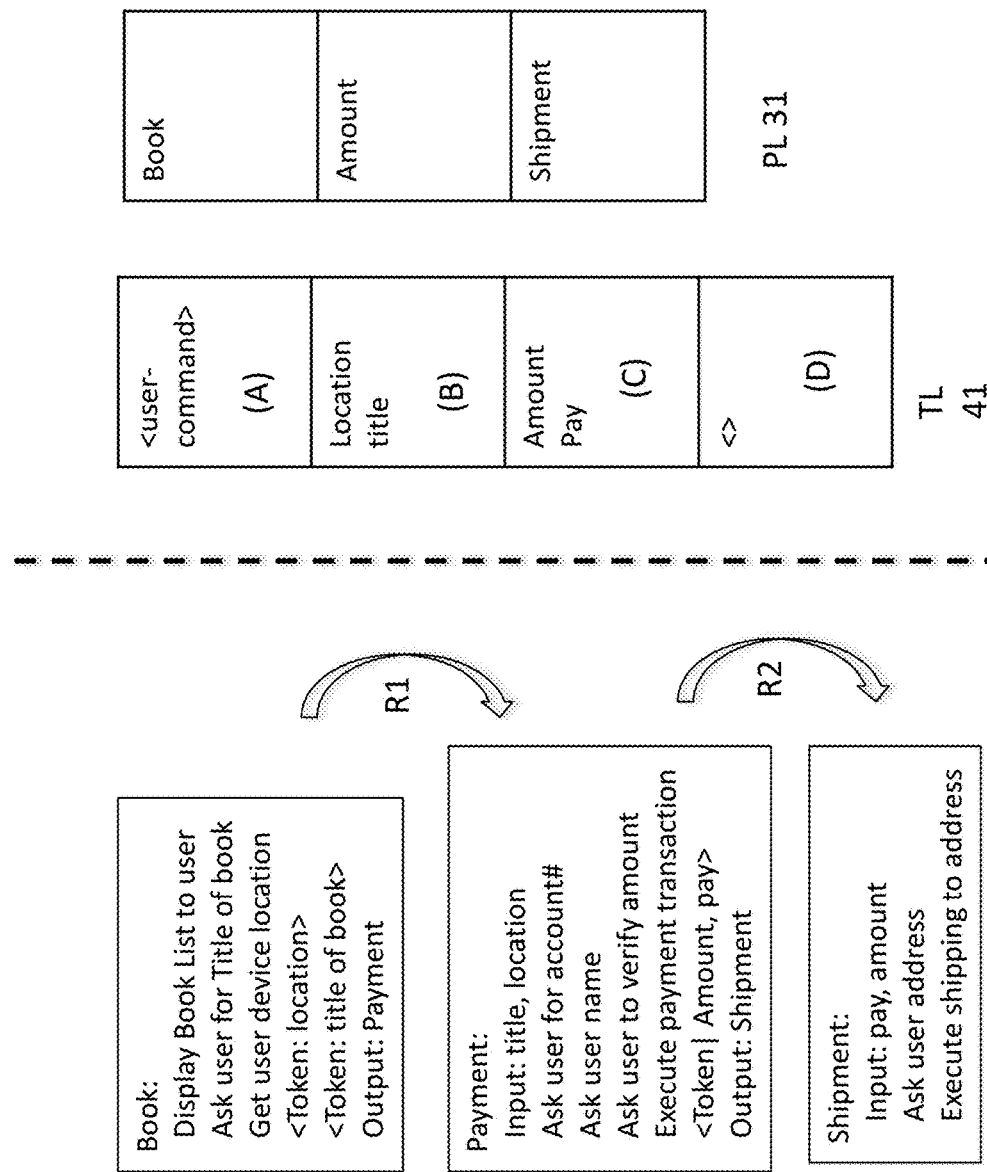
FIG. 9 shows an exemplary rewriting of the programs of FIG. 8A implicit in the operation of the database program.

The operation of the database processor may now be further described in FIG. 9 and as follows with respect to the programs shown in FIG. 8A.

The user device issues a request to the database processor that establishes a session and begins monitoring the PL and TL lists. The user device injects the program named "Book" in the program list. The database processor monitors the program list PL, attempting to find matching entries in the directory. When it finds a successful match, i.e., condition MC is satisfied, it executes method RM.

Execution of method RM causes the creation of a VM in which the program named "Book" begins execution. The output of the program, namely the tokens "location" and "title of book" are stored in TL in encrypted form, and the string "Payment" (in the clear) is stored in the PL.

The program "Book" terminates and the database processor terminates the VM. The monitoring process continues since the PL list is not empty, i.e., it contains the name "Payment". The monitoring now finds a match between the directory entries and the name "Payment" in PL.

The database processor, since it has found MC to be satisfied, creates a second VM in which the program named "Payment" begins execution, producing tokens "amount" and "pay" (in encrypted form) in TL and the clear string "Shipment" in PL. After the program "Payment" concludes, its VM is terminated.

Since PL is still non-empty, the monitoring by the database processor continues and finds a successful satisfaction of MC, whereby a VM is created to execute the program named "Shipment" operating on tokens "amount" and "pay". This VM is also terminated when "Shipment" concludes its execution. No names of programs are outputted by the program "Shipment". Thus, the list PL becomes empty and no more matches are found. The database processor may terminate and clear the session.

Technical Explanation of the Database Processor

A technical explanation may be provided of the working of the database processor. To receive service provisioning from a service provider, a user device injects a computer program into a computational environment where the computer program may execute. The running of the computer program is controlled in the manner in which it asks for user data or produces output, e.g., the output of the computer programs is constrained to be either tokens written to the token list or names or other identifiers of computer programs written to the PL list.

Furthermore, the computer program rewrites itself, in the sense of a Post Rewriting System [cf. Emil Post (1947), *Recursive Unsolvability of a Problem of Thue*, The Journal of Symbolic Logic, vol. 12 (1947) pp. 1-11. Reprinted in Martin Davis ed. (1965), *The Undecidable: Basic Papers on Undecidable Propositions, Unsolvable Problems and Computable Functions*, Raven Press, New York, pp. 239ff]. That is, a computer program S rewrites itself as computer program T given the data contexts "u" and "v", known as pre- and post-contexts, respectively. The notation $uSv \rightarrow uTv$ denotes the above notion.

An implementation of such a rewriting system thus retains no "memory", since the state uTv may not be rewritten as uSv, i.e., the "arrow" may only be traversed from left-to-right and not in the backwards direction and that the pre- and post-contexts, i.e., the "u" and "v" remain unchanged in the left and right-hand sides of the above notation.

As will become clear momentarily, we will associate data elements in the TL list (41, cf. 7) with the pre- and post-contexts, i.e., the "u" and "v" in the above notation. We will associate computer programs denoted by the upper-case letters such as "S" and "T", etc., with names of programs in the program list PL (31, cf. FIG. 7). Thus, the notation "uSv→uTv" may be interpreted as "if the program S operating on input "u" produces output "v" then S may be rewritten as T (with the same input and output data contexts)".

In the present invention, computer programs or apps, provided by e.g., service providers, are injected by a user device into a computational environment. The environment generates a session with virtual machines for executing the injected computer programs, with each computer program being executed in its own virtual machine. Assume an injected computer program, say S, is provided with input "u". S executes, i.e., runs in the virtual machine, and produces output, i.e., token, "v" and the name of a program, T. The output (and input) elements are associated with the session and not the virtual machines in the session.

The session, at this juncture, contains the data "u", the data "v", and the program S. The computational environment terminates and clears the program S and its associated virtual machine and accesses the directory to get a program, say T, which is injected into the session. The session now contains the program T and the contexts "u" and "v". We may thus represent the above operation of the computational environment by saying that the computational environment rewrites S as T using the rule "uSv→uTv". Given the exemplary programs shown in FIG. 8A, we may describe the working of the database processor as the rewriting implicit in the following pair of Post rewriting rules. Note that "< >" denotes the empty context.

< >Book<title><location>→
< >Payment<title><location>
<pay><amount>Payment< >→
<pay><amount>Shipment< > wherein the database processor is provided a suitable directory containing programs Book, Payment, and Shipment. FIG. 9 shows a pictorial rendition of the rewriting process by the labels R1 and R2. Additionally, FIG. 9 shows lists TL 41 and PL 31 containing the indicated contextual elements.

The preceding paragraphs have described a process R1 (FIG. 9) in which a first VM, VM1, is created for the execution of program named Book. The output produced by this program is used by the database processor as matching criteria to locate a second program "Payment." The database processor then creates a second VM2, causing the execution of the program "Payment" in VM2. The causality relationship between the programs "Book" and "Payment" is referred to as a rewriting operation encapsulated in the above descriptions as represented by a rewrite rule R1 of Post logic.

Similarly, the operation R2 denotes the rewriting of program Amount as program Shipment and the rewriting is shown as label R2.

It is to be noted that the rewriting operation is not explicitly described or contained in any component of the database processor. It is implicit in the operation of the database processor, i.e., it is a side-effect of the monitoring condition and the method RM by which the database processor operates.

Thus, condition MC and method RM executed by the database processor serve to describe, implicitly, the operation of program rewriting. Such implicit working of the rewriting process is by design. Since the rewriting process is never declared explicitly, it is never available for access by third parties, and hence it may not be used to discern the information that links different data elements together.

Illustrative Embodiment

Figure 10:
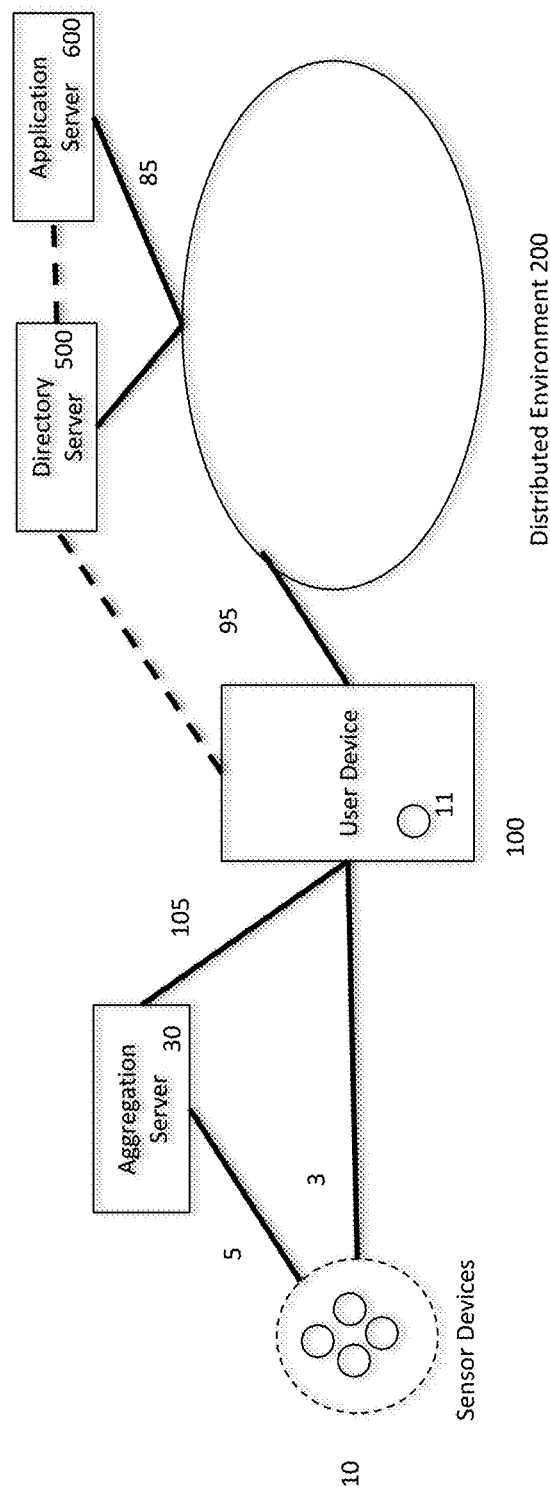
FIG. 10 shows an exemplary system architecture for an illustrative embodiment.

We now provide descriptions of an illustrative embodiment of the present invention (cf. FIG. 10).

Various sensor devices 10 (FIG. 10) may be located in an environment also containing a user device 100 that may contain one or more (internal) sensor devices 11. The devices 10 may be in association with the user device 100 by means of link 3. Alternatively, they may be aggregated via link 5 to a server 30 that is associated with the user device 100 via link 105. The user device 100 is connected to the distributed computing environment 200 via link 95. It may also have access to the directory server. The database processor program described above (203, cf. FIG. 3) runs in the environment 200.

The environment 200 is also linked to a directory server 500 and an application server 600. The latter may also be optionally connected to the directory server.

The database processor creates session objects and VMs, etc., as described above. These are not shown in FIG. 10 since they have been described above and shown in FIG. 3.

We consider an application which enables the user to buy a book online, pay for it and arrange its shipping. The entire process appears as an end-to-end or unitary transaction to the user, though it may be carried out by multiple interacting entities, i.e., computer programs supplied by various providers. The user utilizes his user device and provides information, e.g., title of book, payment, etc., as needed. Some information, e.g., location, may be gleaned from sensors in his device. All information is provided to a database processor operating in a manner as to preserve the user's information in the sense that the individual components of the unitary transaction may not be linked to derive an overall knowledge about the user. Furthermore, the individual components of the unitary transaction that receive user information are computational entities that are created and cease to exist to carry out a computation and then cease to exist.

Service providers using application servers create computer programs offering various services to users of user computing devices and smart devices. Smart devices generally refer to devices containing one or more processors, one or more network interfaces and one or more sensors to sense environmental indicia from their surroundings. Examples of smart devices include smart appliances, smart vehicles, and so on. A directory server is populated with the computer programs so created and offered to consumers. A consumer using a user computing device, e.g., a smart phone, browses or searches a directory server 500 and discovers a program enabling it to buy books online. (For example, the program may be advertised as preserving user data privacy.) The user device downloads and launches the program, perhaps later.

Figure 11A:
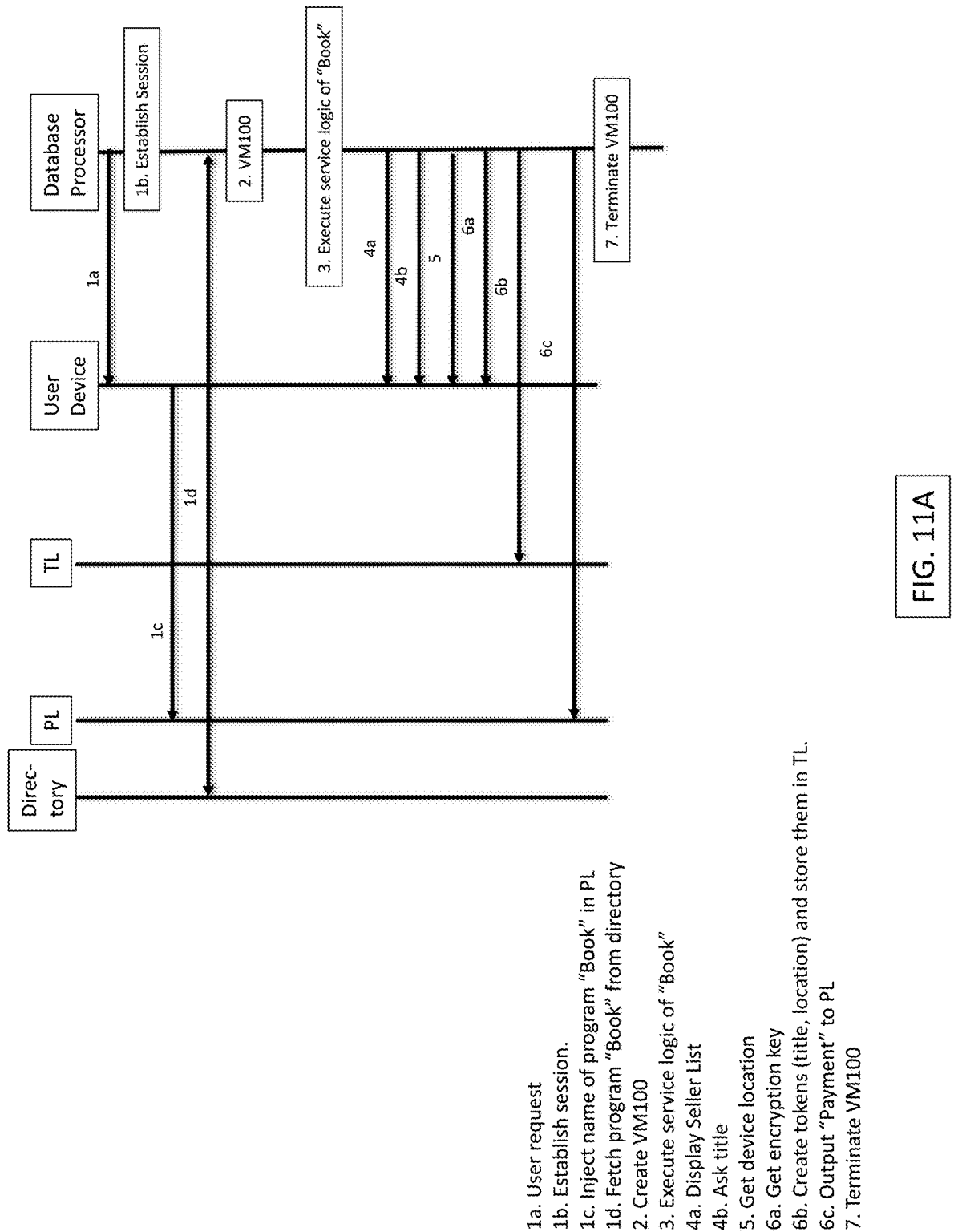
FIGS. 11A, 11B and 11C depict details of the operation of an illustrative embodiment.

FIG. 11A depicts the situation wherein the user device has selected a computer program. It issues a request (step 1a) to the database processor to establish a session (step 1b) and causes the selected program's name, Book, to be stored in PL (step 1c). In step 1d, the database processor fetches the computer program "Book" from the directory. As described above, this causes the database processor to create a virtual machine VM100 (step 2) that executes the logic of program "Book" (step 3). The execution results in a list of books being displayed and the user supplying the title of a (selected) book to the program (steps 4a and 4b). The program also obtains the location of the user device from the device's sensor in step 5. (The details of this acquisition process have been described above.)

Next, in step 6a, the program asks for encryption keys from the user device and, in step 6b, creates tokens for the data elements "title" and "location". The tokens are stored in TL. In step 6c, the program outputs "Payment" to PL. Program "Book" ends its execution, thus VM100 is terminated.

In step 8a (FIG. 11B), the database processor finds "Payment" in PL and, in step 8b, fetches the program "Payment" from the directory. In step 9, it creates a virtual machine VM200. In step 10a, the program begins execution and in step 10b reads tokens "title" and "location" from TL. In step 10c, it requests decryption keys from the user device to decrypt the tokens "title" and "location". Step 11 leads to the acquisition of payment information from the user and its processing in step 12. In step 13a, the program fetches decryption keys from the user device and in step 13b creates tokens "Pay" and "Amount" and stores them in TL. In step 13c, the program outputs "Shipment" to PL.

The program now terminates execution, causing VM200 to be terminated.

Figure 11B:
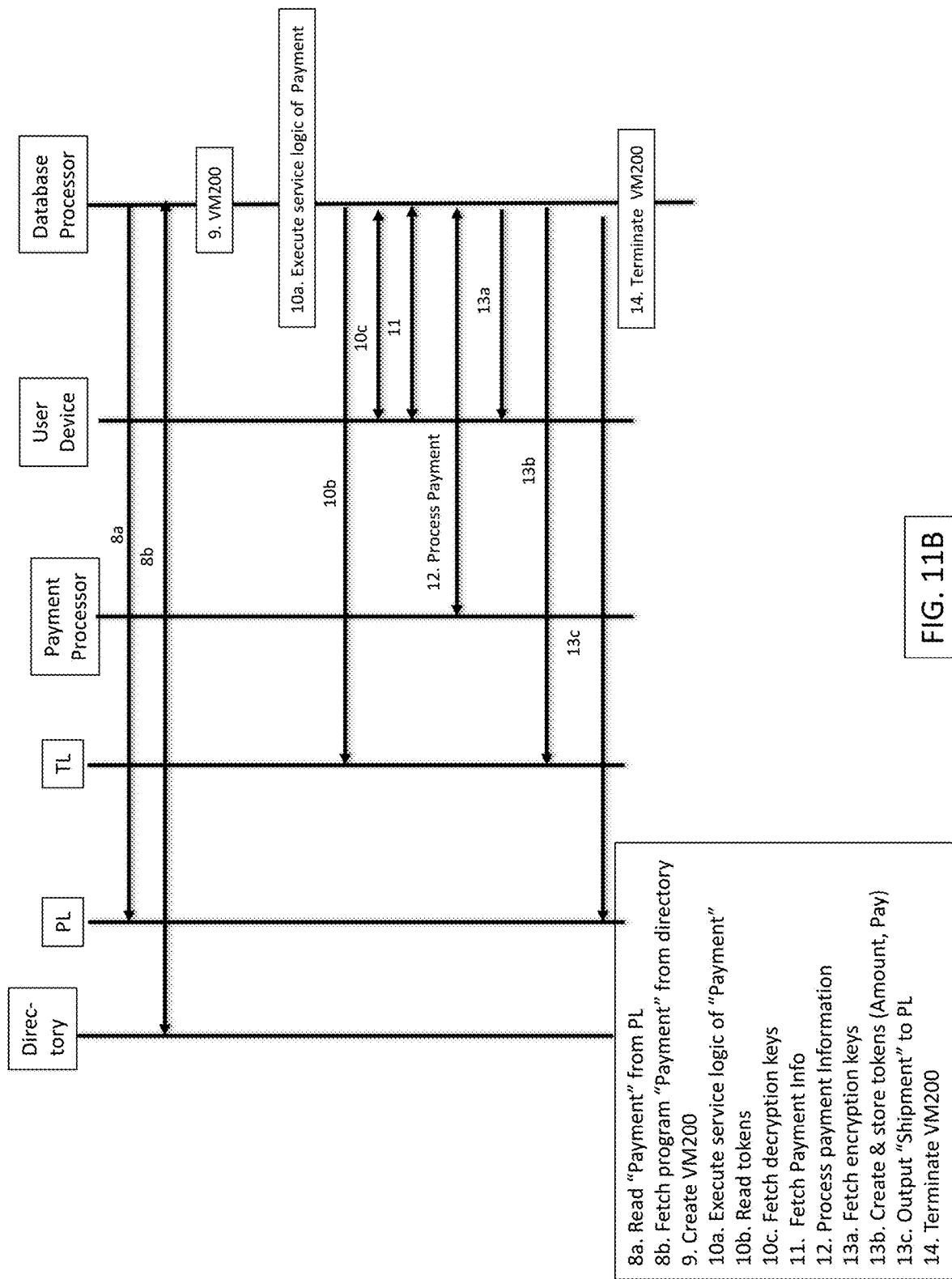
Figure 11C:
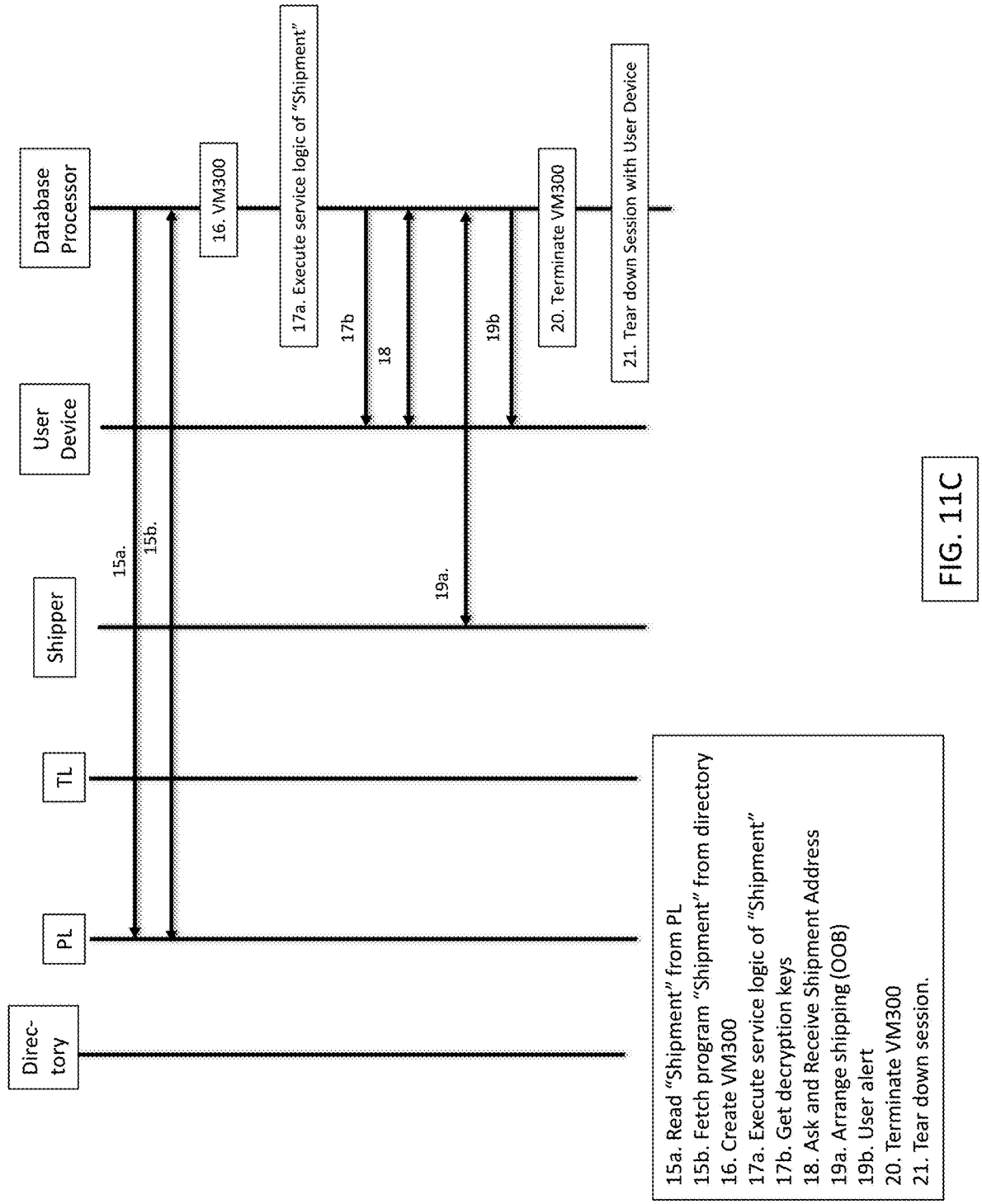

FIG. 11C similarly describes the execution of program "Shipment" in virtual machine VM300 at the conclusion of which no output is provided to PL.

It is important to note step 19a "Arrange shipping (OOB)" wherein the program "Shipment" communicates the address of the user to the shipper. The abbreviation OOB (Out-of-band) stands for a communication that is considered to be "special" in the sense that it communicates user data to an external entity.

The database processor flags all communications in which data obtained from a user device is communicated to an external entity. The database processor may then follow up a flagged (OOB) communication with an alert to the user device. Step 19b shows the alert to the user device generate by the database processor. That is, the database processor generates an alert message to the user device whenever it detects an output in the clear relating to a user provided informational element.

Continuing with FIG. 11C, since no output to PL is produced by "Shipment", the PL list becomes empty. Furthermore, Shipment concludes its execution. Thus, VM300 may be terminated and the monitoring process does not find any new matches. Thus, the session may be cleared. In this sense the data elements, i.e., contents of the lists PL and TL are ephemeral.

We have thus illustrated that user information provided during the provisioning of the overall service to the user does not result in any of his information being retained in the system. This implies, for instance by referring to FIG. 2, that the linking of user information from different components of an overall service provisioning infrastructure is not possible in the invention described herein.

Skilled readers will understand that many variations of the above decentralization of the user experience are possible in which various service providers may provide components of an overall service.

An aspect of note is that the programs run in the database processor in virtual machine environments, write encrypted information into the respective lists in the data store using encryption keys from the user device. Thus, no other process can read the data in the lists and construct an integrated user profile. Moreover, as the programs terminate, no state information is left in the data store.

It is, of course, possible for a service provider to retain certain information acquired because of the user receiving an overall service. For example, the Shipper may record the address to which a shipment was delivered. But the name of the consumer is not known to the shipper.

Thus, the use of an out-of-band communicating process may reveal fragments of user data to one or more service providers. The present invention envisions that such out-of-band communications are highlighted by the database processor to the user. Thus, the user is made aware of the possible revelation of fragments of his data to a service provider.

Whereas the above embodiment has assumed that the overall service (e.g., buying a book online) is effectuated by multiple interacting entities, in other embodiments a single provider may provide all the components of the service (for example, by providing all the necessary computer programs). This does not limit the present invention since the execution of the computer programs uses a system that preserves user data privacy as described above.

In this respect, it is appropriate to mention, and the invention described herein envisions, the use of block-chain systems to implement services as smart contracts provided by multiple entities. A smart contract may be visualized, in abstract terms, as a computer program of a certain form, operating on data stored in the ledger(s) of the block-chain system. That is, the ledgers are akin to the data store and the smart programs are akin to the computer programs described herein. In this sense, the rewriting process that underpins the operation of the database processor may be viewed as providing a component of the operating system for smart contracts.

Skilled practitioners would have noticed that the exemplary descriptions of the database processor posit a non-determinism in its operations. That is, the list PL may contain multiple names of programs or a name in PL may match multiple program names in the directory.

The inventions described herein envision overloading the "Output" program instruction described above as follows. We may use the Output statement not only to specify names of programs but we may additional attributes such as names of suppliers and various program attributes that narrow the searching of the directory.

Other Illustrative Embodiments

While the present exposition has concentrated on the Seller-Shipper-Payment service experience, many other examples of service experiences exist that may benefit from the inventions described herein. For example, autonomous vehicles such as smart cars are expected to contain many internal sensor devices that will report various kinds of data. The present invention envisions that users of such cars can derive benefits from the techniques described herein wherein sensor data from cars trigger computer programs (provided by service providers); such programs may then use the system and methods described herein to offer services to such cars without imperiling the owner's data privacy.

As another example, user's physical activities may be monitored and analyzed by smart devices worn by a user or by devices that are near a user, e.g., installed in exercise machines. Activities may then be analyzed, rated and scored and the data from such analysis may be communicated to health care providers or insurance providers.

User Data Portability

In traditional telecommunication systems, it is common for consumers to own their telephone numbers. A consumer may retain his phone number when switching from one service provider to another. The change was necessitated by regulations and is known as local number portability.

It is possible to envision several reasons, including legislative, that may require a user to own his data and be able to switch providers, bringing his user data from the old to the new provider. Personal medical records provide a compelling example. A consumer may have his medical data stored on his user computing device, or in a private storage system accessible to service providers upon presenting requisite credentials that are only available from the user device. A consumer may then request medical services that access his medical data by recourse to his user device.

The term social graph is often used in social networking examples. The term refers to data comprising a user and his friends and followers. It may come to pass that portability of social graphs may be required or mandated. In such situations, a user can switch from one service provider to another, taking his social graph with him, in a sense described below.

Consider the current situation in online networks today wherein consumers trust certain service providers more than other service providers. For example, many consumers trust Google with their user name and password credentials. One assumption made by consumers supporting this behavior may be that Google's services are more secure and less likely to be penetrated by malicious parties. The evidence for this assumption is the facility supported by many service providers that allow consumers to access their accounts using Google credentials. Thus, a user may use his Google credentials to login into Twitter or Facebook, by way of example.

As a final example, the "winner take all" phenomenon on the Internet is known to create ever more powerful enterprises that offer many services. It may then be envisioned that they may, either voluntarily or under legislative requirement, be required to create a (business) unit or entity that handles user data and provides special handling or legislatively required guarantees. This implies that all the user data must then be under control of the unit and, hence, may be ported from one to another service provider.

We now describe how the subject matter described herein may be used to support user data portability. This can be accomplished by adding the following additional requirement to the descriptions provided above.

We extend the condition MC, described above, as follows.
In addition to matching names contained in the list PL with names of programs in the directory, the user is allowed to state disqualifying matching criteria regarding one or more service providers. Thus, for example, the user may be allowed to state disqualifying criteria, e.g., "no programs from supplier-1 are to be chosen that match a name on the list PL" that modifies the condition MC and, hence, the behavior of the database processor.

Returning to the embodiment illustrated by FIGS. 11A, 11B and 11C, the modification to the MC condition may disqualify programs from a certain supplier to yield successful matches. Thus, the user device never receives any services from programs supplied by the disqualified provider.

Similarly, a supplier may be designated as to be selected by the MC condition.

The various embodiments described herein may offer a variety of advantages with respect to computing technology. Some of these advantages may include the following:

1. User computing devices may be freed from running computer programs, e.g., apps, thus conserving processing resources, power and so on. This may be particularly important in the case of mobile user computing devices such as smart phones where it is important to conserve battery power.
2. Apps may not need to be downloaded to user computer devices. Rather, when a user selects an app from the directory server (500, cf. FIG. 7), he may be provided an option to have the selected app injected into the database processor directly, without the intermediate downloading operation. This frees the user from managing apps on his user computing device. Thus, the user's handling and management of his device is simplified. This also implies that apps on user computing devices need not be updated periodically, thus saving networking bandwidth and capacity. Furthermore, app may be recommended to a user who may then act upon the recommendation without having to download the app to his device.
3. The directory server (FIG. 6) represents a re-architecture of app store technology. The latter is currently used by many service providers. By removing the download and updating functions currently provided by app store technology, we improve and simplify the technology and operation of app stores.
4. By extending the well-known DH algorithm and its look-alikes to securely handle data communications from multiple sensor devices via a single user computing device, we extend and simplify the reach and working of networking protocols to handle the newly emerging technologies of smart devices (such as autonomous cars, smart household appliances, etc.) that make extensive use of such sensor devices. Since DH (and its look-alikes) are used extensively in the industry, such an extension will improve the efficiency, operation and cost of networking protocols.

Certain Illustrative Commercial Embodiments

We provide a few commercial embodiments of the inventions described herein.

Figure 12:
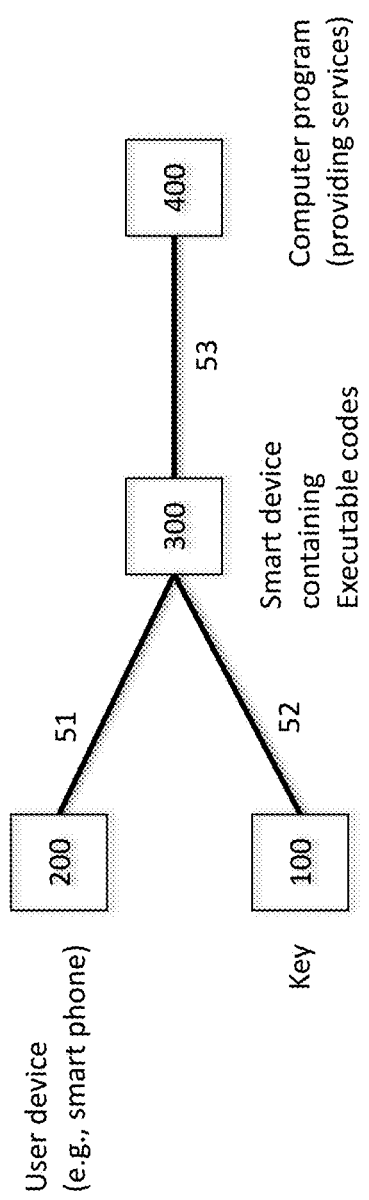
FIG. 12 shows a first illustrative commercial embodiment.

FIG. 12 shows an embodiment wherein a smart device 300, e.g., a smart car, a household refrigerator, or a smart door lock to a home, etc., is configured to provide services to consumers via wired/wireless connection 53. (The use of the term "smart" is intended to denote devices that contain one or more processors which may be configured with executable codes.) The smart device may obtain its executable codes from one or more computer programs 400, the obtaining being pre-provisioned, periodically provisioned, or provisioned on demand. The program 400 may also provision a device, key 100, with executable codes. Finally, a user device 200 may be provided with executable codes by the program 400. Again, such provisioning may be demand-driven or comprise a periodic out-of-band process.

As a commercial example, the key 100 and user device 200 are needed in conjunction for device 300 to provide services. Thus, a smart car 300 may provide programmed services only if the user device 200 and key 100 are used in conjunction since, as shown above, data from the key may not be accessible to the car 300 unless authorized by the user device 200. In this sense, the connections 51 and 52 (FIG. 12) depict the dependence of device 300 on devices 200 and 100, respectively, to provide its programmed services.

In this sense, the use of the key 100 and the user device 200 may be termed as akin to two-factor authorization of programmed services delivered by device 300 and, furthermore, the service is privacy preserving. The privacy of the data gathered by the key 100 and provided to the device 300 is guaranteed by the inventions described above.

Finally, it is an explicit consequence of the present invention that the association between the key 100 and the device 300 is controlled by the user device 200. That is, a different user device, say 500, may establish an association with key 100 and, if successful, invoke the services of device 300. Thus, it is the user device 200 that controls the association between the device 300 and key 100. This allows services provided by device 300 to be ported to different users.

Figure 13A:
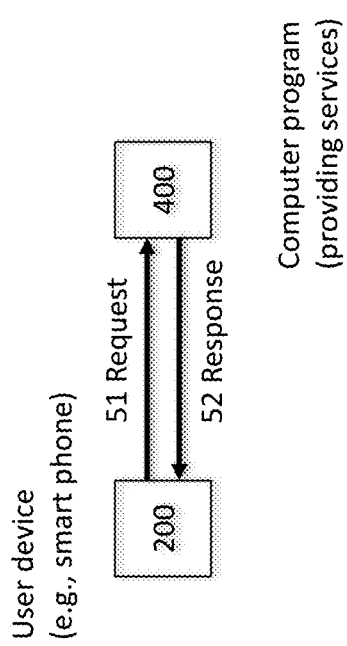
FIGS. 13A and 13B show a second illustrative commercial embodiment.
Figure 13B:
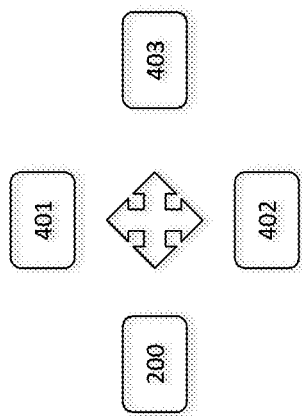

FIGS. 13A and 13B show a different commercial embodiment. FIG. 13A provides an abstract view of service disaggregation compelled by the inventions described herein. A service provider, e.g., online seller of books, is engendered by the dictates of the present invention to disaggregate its service offering so that it is provided by more than one computer program, the more than one computer program interacting between themselves, and the user device being one of the interacting components.

That is, whereas FIG. 13A shows service provisioning 400 as a "black box" operation, FIG. 13B shows the service 400 being disaggregated into the components 401, 402 and 403. (The present invention dictates more than one component.) For example, an online book buying service 400 may be engendered to be disaggregated into components Book 401, Payment 402 and Shipment 403. Furthermore, the interactions between components 401, 402 and 403 must necessarily involve the user device 200.

Thus, the user device 200 becomes a component of the service provisioning process and not simply a device that requests and receives services. The user device, when acting as a component of service provisioning, provides and controls user data that is needed for service provisioning. In this sense, the user device becomes a control component of service provisioning.

Figure 14:
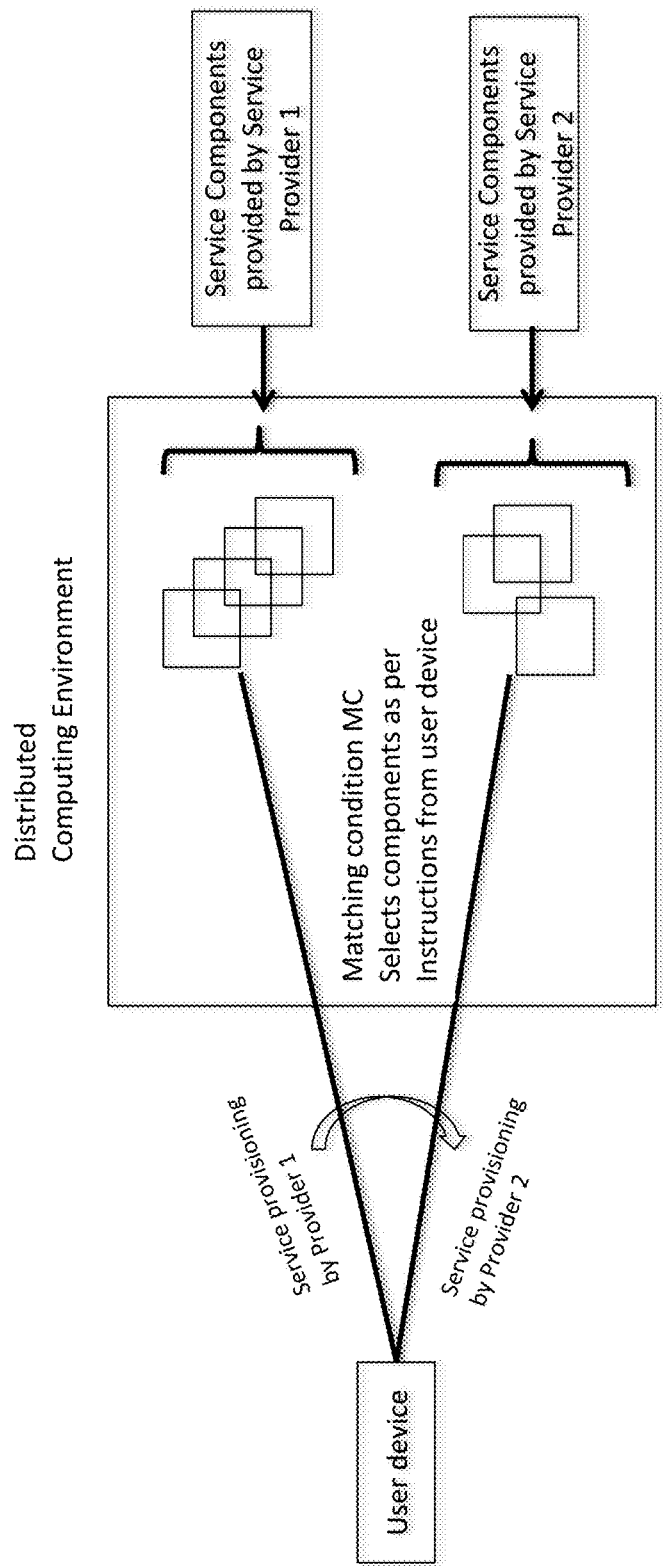
FIG. 14 shows exemplary service portability from one service provider to another.

FIG. 14 shows service portability across service providers wherein a user may port his service from a first provider to a second provider. Such porting is effectuated, as described above, by compelling the service to be disaggregated and then utilizing the user device to choose components that are not provided by the first service provider. This notion of portability of service is made possible because the user device controls the user's data and, hence, may cause the latter to be provided to selective service providers only.

Privacy Switch

We begin with a summary of some aspects of the invention described above and illustrated in FIG. 15A that is a duplicate of FIG. 10. A computing environment 200 may be used to run other selected computer programs, the selection being performed by a service provider or a consumer utilizing a user computing device 100. In some embodiments, the selection may be performed by programmatic means, e.g., by a computer program triggered by one or more sensor devices. The selected computer programs may obtain user data from the user computing device. In one aspect, the present invention describes methods by which the selected computer programs may operate and provide services without compromising the privacy of the user's data.

Figure 15A:
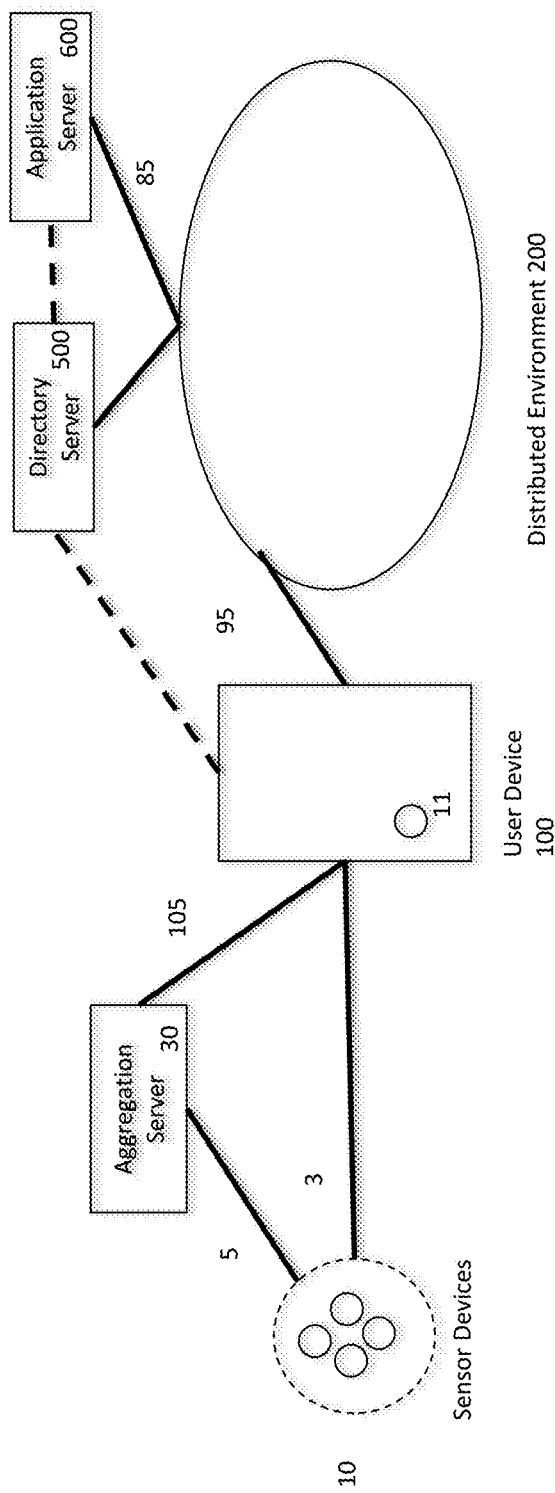
FIG. 15A is a duplicate of FIG. 10.
Figure 15B:
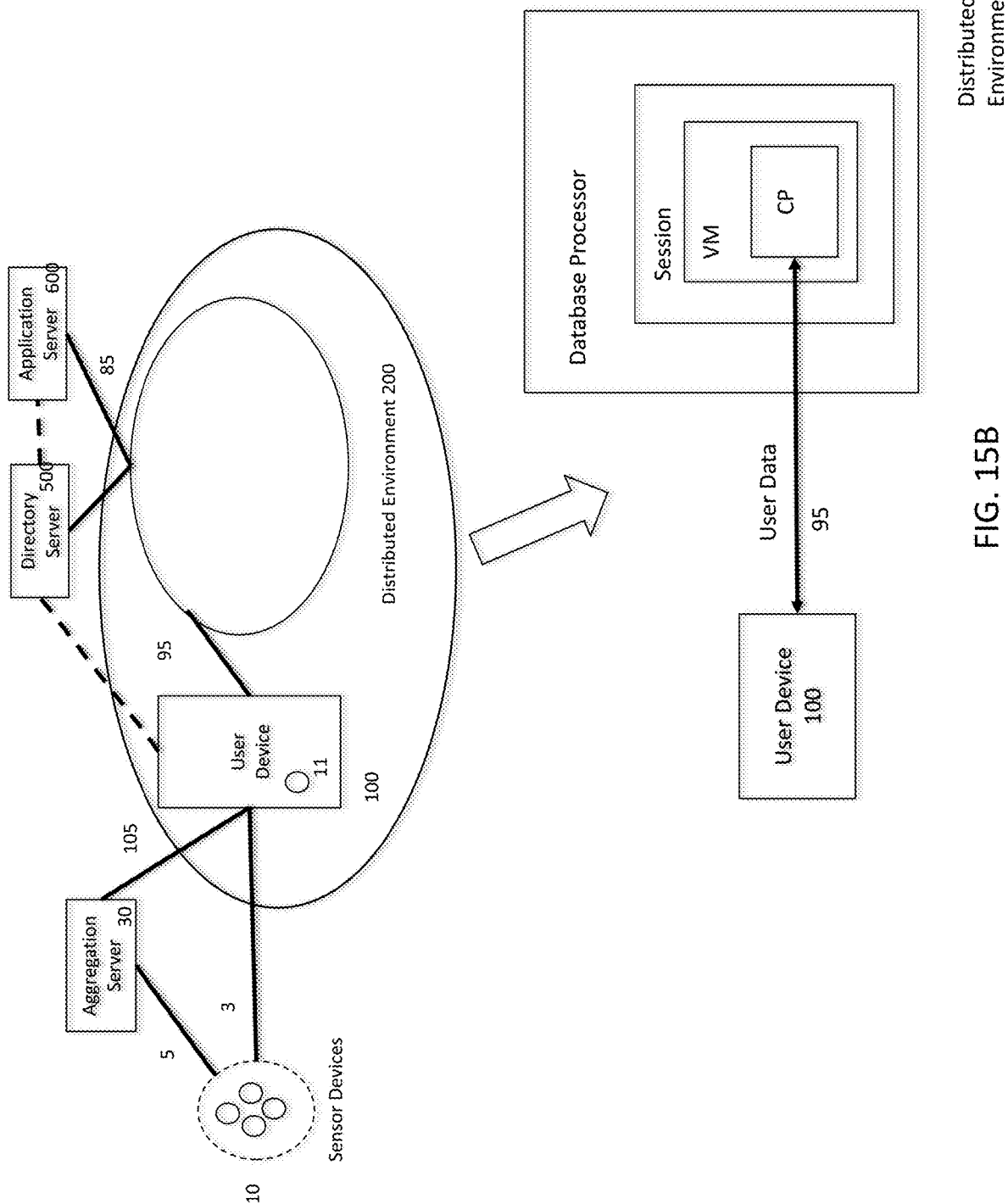
FIG. 15B shows an expanded view of the user computing device 100 and computing environment 200 of FIG. 15A wherein the computer/application program, CP, has been injected into a (distributed) computing environment.

FIG. 15B expands on two elements of FIG. 15A, viz., the user computing device 100 interacting with the computing environment 200 via connection 95. The computing environment is created and managed by a database processor or virtualized OS. The database processor may be asked to create a session object within which one or more virtual machines, VM, may run. An application program may run in a VM; such application programs (or simply, programs) may ask and receive user data from the user computing device 100 (FIG. 15B) for their computations.

We use the phrases "cause a program to be injected into an environment" or "inject a program into an environment" as abbreviations to denote the operation by which a computer program, a user computing device, or a service provider may select and cause an application program to run in a VM in a session created and managed by a database processor or a virtualized OS. For example, a service provider may cause a ride-sharing program to be injected or inject a ride-sharing program into an environment. FIG. 15B shows an exemplary program CP injected into the computing environment 200, interacting with a user computing device 100 via connection 95.

The invention described herein shows that a computer program injected into an environment may provide a service to a user computing device in such a manner that at the conclusion of the service, the service provider does not retain any user attribute information provided by the user computing device. At the same time, the service provider is assured that the user data provided to him is verifiable and accurate. In this sense, the services provided by injected programs are said to be privacy-preserving.

That is, the user computing device and associated computer programs described below operate in a manner that enforces the user's privacy concerns and the data integrity concerns of the service provider whilst delivering products and/or services to the user. The invention proposes a system or arrangement as depicted in FIG. 15C, some of whose details will be further described in the presentation to follow.

Figure 15C:
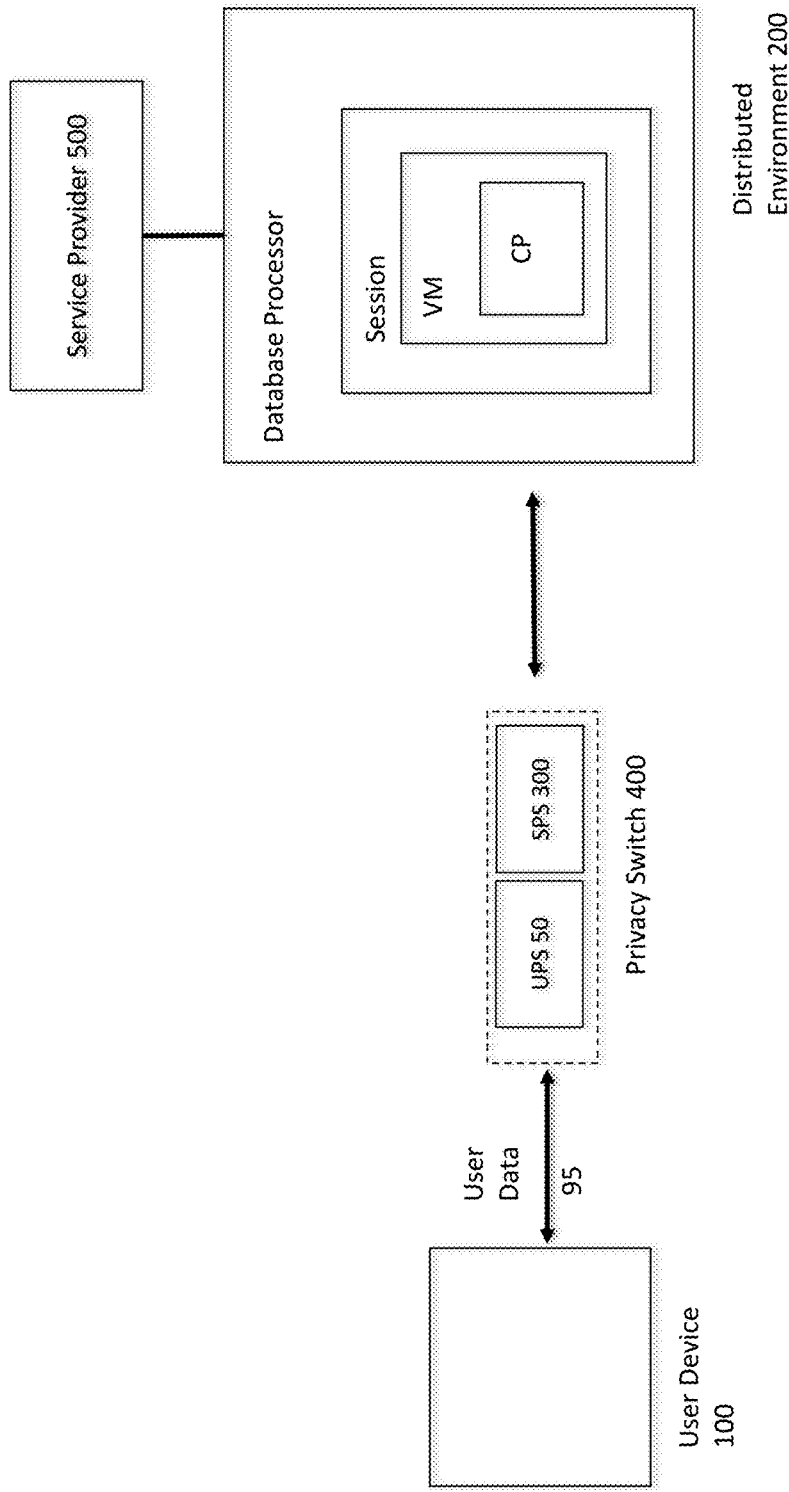
FIG. 15C shows a new logical network element, the privacy switch, intended to provide privacy-preserving services to consumers.

Generally, FIG. 15C depicts the introduction of a logical network element, privacy switch 400, into the arrangement of FIG. 15B. In one embodiment, the privacy switch comprises of two parts, a User Privacy Switch (UPS) 50 and a Server Privacy Switch (SPS) 300. The privacy switch may be implemented as a collection of software entities. In one embodiment, the UPS is implemented as a collection of software programs running in the user computing device 100, labeled in FIG. 15D as UPS 50 and the SPS 300 is implemented in a standalone server complex, e.g., a cloud-based computing environment that, in turn, connects to the computing environment 200. In some embodiments, the SPS 300 may be implemented as a part of the computing environment 200.

The UPS 50 of a privacy switch has two settings, on or enabled and off or disabled, under the control of the user. When set to "on", the UPS along with the SPS act in a way to preserve the privacy of the user during service provisioning as detailed in the following descriptions. When set to "off", the UPS and SPS become non-functional and the user computing device returns to conventional behavior. In the descriptions that follow, the UPS setting is assumed to be "on". Note that a user computing device behaving in a conventional manner may not preserve user data privacy during service provisioning. To avail himself of privacy preserving services, a user may set the UPS to the "on" setting.

In an embodiment of the present invention, the UPS and the SPS execute in virtual machines.

In simple terms, we may then say that a privacy switch PS is a combination of UPS and SPS (FIGS. 15C and 15D) that allows a user computing device to interact with and receive services from a service provider in a privacy-preserving manner when the UPS is "enabled" or set to the "on" position.

We now further describe and characterize the functions provided and the operations carried out by the Privacy Switch (in conjunction with the computing environment created by the database processor or the virtualized OS).

We observe that a service provider being represented by a computer program, provided with user information, may need to process the received user information, the processing extending beyond the operations of copying and saving received information. We consider a few such possible processing needs and observe that they lead to a further categorization of user information as follows.

1. Alias Information: An example of an alias is the common use of usernames chosen by consumers. Service providers use usernames to correlate user provided information with previous historical usage patterns. Example: A user may provide a username or alias, such as @john, that was used by him in the past so that historical transactions may be associated with the current transaction to determine recommendations.
2. Identity Information: A service provider needs to process identity information provided by the user to authenticate the user. Example: Biometric information may be used to authenticate the identity of users.
3. Assertions/Preferences based on Personal Attributes or Historical Data: A service provider needs to verify the accuracy of information provided by the user. As an example, a user may assert that his "age is greater than 21" based on a processing of the user's driver license dataset by a known algorithm. A user may assert that he likes classical music based on processing his historical purchase data by a known algorithm.
4. Approximate Information: Service provider needs to resolve information that only approximates a user's actual information/data. Example: user provides a zip code for his location, but the service provider needs a street address, e.g., to deliver an item to the user.

The privacy switch (400, cf. FIG. 15C) addresses the above identified four needs of service providers whilst assuring privacy concerns of users. The details are made clear in the descriptions that follow. References to "user computing device" in the following descriptions are to be interpreted as referring to a user device 100 that incorporates UPS 50 (cf. FIG. 15C or FIG. 15D).

In one embodiment, the present invention presents methods by which user information viz., alias, identity, assertions/preferences and approximate information, collectively referred to as obfuscated objects, may be presented to a service provider, who may then verify the presented objects. The verifying process yields concrete benefits to the service provider and will be referred to as authenticity, resolvability and provenance, and will be further described later.

Aliased/Username Information

It is commonplace for service providers to use historical usage data of a user, indexed by an identifier such as a username, to customize a user's service experience. Thus, many services provide recommendations and advertisements to users based on such historical data saved from previous visits by the user. Keeping a user's identity or other informational attributes private from a service provider may negatively impact the service provider's capability to personalize the user's service experience.

On the other hand, a username is not the only kind of user attribute information that may compromise a user's privacy. For example, an identifier such as a telephone number can be used to contact the user later. A user's IP address may be utilized to derive a physical location using geographical databases that map IP addresses to physical locations, as taught by prior art.

Therefore, both the user and the service provider have concerns that need to be addressed.

In some embodiments, the present invention provides a solution to the above problem by requiring that 1) user identifiers be known through non-interpretable identifiers, and 2) communications between a user computing device and an external computing environment be mediated by an entity that obfuscates user identifiers and other user attribute information. Since a user may change identifiers at his discretion, any interpretation associated with an identifier will be ephemeral. We will sometimes use the term "alias" to denote non-interpretable identifiers.

In one embodiment, the entity obfuscating the communications between user computing devices in a session is a privacy switch acting in a specific manner described as follows.

Figure 16:
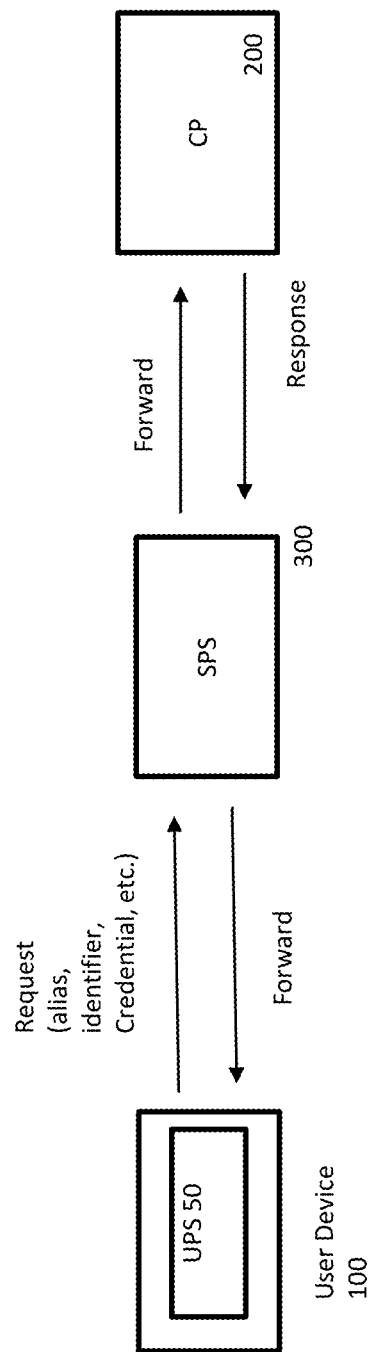
FIG. 16 shows communication paths between the UPS/User computing device, SPS and computing environment 200.

FIG. 16 shows the operation of the arrangement by which the SPS 300 acts as an intermediary for communications between the user computing device 100 (equivalently, UPS 50) and the exemplary computer program CP 200. That is, CP 200 and UPS 50 are in a session created by a database processor. UPS 50 sends a request that is received by the SPS 300 and forwarded to CP. In the reverse direction, data from CP is received by SPS 300 and forwarded to UPS 50. In one embodiment, UPS 50 may use the commonly known approach of "pulling" information from SPS 300.

As will be described later, requests from UPS 50 to the CP 200 (via SPS 300) may comprise various types of service requests, including authentication, credit card transactions and other user attribute information.

We observe that the requirement of obfuscation mentioned above, may be implemented by requiring SPS 300 to assign an identifier to a request received from UPS 50 before forwarding the latter to CP 200. We describe such processing by subsystem SPS 300 as follows.

A user device 100 with UPS 50 is invited or "discovers" (in an out of band process) a service offered by a computer program CP 200. As stated above, we assume that UPS is enabled. User device 100 (equivalently, UPS 50) selects an identifier e.g., "@john", and sends a request (or initiates a dialog), that arrives at SPS 300 that, in turn, creates a second identifier, say "@john123", and forwards the received request to CP 200, replacing the identifier @john with @john123. Thus, CP 200 assumes that the request came from an entity identified as @john123. CP 200 receives a request from user computing device/UPS identified as "@john123" whereas, by keeping an association list (@john, @john123), SPS 300 knows the user computing device as being identified as "@john".

Thus, CP 200 may be in a session with SPS 300 with username "john123". In actuality, CP 200 is in a session with user computing device 100 using the username "@john" since SPS 300 acts as an intermediary or proxy for the user computing device 100.

By maintaining the association list (@john, @john123), SPS 300 may continue to act as an intermediary between the user computing device 100 and CP 200 for dialogs in future sessions. SPS 300 may save transaction data related to user computing device 100 using identifier "@john123" and use it in subsequent requests received from user computing device 100.

Figure 15D:
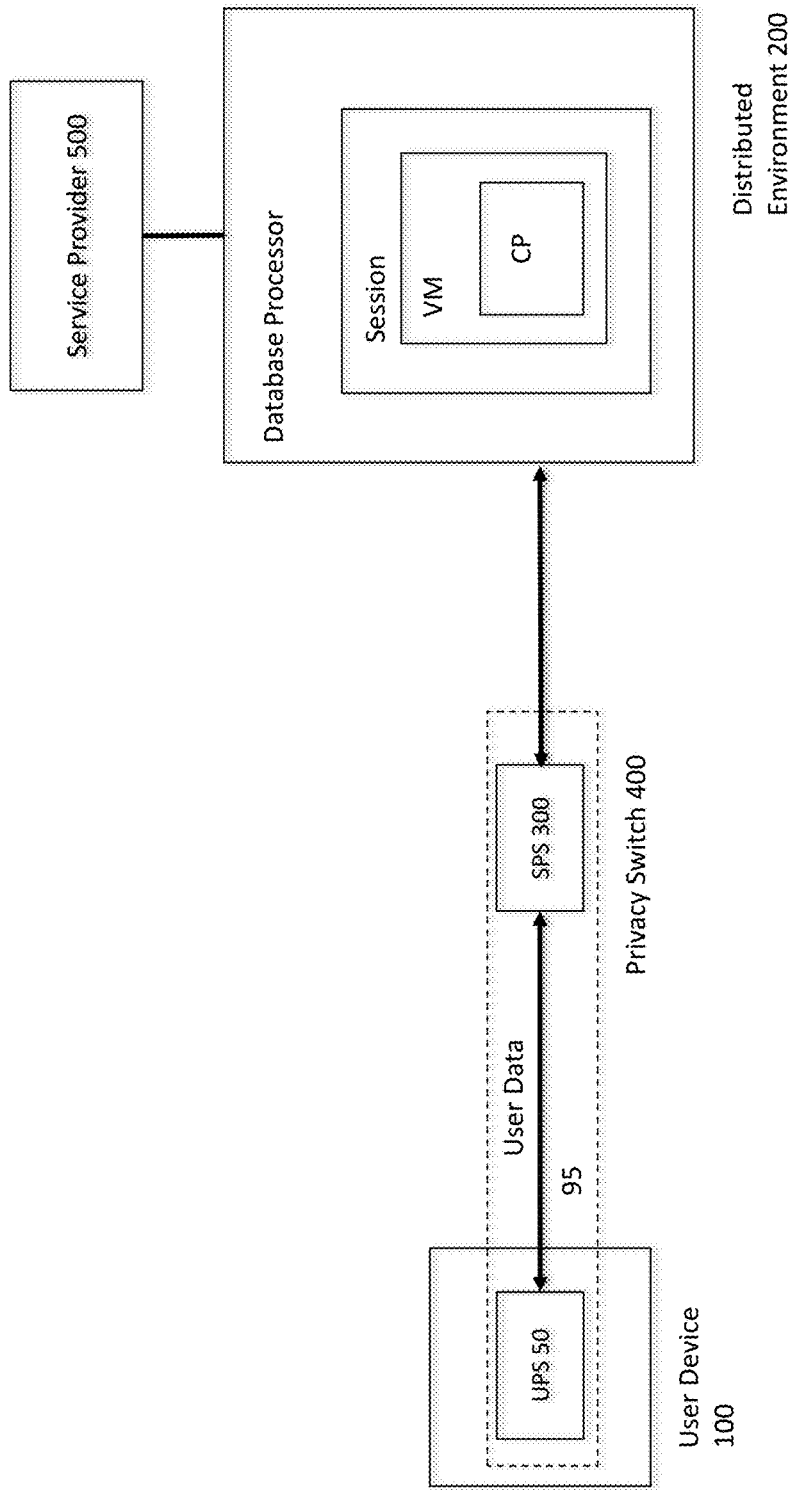
FIG. 15D shows one embodiment of the privacy switch of FIG. 15C.

Such operations of assigning identifiers to user computing devices and maintaining association lists comprising identifiers to preserve user privacy provide one example of operations performed by SPS 300 of FIG. 15D.

The SPS may help the UPS to create another type of association list comprising credentials and usernames which may then be stored and managed by the UPS. In such an embodiment, SPS provisions the UPS with specific algorithms (detailed later) that are used to generate an association list, e.g., (A3, A4), wherein A3 is a cryptographic object called a "credential" and A4 is a username (in the clear) such as "@john123".

An association list comprising credentials and usernames, e.g., (A3, A4), may then be used in various ways, e.g., it may be used by a user computing device to log into a computer program or a website. The latter may then undertake an operation to "verify" the authenticity of the credential A3 (details of which process are described later). Upon successful verification, the user device may be authorized to log into the computer program or website. (In one embodiment, the SPS is used in the indicated verification operation.)

Thus, in such an embodiment, the UPS creates the association list comprising credentials and usernames and maintains the association list, whereas in the previous embodiment, the SPS created and maintained the association list. Using the associated list comprising credential and username, a user computing device may directly communicate with a service providing program, i.e., without using the SPS as an intermediary.

We have thus shown two embodiments. In one embodiment, the user computing device communicates with a service providing program via the SPS, the latter creating and maintaining one type of association list. In the other embodiment, the user computing device creates and maintains a second type of association list with the help of the SPS, but may communicate directly with a service providing program without using the SPS as an intermediary.

Identity Information

Most services available to consumers on the Internet/Web require the consumer to input user identity information. We may categorize identity information as being the subset of user information that uniquely identifies a user. For example, whereas names or addresses may not uniquely identify a person, social security numbers and fingerprints are unique identifiers. Username/password combinations provide another example of identity information that is unique to a user. Since identity information is unique to a user, it merits special attention when considering user privacy.

We propose a method for disclosing identity information that may be used to provide information to a requesting program by a user computing device.

The user computing device converts identity information into a representative dataset that is then encoded as a cryptographic object, called a credential. The credential has the property that it is opaque to all entities. The credential may be verified (in a sense described below) by a computational entity called the verifier. However, the verifier is unable to re-derive the user's identity information.

Thus, a user's identity information may be converted into a credential that may be presented to a computer program. The receiving computer program may request a verifying entity to verify the authenticity of the credential, without knowing any more information about the user. The verifying entity is able to verify the credential without being able to re-derive user information from the credential.

We present details of the method below.

In current practice, a user may register with a service provider to obtain services. The process of registration may entail the user selecting a username and a password that are used by the service provider to authenticate the user. Since passwords may be hacked by malicious entities, it may be advisable to consider cryptographic credentials.

In a current technological trend, biometric information, e.g., fingerprint data, facial image data, etc., has been used as credentials to authenticate a user. For example, mobile or smart phones may use fingerprint data from a user to authenticate him to the device or to one or more service providers. However, users generally do not wish their biometric data to be shared with a service provider because of privacy concerns.

To circumvent this issue, smart phones keep fingerprint data in a local memory of their processor whose operating system generates a token that is recognized by participating service providers. Typically, these service providers need to have software such as a so-called "app", resident on the smart phone that accepts the token from (the operating system of) the smart phone and transmits it (or a representation) to the participating service provider. Such a method begets a closed system of service providers, all participating in the acceptance of a common set of tokens (or representations of such generated by their apps).

In short, a user can authenticate himself to the operating system of his e.g., smart phone, and the smart phone, in turn, provides a token whose validity is then accepted by other service providers. Thus, the user is permitted access to a participating service provider's system due to the service provider trusting the operating system of the smart phone.

Smart phones and other user computing devices have developed technology that provides a secure internal storage area for storing user data, e.g., biometric data. Such internal storage areas are only accessible to the operating system of the smart device and may not be accessible to external third party software. We are encouraged by such inventions and utilize them in the present invention as explained below accordingly.

In one aspect, the subject matter described herein allows the trust placed in a token from an enterprise to be replaced with a method, i.e., a sequence of steps or actions carried out by one or more (possibly distributed) computing entities manipulating cryptographic objects. Such a method can then be verified independently of any service provider, operating system, device or platform.

The verification may thus be carried out in a device and platform independent manner. Such independence is crucial in its security implications. A trust model that relies on a single enterprise is inherently unsafe and susceptible to attack because it is a single point of failure. In a device and platform independent method distributed amongst many computing entities, different entities may check other entities and the method may continue to perform its functions even if some parts are under attack. For instance, it should be noted that the robustness of Internet transport or routing relies on having multiple paths between a source and destination (IP) address. As a further example, telecommunications networks often use distributed computing entities to achieve desired levels of reliability. Likewise, data centers distribute their data in geographically separated entities.

Furthermore, encapsulating user data as credentials that may be securely verified (without violating user data privacy) frees users from creating and remembering user names and passwords, a known source of privacy invasion and security problems in security of computer operations.

Figure 17A:
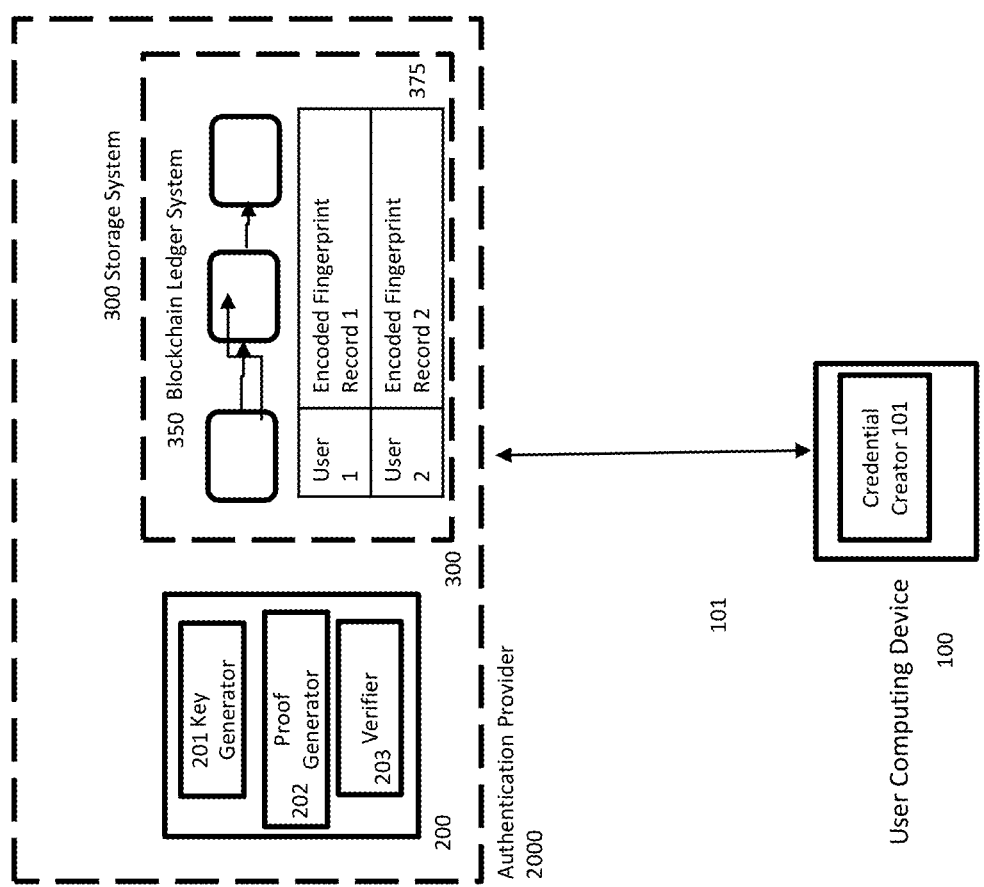
FIG. 17A shows the general architecture of the authentication provider.

FIG. 17A shows a general architecture of one example of an operating environment in which aspects of the disclosed subject matter may be practiced.

A user having established an account with a service provider using an identifier, say @john, may be asked to provide a credential that may then be used to authenticate future visits. Alternatively, the user may present a credential and a username together as a pair.

To generate a credential using biometric fingerprint information, a user may proceed as follows.

In one embodiment, the user computing device contains an integrated fingerprint scanner. The scanner is capable of scanning/capturing a user's fingerprint, converting it into a matrix of data and storing the fingerprint and data matrix for later computational use in the memory of the user computing device. In one embodiment, the fingerprint and data matrix is stored in a secure storage area of the user computing device that is accessible only to the operating system or selected applications allowed by the operating systems. Modern smart phones represent one example of a user computing device with an integrated fingerprint scanner.

A fingerprint scanner is one example of a device that facilitates capture and use of a user's biometric data. There are other examples of user's biometric data, such as retina scans, camera sensors that capture facial features, voice signature imprint, etc., that may also be used for identifying users. The use of the fingerprint biometric data in the present invention is purely exemplary and is not intended to limit the present invention disclosed herein in any way.

A user's fingerprint (biometric) data may be captured and processed by the user computing device or transmitted to a server where it may be processed by a combination of computational activities performed by the user computing device and the server. In the subject matter disclosed herein, we assume, without limitation, that the fingerprint data is processed by a combination of computational activities occurring in both the user computing device and server(s).

FIG. 17A shows a user computing device that contains software logic 101, referred to herein as credential creator, that may be used to create cryptographic data objects called credentials. Details of the process by which credentials are created are described below. We briefly note that the functions performed by the credential creator 101 may be described as processing input datasets or credentials to produce output datasets or credentials that may then be presented to one or more service providers.

A service provider may verify a presented credential using software-based methods described below. In one embodiment, the verification may entail recourse to a third party, a so-called verifier. In a second embodiment, the verifier is integrated into the SPS component of the privacy switch (cf. FIG. 15D). We assume the latter embodiment, without limitation.

Turning now to the creation, presentation and verification of credentials, we begin with FIG. 17A. An authentication provider is an entity that provides algorithms to user computing devices that may be used to create and present credentials. In one embodiment, the SPS component of the privacy switch (cf. FIG. 15D) acts as an authentication provider. In FIG. 17A, an authentication provider 2000 contains components 201, 202 and 203 that represent software programs capable of performing various functions that will be described in more detail later. These functions are collectively labeled as 200 and are assumed to have access to a distributed storage and database system 300. As will be shown, the functions labeled 200 participate in the generation of credentials that serve to authenticate the user and an encrypted version of the user's fingerprint data may be stored in the records 375 of the storage system 300.

In one embodiment, the database system 300 (2000, cf. FIG. 17A) is implemented as a block-chain ledger system and the functions labeled 200 as a set of smart contracts operating on the data in the ledgers.

Assume that an authentication provider wishes to enable user computing devices to create and present credentials to service providers; the latter may then make recourse to the authentication provider for verifying the presented credentials. To achieve this purpose, the authentication provider develops or acquires software programs that allow him to perform the functions depicted as Key Generator 201, Proof Generator 202 and Verifier 203 in FIG. 17A. We first describe a general method whereby these functions are performed and then present a more detailed explanation. The general method is described with reference to FIG. 17B.

[Method M1]:

In a provisioning step, a user computing device is provisioned with specific software called Credential Creator 101, FIG. 17A.

In step 1a (FIG. 17B), user computing device selects identifier @john and requests an authenticating credential for it from an authentication provider.

In step 1b, the authentication provider runs a software program, called a key generator 201 (FIG. 17A), on a specific input, Create Credential Algorithm. The output is a set of computational objects (called keys), PK1 and VK1. The details of this software program and properties of the keys are described below. The authentication provider also runs the key generating program with a second input, Credential Match Algorithm, which produces as output a set of two keys called PK2 and VK2.

In step 2, authentication provider asks and receives from the user computing device an encrypted version of fingerprint data matrix (but not the fingerprint itself). The user computing device may use the software program Credential Creator 101 received as a result of the provisioning step. Further details of the functioning of 101 are explained later.

In step 3, the authentication provider uses the data matrix received from the user computing device and a software program called the Proof Generator 202 (FIG. 17A) to produce two objects, Proof-1 and Encoded Data-1, collectively called a credential, credential-1. Optionally, the input to the Proof Generator 202 may additionally contain other datasets as discussed later.

In step 4, the generated credential, credential-1, and the keys PK1, VK1 and PK2 are sent to the user computing device. Note that VK2 is not transmitted; it is saved by the authentication provider for later use in verifying the credentials.

In step 5a, which may occur when the user computing device wishes to present the credential, the user computing device generates a new credential, credential-2, (using software program credential creator 101, cf. FIG. 17A) and presents it to a service provider/environment (200, cf. FIG. 15D) who may request the presented credential to be verified by the authentication provider (step 6).

In step 7a and 7b, the authentication provider uses a software program called the verifier 203 (FIG. 17A) (along with the previously saved VK2 as input) to verify the presented credential, credential-2, as authenticating the user and responds to the service provider/environment accordingly.

Figure 17B:
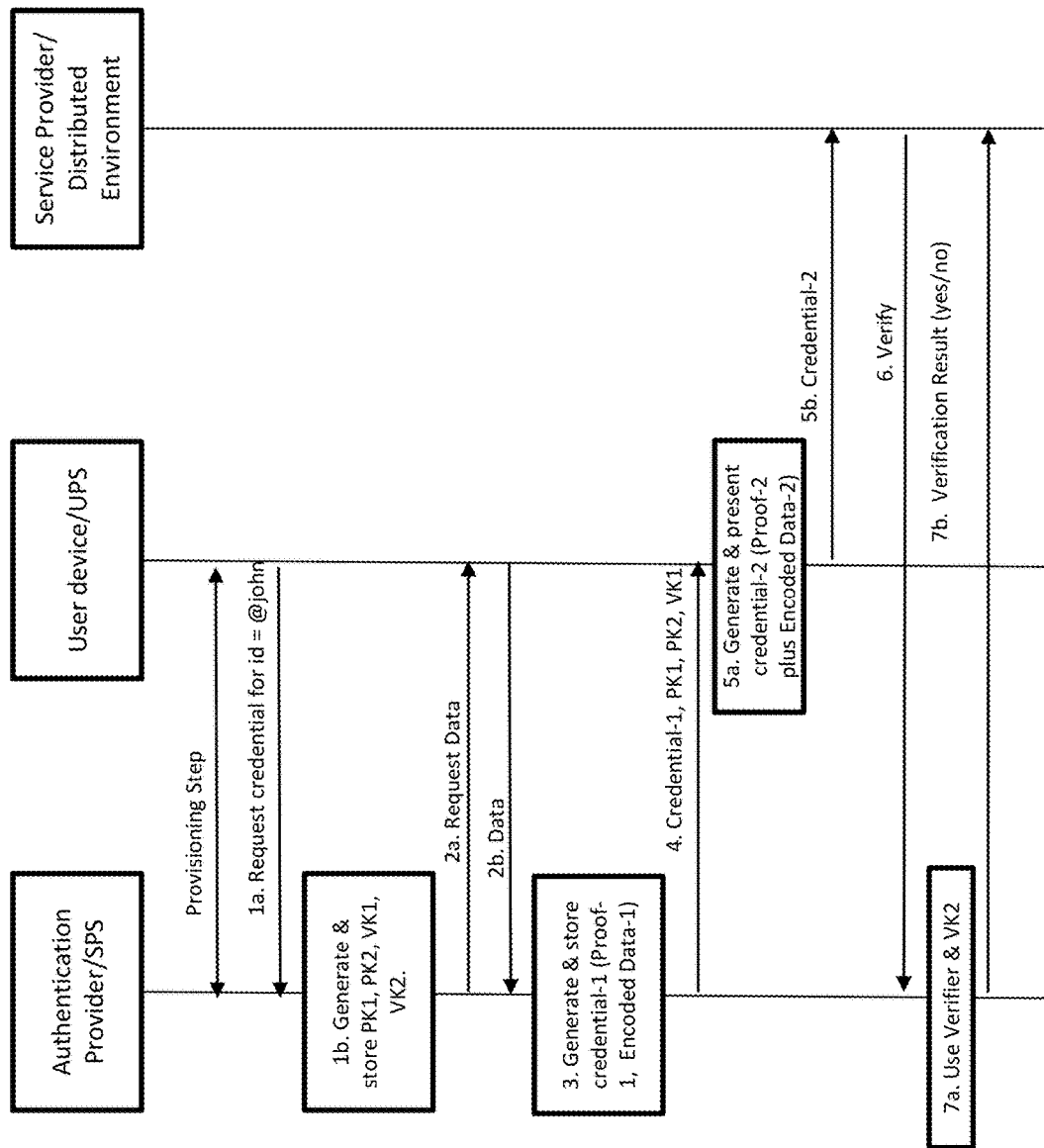
FIG. 17B shows the general method by which a user computing device is provisioned with credentials.
Figure 17C:
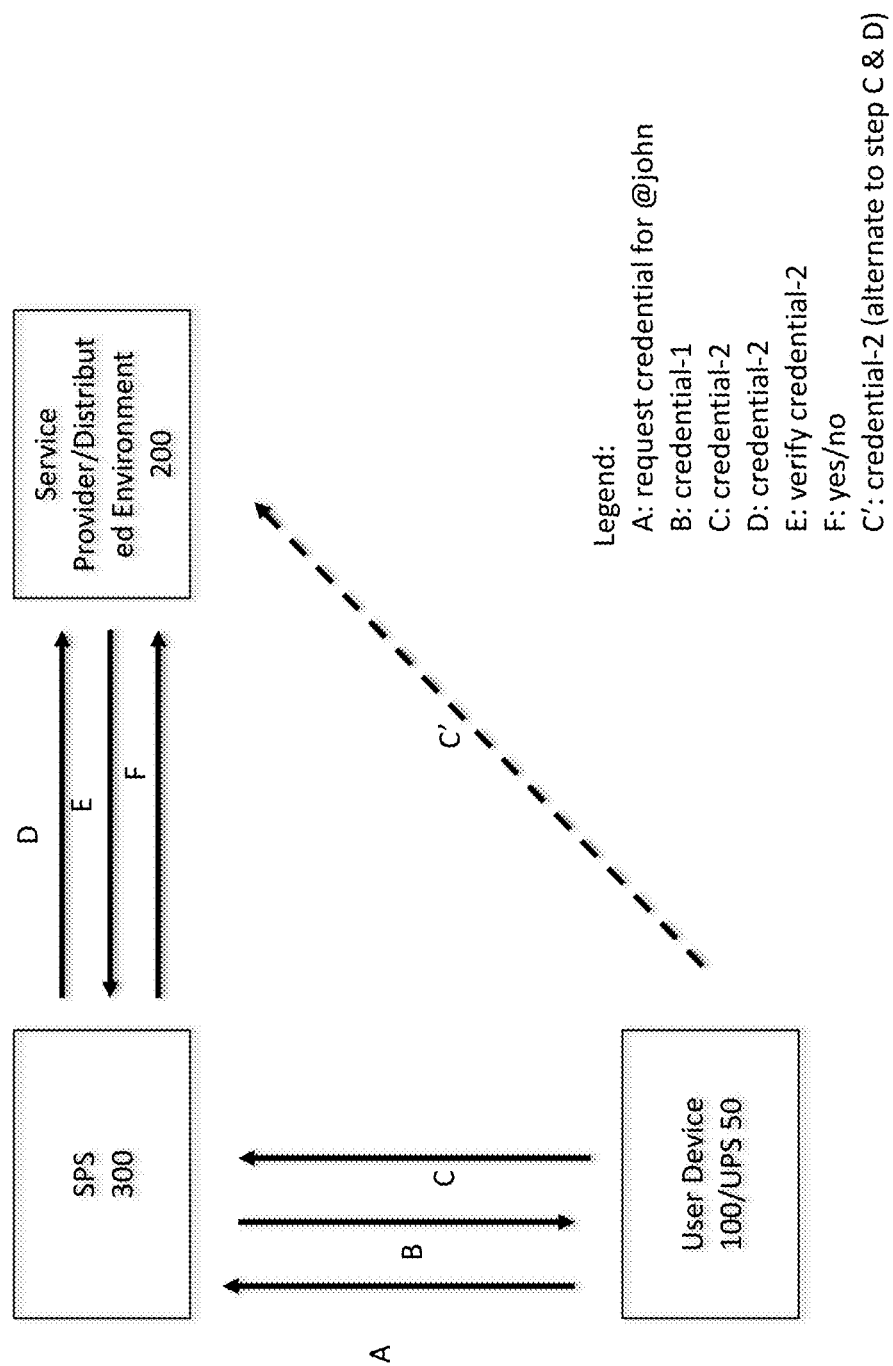
FIG. 17C summarizes the method of FIG. 17B.

FIG. 17C summarizes method M1 wherein we assume, without limitation, that the SPS is used as an authentication provider. Note that the service provider 200 in FIG. 17C may integrate the authentication provider 300 as a sub-component in certain embodiments.

We now proceed to explain the methods by which the various computational objects referred to above, viz., keys, proof, credentials, etc., are derived and authenticated in more detail.

We assume the existence of three software engines KGE (Key Generating Engine), PGE (Proof Generating Engine) and PVE (Proof Verifying Engine). (The components Key Generator 201, Proof Generator 202 and Verifier 203 of the authentication provider shown in FIG. 17A may encapsulate these engines as computer programs.) As is known in prior art, each of these engines may be implemented on one or more computers executing special software logic. A convenient way of describing the functioning of the various engines is to treat them as "block box" devices as shown in FIGS. 18A, 18B, 18C and 18D, respectively. KGE (111, cf. FIG. 18A) accepts as input a computer program, L, 100. It produces two cryptographic keys, PK 300 and VK 400 called the proving key and the verifying key, respectively.

As an example, software logic has been released in the public domain by Internet providers that processes computer programs and produces key objects (see, for example, "Snarks for C: verifying program executions succinctly and in zero knowledge", by Eli Ben-Sasson, et al., which is available at the website eprint(dot)iacr(org)(slash)2013 (slash)507(dot)pdf via a secure http, i.e., https, connection.

It is important to note that the keys PK and VK produced by the KGE are a function of the input software logic. Any changes to the software logic engenders a different PK and VK to be produced. Furthermore, the complementarity of PK and VK is dependent on the input software logic. That is, the output keys uniquely characterize the input algorithm in the sense that any change whatsoever to the input algorithm necessitates changes to the output keys.

The term "key or cryptographic key" refers to digital data objects that satisfy the following properties.

(P1) The output keys, if rendered on a display screen may appear as a random sequence of binary (hexadecimal) digits.

(P2) No two distinct input algorithms to the KGE will produce the same output keys.

PGE (222, FIG. 18B) accepts an encoded object EO 500 (i.e., a dataset produced as per the descriptions below) and the proving key PK 300 (produced by KGE above) and produces a cryptographic object called the proof, P (555) and a new dataset Encoded Object (EO-2 550) that is a function of the input EO 500. The cryptographic object "P 555" satisfies the property P1 above, viz., if displayed, it appears as a random collection of (hexadecimal) digits.

Figure 18A:
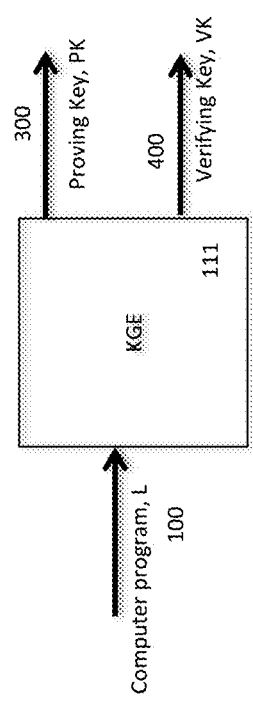
FIG. 18A is a functional block diagram illustrating the operation of a Key Generating Engine (KGE) that generates cryptographic keys and objects.
Figure 18B:
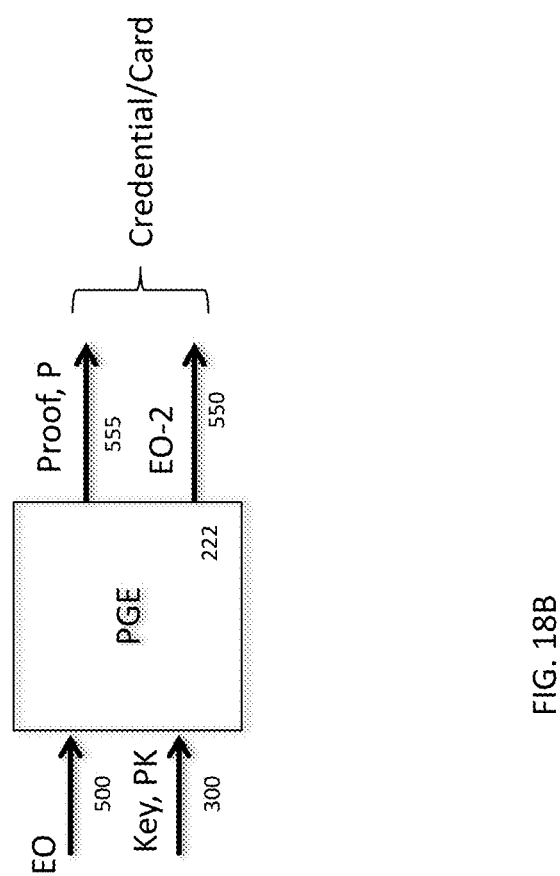
FIG. 18B is a functional block diagram illustrating the operation of a Proof Generating Engine (PGE) that generates a cryptographic proof.
Figure 18C:
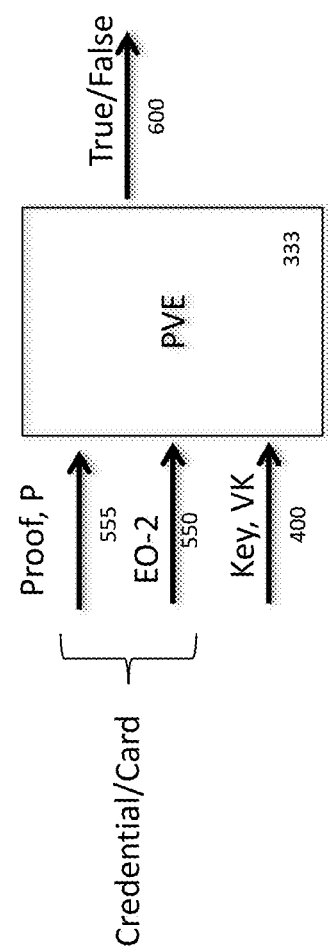
FIG. 18C is a functional block diagram illustrating the operation of a Proof Verifying Engine (PVE) that verifies the accuracy of the cryptographic credential.

PVE (333, FIG. 18C) accepts as input a verifying key, VK (400), produced by the KGE, a proof object P (555) produced by the PGE, and a dataset EO-2 (550) and outputs either "true" or "false". It produces the response "true" if and only if all the following conditions are true; otherwise it produces the response "false".

the dataset 550 and proof object P (555) is produced by PGE 222 (cf. FIG. 18B);

the key VK is produced by KGE;

It is to be noted that PVE (FIG. 18C) thus may be used to verify that the objects "proof" and "encoded data" (FIG. 18B) were produced using the algorithm "L" input to KGE (FIG. 18A). If the objects "proof" and "encoded data" are together referred to as a "credential" or "card", we may then state that the credential or card is verified to have been produced by the given algorithm, L.

We reiterate that the verification of a credential by using the verifying key also ensures that the credential was produced by running the engine KGE with a given algorithm.

We refer to this feature as verifying the provenance of the credential, i.e., the credential derives from an algorithm that is known and unchanged.

We now show and discuss enabling embodiments of constructing and using KGE, PGE and PVE.

It is well-known in prior art that a user's fingerprint data when captured by fingerprint sensors/scanners may be represented as a matrix of data, typically a 1000×1000 matrix (see, for example, "Using Chebyshev's inequality to determine sample size in Biometric evaluation of fingerprint data" by J. Chu et al., National Institute of Standards and Technology, Gaithersburg, Md.). For ease of discussion, we limit our enabling example to a dataset with 9 samples, i.e., a square 3×3 matrix as shown in FIG. 19A. (Similarly, user's facial data may also be captured as datasets; understandably, facial datasets are larger in size than fingerprint datasets.)

The functioning of the engines KGE and PGE may now be explained by recourse to FIGS. 19A, 19B, 19C, 20A and 20B as follows.

Generating a pair of complementary keys from an input dataset is well-known in prior art (see, for example, Paar et. al., Understanding Cryptography, Springer, New York, ISBN: 978-3-642-04100-6; the article by Eli Ben-Sasson et al. cited above shows how keys may be generated efficiently); thus, KGE may be constructed accordingly.

Turning now to the enabling embodiment of the PGE, FIG. 19A shows the exemplary dataset for a fingerprint data of a user as a 3×3 matrix. The cells of the matrix are numbered one through nine using roman numerals (i, ii, etc.); the cell values are shown as integers 37, 42, etc. In FIG. 19B we map each cell value and its position as a pair to one of the integers 1, 2 or 3 as shown. The pairs represent the cell number and the cell value, thus (i,37) means the sample value 37 in cell "i" of the matrix, etc.

We now construct a 3×3 Sudoku Puzzle (also known as Latin Square) using the integers 1, 2 and 3. One such arrangement is shown in FIG. 19C. As is well-known, Sudoku puzzles satisfy the constraint that the sum of each row and column is equal. (In the example shown in FIG. 19C, the cell values of each row and column add up to 6.)

Whereas the Sudoku Puzzle was chosen to be of order (i.e., dimensions) 3×3 and the input dataset was also assumed to be a matrix of order 3×3, this is merely coincidental. We may choose a Sudoku Puzzle of any order as long as its number of cells is larger than or equal to the number of entries in the mapping table, i.e., FIG. 19B. Note that the order of a Sudoku Puzzle is related to its computational intractability. Thus, engineers may wish to determine the order accordingly.

It is to be noted that knowledge of the Sudoku arrangement of FIG. 19C cannot be used to derive the matrix of FIG. 19A without possessing the data of FIG. 19B. That is, going from FIG. 19A to FIG. 5C via FIG. 19B is computationally easy but reversing, i.e., deriving FIG. 19A from FIG. 19C—without knowledge of FIG. 19B—is computationally intractable.

(The notions of computational ease and intractability refer to the efficiency of computer operations and are well-known in prior art.)

Thus, the functioning of PGE may be described as a software program (engine) that takes a fingerprint dataset and an algorithm L as input. The algorithm "L" manipulates the input dataset to produce the mapping (such as shown in FIG. 19B) and from it produces a completed/solved Sudoku Puzzle, such as shown in FIG. 19C.

Taking the dataset of FIG. 19C, i.e., the complete/solved Sudoku Puzzle, PGE splits it into two parts shown as FIGS.

20A and 20B. Note that putting the two split pieces, FIGS. 20A and 20B, together to get the original completed table, FIG. 19C, is computationally easy; however, deriving the completed table, FIG. 19C, from FIG. 20A is computationally hard. For example, it has been estimated that a 9×9 Sudoku puzzle has tens of trillions of possible solutions (6,670,903,752,021,072,936,960).

Thus, PGE may be described as an engine that takes as input an encoded dataset and an algorithm and produces as output (1) an encrypted dataset ("proof component") representing a partially solved Sudoku Puzzle (FIG. 20A), and (2) the "missing" pieces of the Sudoku Puzzle (FIG. 20B, "missing component"), in the clear.

Figure 21:
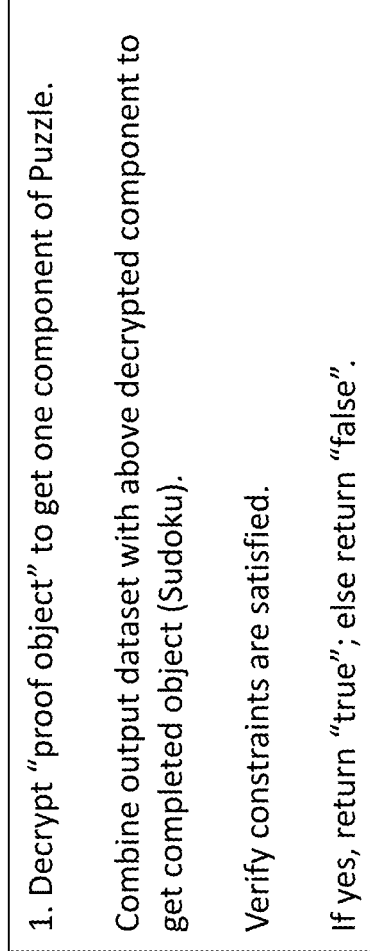
FIG. 21 shows an illustrative working of the PVE.

Now we describe an enabling example of PVE with the help of FIG. 21 as follows.

PVE decrypts the proof component (FIG. 20A), combines it with the missing component (FIG. 20B) that is in the clear, to get a completed table satisfying Sudoku constraints. If the table is complete and satisfies the constraints, PVE outputs "true"; else it outputs "false".

Note, that the computational intractability of the Sudoku Puzzle implies that when we split a Sudoku Puzzle into two pieces and distribute them to different entities, we are relying on the fact that any entity that comes into possession of one piece of the Puzzle will require enormous computational power to "solve" the problem, i.e., compute the missing piece; whereas, an entity that has the two pieces of the puzzle may combine them with a relatively small computational effort.

We now apply the above descriptions of KGE, PGE and PVE to more fully describe the methods carried out as shown in FIG. 17B, i.e., we present details of the provisioning operation and of steps 1b, 3, 5a and 7a.

The authentication provider encapsulates two algorithms, Create Credential and Match Credential, into a software package called the Credential Creator, along with logic to utilize the algorithms. In the provisioning step of FIG. 17B, the package Credential Creator is provided to the user computing device.

The "create credential algorithm" is a computer algorithm that generates proving and verifying keys as explained above. The "match credential algorithm" is a computer algorithm that matches two (actual) fingerprints and produces a yes/no response. Several Internet service providers, e.g., Amazon, have provided fingerprint data and facial image data matching algorithms as open source software.

Figure 22A:
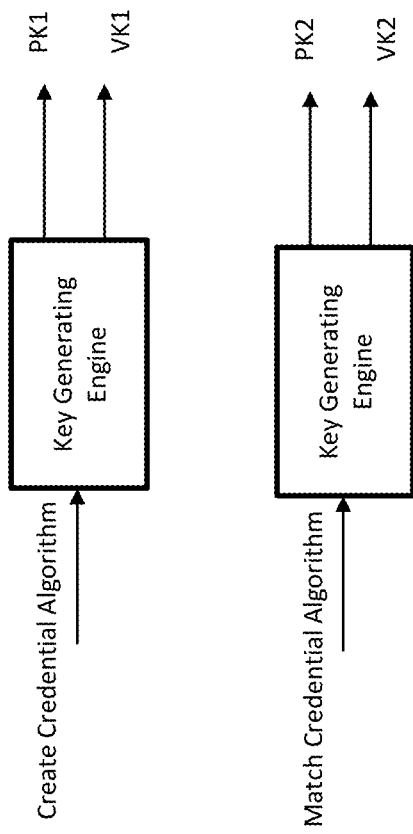
FIG. 22A shows the key generation by the authentication provider.

In step 1b (cf. FIG. 17B), the authentication provider produces keys PK1 and VK1 with Credential Generating Algorithm as input to the KGE. Next, it produces keys PK2 and VK2 with Match Credential Algorithm as input to the KGE. These two cases are shown in FIG. 22A.

Figure 22B:
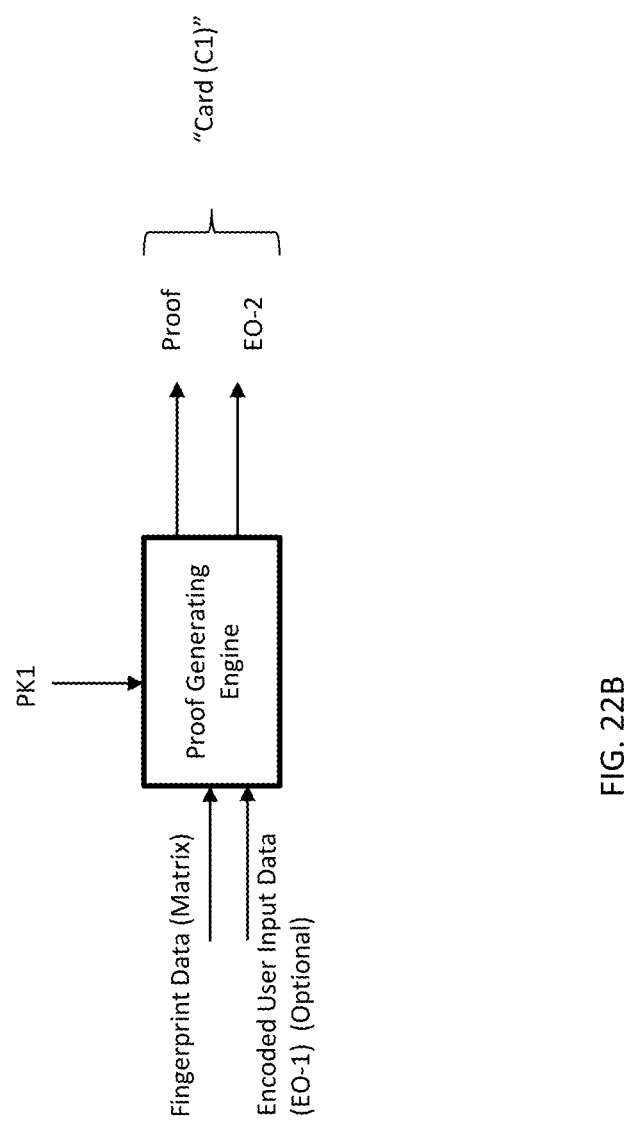
FIG. 22B shows credential generation by the authentication provider.

In step 3 (cf. FIG. 17B), the authentication provider uses PGE to generate a credential, C1, composed of the proof object and an encoded object. This is shown in FIG. 22B. The input to the PGE is the fingerprint data matrix derived by the Credential Creator 101 (cf. FIG. 17A). In certain embodiments, in an optional operation, additional datasets may also be provided as input to the PGE. For example, the user may provide a name or a phrase that gets encoded into the credential. This feature is reminiscent of two-factor authentication in the sense that the credential encapsulates two items to authenticate the user, the fingerprint data and the username or phase. Thus, the credential generation and presentation phases will require two items of information.

PGE (FIG. 22B) produces a proof object and a version of the encoded data as output. The combination of these objects is referred to as a card, C1. It is to be noted that the term "card" simply is a name for the combination of the indicated computational objects, i.e., the proof and the encoded dataset. It does not refer to a physical entity. (The terms "credential" and "card" are used synonymously.)

Figure 22C:
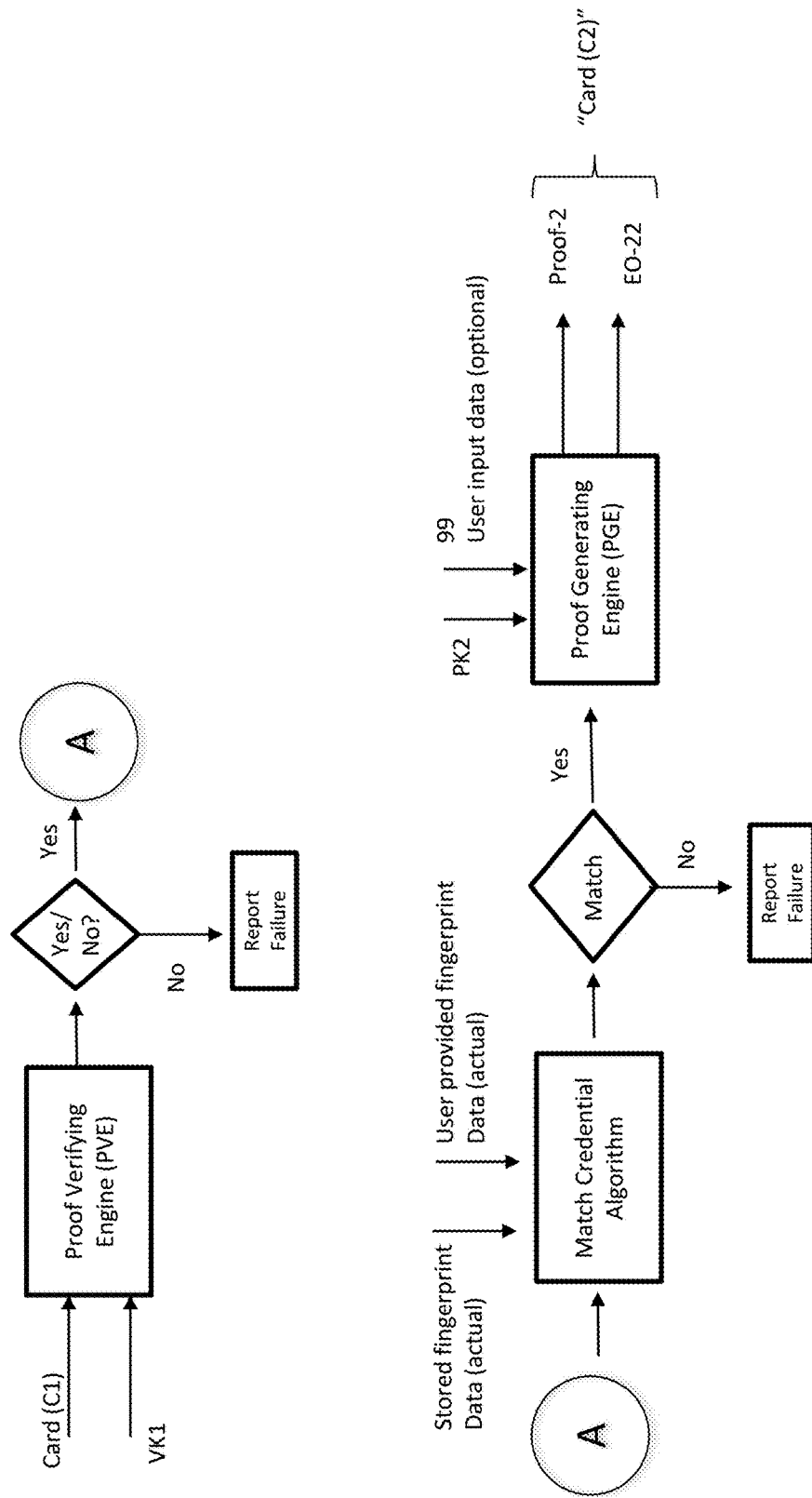
FIG. 22C shows credential generation by the user computing device.

In step 5a (cf. FIG. 17B), the user computing device uses the Credential Creator software package to execute the process shown in FIG. 22C. The process when executed generates a second credential/card, C2.

The process of FIG. 22C may be described as follows. Recall that the user computing device possesses "C1" and has received VK1 from the authentication provider (as described in FIG. 17B). We use C1 and VK1 as input to PVE and verify C1 using PVE. If C1 is verified (i.e., PVE outputs "yes"), we proceed as follows; otherwise we report failure and terminate the process.

The process of FIG. 22C now asks the user to provide his fingerprint (actual) and user input (if any, e.g., a username). These are fed as input to the Match Credential Algorithm to check if the provided fingerprint matches the stored fingerprint of the user. A negative match is reported as failure. Upon positive match, we invoke PGE with inputs PK2 and user data (if any) to generate card C2.

Figure 22D:
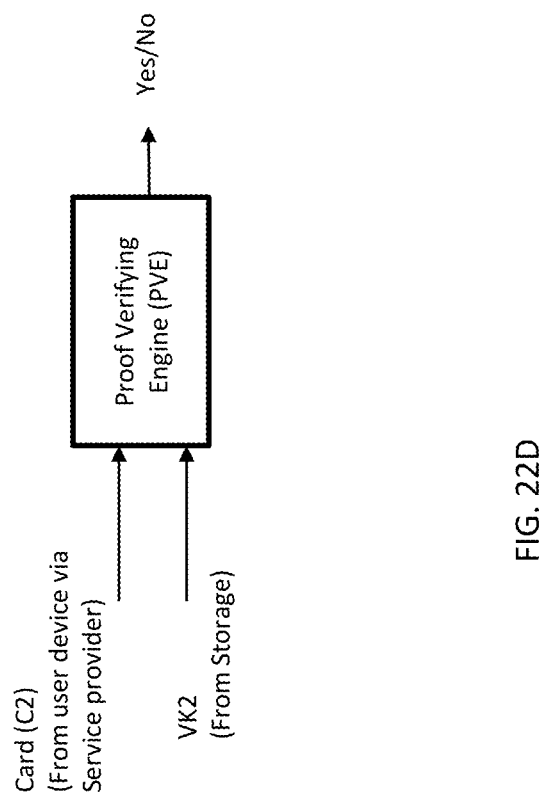
FIG. 22D shows credential verification by a service provider.

In step 7a (cf. FIG. 17B), the authentication provider uses PVE and VK2 to verify C2 as shown in FIG. 22D.

It is important to observe that whereas C1 encodes the relationship between a fingerprint data matrix and a user specified input, C2 encodes the two facts:
1. (1) The verification of C1 establishes the relationship between the fingerprint data matrix and user input;
2. (2) The verification of C2 establishes the relationship between the user input and the actual fingerprint of the user.

From facts (1) and (2), it follows that the user input data "links" the fingerprint data matrix to the user's actual fingerprint.

The verification of C2 thus establishes that the user who generated C1 is the same as the user who generated C2. It is also to be noted that there is no disclosure of user identity to the authentication provider and the data objects that it may store, generate or verify. Note, since the user input is encoded into the fingerprint data matrix, the authentication provider is unaware of the user input. All the data objects obtained by the authentication provider (as provided by the user computing device or the service provider) are cryptographic objects.

Accuracy of Provided Information

The above discussion has shown how a user's fingerprint or other biometric data may be used to create credentials by using the engines KGE and PGE. (The credentials may then be verified by using the engine PVE.) The input to these engines are a pair of algorithms called Create Credential and the Match Credential Algorithms.

We may use the KGE, PGE and PVE engines to create and verify credentials from datasets relating not only to fingerprints but other biometric datasets such as facial images. As mentioned above, facial images may be viewed as matrices of pixel data that may be encoded as data matrices suitable for manipulation by algorithms. Just as the Create Credential and Match Credential Algorithms manipulate fingerprint data matrices, we would need algorithms that manipulate facial image data matrices. We may posit two such algorithms and dub them as Create Facial Credential and Match Facial Credential algorithms.

In certain embodiments, a user may also be allowed to add (as user input) selected attribute information, e.g., a string of characters such as "@john", "likes classical music", "address=10 Main Street", etc., by utilizing a suitable API on the user computing device. This is shown as optional input (99) to PGE in FIG. 22C.

In addition to fingerprint and image datasets, a user's financial information (e.g., credit card) or driving license, when treated as a dataset, may be used as the input dataset. Note that a typical driving license contains both a user's facial image and user attributes such as street address, date of birth, etc. If user attribute information from a user's driver license or credit card are encoded as verifiable credentials, it will then be possible for a service provider to ascertain the accuracy of the user's information.

Thus, for example, a user may be able to present credentials to a service provider that denote that the user's age is greater than 21, based on the credentials being derived from the user's driver license. That is, a user computing device may be provisioned with suitable software, mimicking the Credential Creator 101 shown in FIG. 17A, to process image dataset of a driving license.

More specifically, we may use two algorithms Create DL Credential and Match DL Credential as input to KGE to derive two sets of keys (PK1, VK1) and (PK2, VK2), respectively, as described above in FIG. 22A. That is, the KGE engine is fed the Create DL and Match DL algorithms that are different than the ones shown in FIG. 22A.

Proceeding further with the description, in step 2a (cf. FIG. 17B), the user computing device is provisioned with a suitably modified Create Credential software package (cf. FIG. 17A).

To generate a credential from a driver license dataset, we may now use the method M1 described above. Note that the only change needed to method M1 to process the driver license dataset rather than fingerprint dataset is the use of the different algorithms, viz., the Create DL and Match DL Credential algorithms.

Note that since a user's driver license contains both an image of the facial features of the user and his date of birth, the credential derived from it may serve to authenticate both the user and his age. Similarly, since the driver's license contains the user's street address, the credentials based on the driver license may also verify the street address of the user, etc. (The accuracy of additional informational attributes added by a user to the input dataset may also be established in a similar manner.)

Similarly, a credit card containing a user's fingerprint and/or facial image data, along with additional informational attributes such as account number, etc., may serve as the basis of a cryptographic credential. Again, this may be achieved by using algorithms that manipulate credit card datasets.

We now return to the embodiment described above in which we had asserted earlier that SPS may create and store an association object representing a username. We provide the following description to support that assertion.

We posit the existence of two algorithms, say Create Username and Match Username. The former algorithm operates as follows.

The user is asked to provide or choose a first username. The algorithm generates a unique dataset, i.e., a table of data, dependent on the provided username. That is, the dataset is a function of the input. The dataset and the first username may be used, as described above, to generate a first credential/card, C1, that is stored in the SPS.

The Match Username algorithm operates as follows. The user is asked to provide a second username. The algorithm generates a second dataset related to the provided second username. We may now match the first and second user names (equivalently, we may match the first and second datasets). Upon a successful match, we may generate a second credential/card, C2, as described above. Note that C2 will contain a cryptographic object and a clear data object, the latter being either the first or second username.

A service provider receiving card, C2, may treat it as an association object since it contains a cryptographic object and a clear object. To verify its authenticity, the service provider may request the same from SPS (as described above).

Driver licenses, credit cards and other such instruments that contain authenticating and miscellaneous attribute information regarding consumers may thus be used to create credentials that authenticate and validate a user's identity, his informational attributes and the accuracy of assertions made by a user, by employing algorithms that can process the datasets related to these instruments along with the KGE, PGE and PVE engines.

It is to be further noted that the verification of a credential by PVE further entails the fact that the input algorithm that generated the credential, e.g., Create Credential Algorithm of FIG. 22A, etc., was unchanged, since otherwise the PVE would have failed in its verification. That is, successful verification by PVE entails the provenance of the algorithm input to the key generating engine.

Thus, the obfuscated object corresponding to a username, created and maintained by the UPS as described above, may also be verified, as to its authenticity and provenance, by using the PVE engine.

The various software engines and algorithms used in the credential generation and presentation processes discussed above may be provided by entities that offer instruments such as driver licenses or credit cards to consumers. In certain embodiments, the verifying function associated with the various credentials discussed above may be integrated by and into such instrument providing entities.

Approximate Objects

In some embodiments, a service provider may need user data to provide services through an application program injected into an environment, e.g., an application program may be in a session with a user computing device and may need the location of the user to provide services to the latter. We propose that attribute information of a user may be represented by an approximate object by converting the attribute's singular value into a range of values.

That is, we take an attribute's value "v" of data type "t" and derive an approximate object from it by adding additional elements (v1, v2, etc.) of the same type and chosen by an algorithmic process. As an example, the attribute age with value "21", i.e., "age=21", may be converted into the approximate object "age=(15, 18, 21, 45, 54, . . . )"; the attribute/value "name=john" may be converted into "name= (john, peter, smith, . . . )", etc. Note that the attribute's value is included in the range.

We require that the range of an approximate object, i.e., its cardinality, be finite and pre-determined.

The notion of approximate objects was introduced in prior art by McCarthy (cf. J. McCarthy, Approximate Objects and Approximate Theories, *Principles of Knowledge Representation and Reasoning, Proc. of $7^{th}$ International Conf.*, Colorado, 2000) and by Zadeh (cf. L. Zadeh, From Computing with Numbers to Computing with Words, *IEEE Trans. On Circuits and Systems*, 45(1)105:119, 1999) to capture various kinds of approximate information. In McCarthy's formulation, all information is approximate. For example, the statement "John is nearby" may be true in certain domains and false in others.

As used herein, an approximate object "x=(a1, a2, ... )" means that the attribute "x" has, as its value, one and only one of the elements of the set AS=(a1, a2, ... ). That is, there exists an element "z EAS" for which the predicate "x=z" is true and the predicate "x=y" is false for every element y≠z of AS.

In McCarthy's treatment, all information is approximate and can be determined only by domain specific means, i.e., by a suitable "approximate theory". In our usage, a user computing device has precise information that is converted into an approximate object. The reverse process, by which an approximate object is rendered precise, can only be performed by the user computing device that created the approximate object.

That is, a user knows or may utilize his user computing device to determine the value "z" above. For example, GPS sensors of a user computing device may be used to determine the location of the user. We may then say that an approximate object in our formulation may be resolved, i.e., rendered precise, by the theory engendered by the user computing device.

For example, the attribute/value "near=2 miles" in McCarthy's formulation may be interpreted as true in some domains (theories) and false in others. In our usage, the attribute/value "near=2 miles" may be interpreted as true/false by a user or a computer program running on a user computing device, possibly utilizing the sensors available to the user computing device. In simple terms, McCarthy's notion of an approximate theory (or a domain) needed to resolve an approximate object is realized by a user computing device along with the sensors available to it.

The authenticity and provenance of an approximate object may be verified using the methods described above by converting it into a credential using algorithms provided by the represented service provider (as described above). Upon receiving such a credential, the service provider may verify it (by recourse to an entity possessing the PVE engine), the verification serving two purposes, viz., that the approximate object was provided by the user, i.e., authenticity, and that the algorithm provided to generate the credential was known and unmodified (provenance).

To show the utility of approximation objects, consider a computer program, say RP (Retail Program), injected into a computing environment. Assume RP provides retail locations of a service provider that are closest to a given location of a user. The following steps are exemplary.

3. RP queries user computing device, UD, for its location.
1. UD provides approximate object, ALO, representing its location wherein UD is located.
2. RP uses the approximation object, ALO, to calculate 3 closest retail locations, say X, Y and Z.
3. RP provides X, Y and Z to UD.
4. UD, since it knows its exact location, computes the distance to each member of the group X, Y and Z and selects the member/retail location with the least distance from it accordingly.

The user computing device may now wish to connect with the selected retail location directly, e.g., it may wish to acquire a route to the selected retail location. To compute such a route, however, we need the exact starting location of the user computing device; the approximate object is insufficient for this purpose.

That is, we need to resolve the approximate object to its "precise" value. And, by the dictates of the present invention, such a resolution must be privacy-preserving. We propose the following method to solve the resolvability problem and exemplify it by returning to the behavior of program RS in the example above, viz., a user wishes to find a route from his location to a retail location provided by a program RS.

We assume that the service provider possesses a table, TR, containing a listing of all his retail stores indexed by their location.

[Method: Resolvability (M2)]
1. Let the approximate object corresponding to an attribute, L, be denoted by ALO. Note that the cardinality of ALO is finite and pre-determined.
2. Service provider injects RS into an environment. A session is established between RS and a user computing device, UD.
3. UD initiates dialog with or requests RS for location of nearest retail store.
4. RS asks user computing device, UD, for its location.
5. UD responds that it can provide ALO.
6. RS asks for ALO of cardinality e.g., 5 (without limitation). In certain embodiments, the cardinality may be negotiated between UD and RS.
7. UD provides ALO with cardinality 5.
8. RS searches table, TR, to determine, e.g., three, retail stores closest to an area bounded by the ALO elements. RS communicates the location of these 3 stores to UD.
9. RS calculates the nearest store from the list of 3 stores provided by RS.
10. RS invites a route-finding program into the session and re-directs it to UD.
11. UD initiates dialog with route-finding program and conveys its exact location to it.
12. The route-finding program calculates the route and informs UD.
13. UD terminates its interaction/dialog with the route-finding program and informs RS.
14. RS clears all virtual machines in the session.

FIG. 23 shows two exemplary approximate objects representing a user's location attribute. The "dots" show the elements of the approximate object with one of the dots being the exact location of the user computing device, and is known only to the user computing device.

We further explain this aspect of the invention in the illustrative embodiment of the next section.

Illustrative Embodiment (Private Ride Sharing Service)

Having described various categories of user provided information and its processing in a privacy preserving manner as depicted by FIG. 15D, we present an illustrative embodiment encompassing the various techniques described above. That is, we show by the following illustrative embodiment, the utility of the invention proposed herein and depicted in FIG. 15D.

In the illustrative embodiment below, we consider a service provider that offers a ride sharing service. More generally, of course, similar techniques may be used to deliver any service or product or to perform a transaction. The elements comprising the ride sharing service may be enumerated as follows.

1. User requests a ride utilizing the user computing device.
2. Service provider causes a ride providing device (e.g., automobile or other vehicle) to be sent to the user's location.
3. The user is picked up and brought to his destination.
4. The user pays for the service using the user computing device.

Some concerns of the user may be enumerated as follows.
1. User would like to keep his identity and username private.
2. User would like to keep his pickup and destination location private.
3. User would like to keep his credit card/payment data private.

The service provider may also have some concerns, some of which may be listed as follows.
1. Drivers are provisioned to the user on the basis of being closest to the location of the user to minimize the "waiting" time of user.
2. Provider would like to authenticate user, i.e., no malicious users.
3. Provider would like to be assured of payment verification.

Figure 24A:
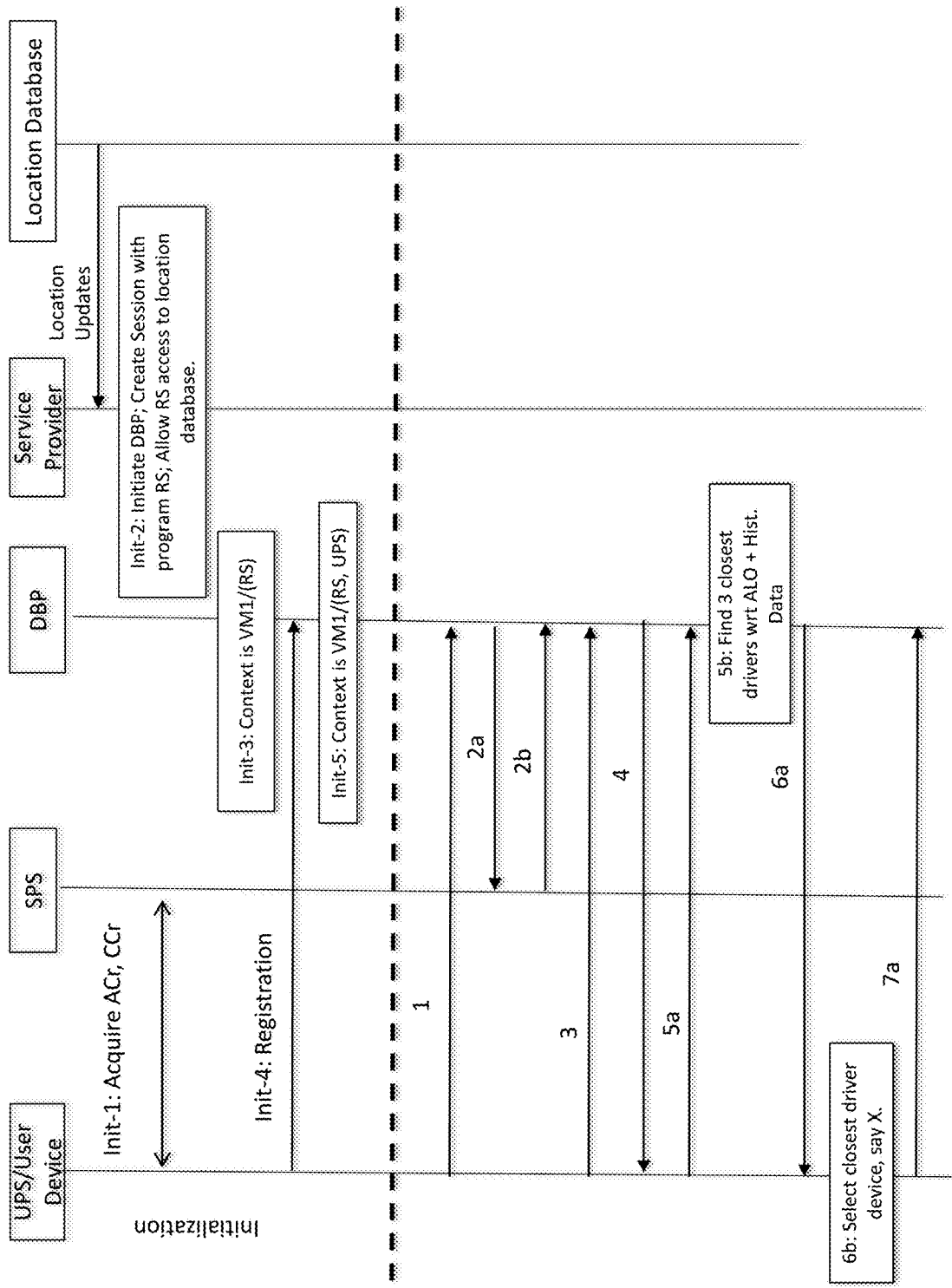
FIGS. 24A, 24B and 24C illustrate an exemplary service using the methods of the invention described herein.
Figure 24B:
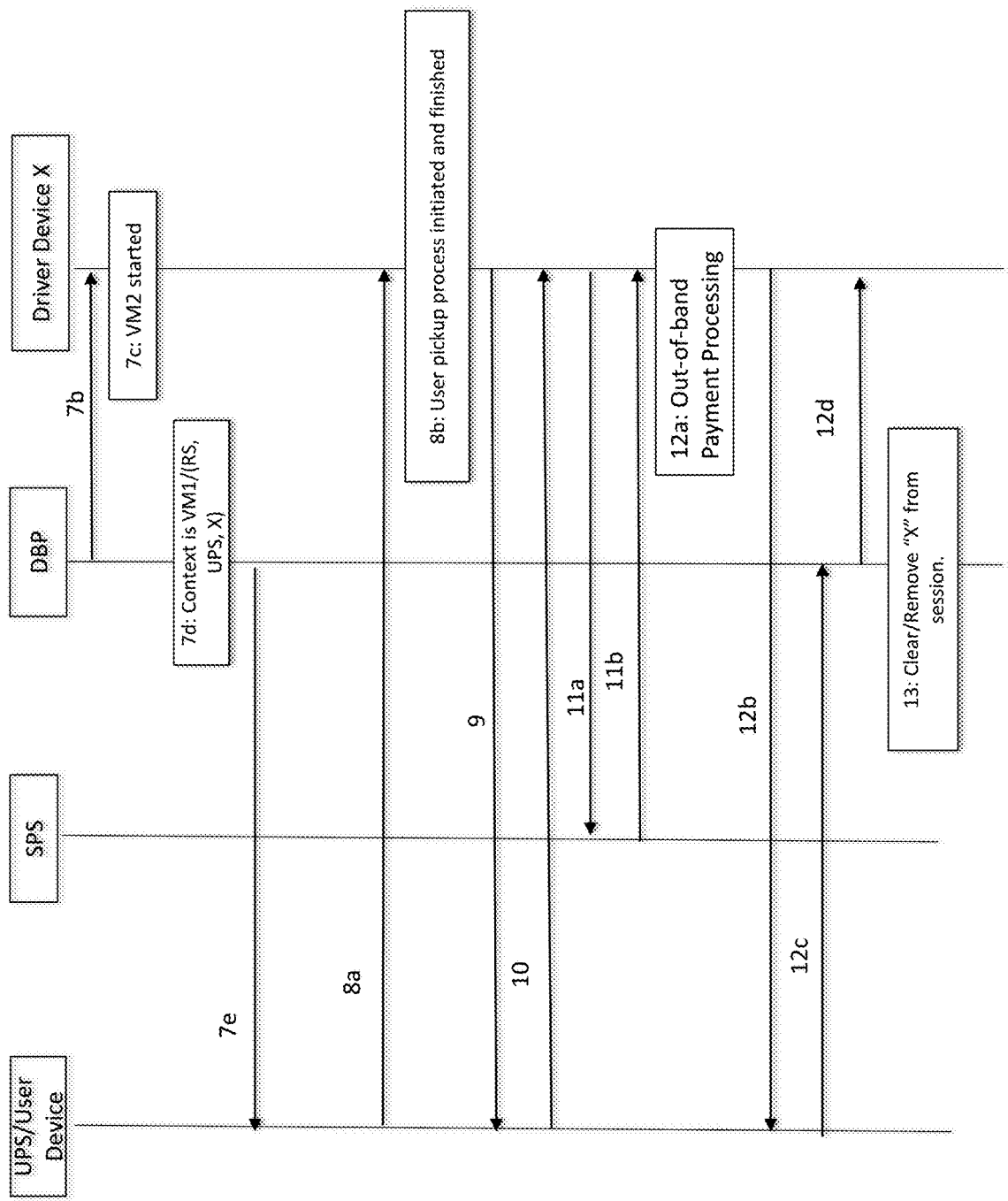
Figure 24C:
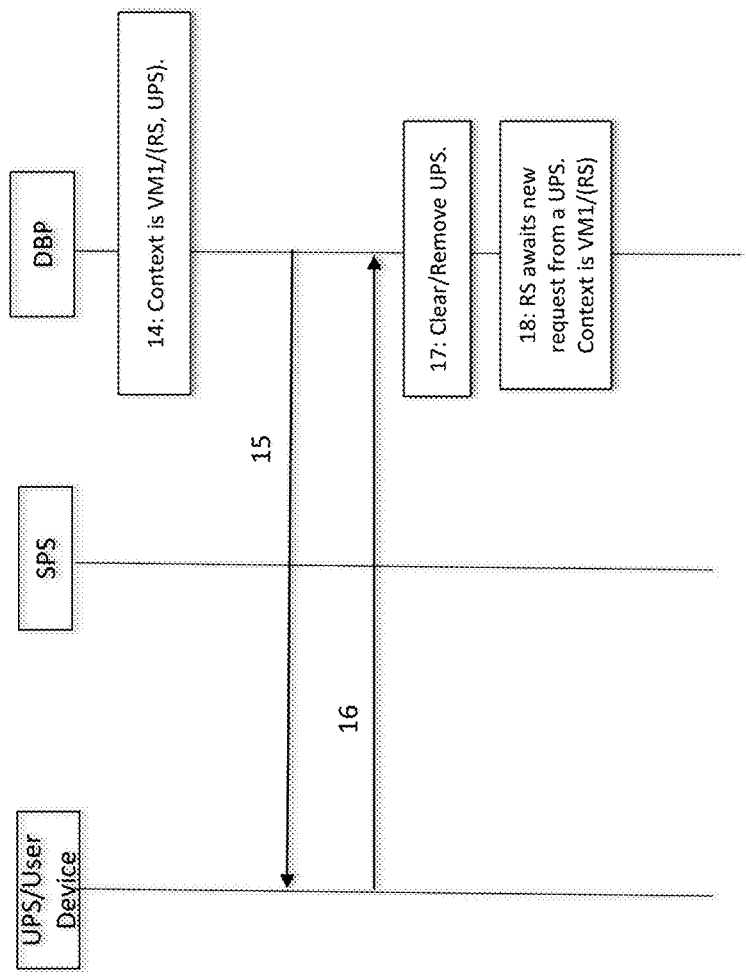

FIGS. 24A, 24B and 24C show one way of implementing the private ride sharing service (as per the service description above) and addressing the concerns of the user and the service provider. The implementation is exemplary and is meant to describe one way in which the techniques of the present invention may be applied to implement this service.

While this particular embodiment employs three computer programs in a single session, more generally any suitable number of computer programs may be employed in a session. Other embodiments may employ more than one session involving multiple devices, computers and programs.

We assume that the private ride sharing service provider decides to be represented by a ride sharing computer program RS that matches drivers to users who want a ride. The service provider has a computing environment that is managed by a database processor, DBP. The latter is suitably configured to create sessions, virtual machines, VM, and run injected computer programs in the VMs as described in the invention herein.

The description of the illustrative embodiment proceeds as follows with respect to FIG. 24A.

A service provider receives location updates from a group of devices, called driver devices (e.g., mobile communication devices that are used by the drivers). The location updates received from the driver devices are stored in a database. The service provider, wishing to offer privacy-preserving ride sharing services, develops or acquires the computer program RS.

In an initialization step, Init-1, a user computing device requests and receives authentication and credit card credentials, ACr and CCr, respectively, from SPS. The user computing device encapsulates the credentials into association lists by choosing an appropriate username, e.g., (ACr, @john123) and (CCr, @john123).

In initialization step, Init-2, the service provider initiates a computing environment managed by the database processor, DBP, and requests the latter to create a session with a first virtual machine, VM1, in which RS is to be executed. (For ease of understanding, the program RS corresponds to the exemplary program CP in FIG. 17C.)

Thus, the session contains a VM, VM1, that runs the computer program RS. We denote this situation as "context is VM1/(RS)" shown in step Init-3.

Note that the service provider may run multiple virtual machines in a session, each of which may run a copy of the RS program to support multiple contemporaneous user requests.

In an alternative embodiment, the program RS may be discovered by the user computing device in a directory and cause it to be injected into the computing environment.

In yet another embodiment, the injection of the computer program RS into the computing environment may be caused by a trigger received by a computer program running on a user computing device, the trigger being available to the user computing device.

It is assumed that RS is pre-provisioned and configured to access the "driver device location update" database.

A user computing device wishing to avail itself of privacy-preserving ride sharing services may request the same from the program RS. Such a request may entail the user computing device to open an account, receive specific service logic, etc. We refer to such operations collectively as the "registration" step shown as Init-4.

Once the registration step is complete, RS invites the user computing device into the session. We may then denote the context as VM1/(RS, UPS) as shown in step Init-5.

It is important to observe that we are assuming the embodiment described above wherein the UPS and RS are in a session and communications between the two are not being intermediated by the SPS.

Step Init-5 concludes the initialization phase. We now proceed with the remaining explanation of the exemplary embodiment.

In step 1, UPS issues a login request to RS using the association list (ACr, @john123). Alternatively, the UPS may respond to a login request received from RS and provide it the ACr and username.

In step 2a, RS requests SPS that the presented credential be verified and receives an affirmation in step 2b. Note that the service provider is assured that the presented credential is authentic but does not know any identity information related to the user, other than the identifier, @john123, which it may use with respect to prior historical data. For example, the service provider may examine its historical data to determine that @john123 prefers certain kinds of music to be played while using the ride sharing service or prefers smart cars with certain capacity. Note, further, that the user utilized the identifier @john to initiate the request but may change this identifier for future requests.

In step 3, UPS requests a ride from RS.
In step 4, RS requests UPS to provide its location.
In step 5a, UPS responds with a data object approximating its location (ALO). RS may verify the accuracy of the ALO using the methods described above; we consider this step to be optional.

In step 5b, the program RS calculates and selects the three (without limitation) closest driver devices to RS, based on the location updates received from the driver devices and the ALO object from UPS. Note further that RS knows the user as @john123 and has access to historical data of @john123 because of the service provider. Thus, its selection of driver devices may be influenced by historical data, e.g., it may modulate its selection of nearby driver devices based on ratings provided by @john123 and other users.

In step 6, the locations of the three selected driver devices is communicated to UPS by RS. In step 6b, since UPS knows its own precise location, it calculates and selects one of the three driver devices, say X. That is, the UPS resolves the ALO and selects device "X" based on the resolution. In step 7a, the UPS communicates its decision to RS.

We continue the above descriptions with respect to FIG. 24B.

In step 7b, the program RS, having received the decision from UPS that the latter has selected driver device "X", invites device "X" into the session and requests device "X" to launch a second virtual machine, VM2 (step 7c).

The session context is now VM1/(RS, UPS, X) as shown in step 7d. The (operating system of) device "X" is running its own virtual machine, VM2.

In step 7e, RS re-directs UPS to device X.

Note that the notion of a program re-directing future requests to another program is well-known in prior art. For example, when a website changes its address, requests incoming to the old address are re-directed to the new address. Note further that such re-direct requests may be discontinued later.

In step 8a, UPS communicates its precise location to driver device X to initiate a pickup request. Note that the user computing device's revelation of its precise location is made to device "X" and not to RS since UPS has been re-directed to device X above in step 7e.

Step 8b shows the processes by which UPS is the subject of pickup and drop off processes by driver device, X. We omit details of these operations since they are specific to the underlying service provider and subject to user interface and customization.

In step 9, device "X" requests UPS for payment. In step 10, UPS presents Credit-card Credential, CCr, and the username @john123 to device "X". In step 11a, device "X" requests the SPS to authenticate CCr and in step 11b receives an affirmatory indication.

In step 12a, device "X" records the payment received from UPS as per the credential CCr using an out-of-band process. Recall that CCr conveys no user information to device "X". It merely provides an assurance that the credential is authentic and that a payment processor may proceed with processing the payment as coming from an unknown source.

In step 12b, device "X" sends a request to UPS to terminate the current dialog. In step 12c, UPS informs RS that "X" may be cleared from the session. In step 12d, RS requests X to clear VM2. In step 13, RS removes "X" from the session.

We continue the above descriptions with respect to FIG. 24C.

After step 13, the current context is "VM1/(RS, UPS)". This is indicated in step 14.

In step 15, program RS informs UPS that the device "X" is no longer in the session. In step 16, UPS informs the program RS that it is finished with its ride sharing request.

In step 17, program RS removes UPS from the session. Note that removing UPS from the session may entail logging out the program UPS.

After step 17, program RS has no other program communicating with it in the current context VM1(RS) and, as per its design, may be configured to await a request from a UPS (step 18).

We observe that step 7b requests driver device "X" to launch a virtual machine. The purpose of this request is to ensure that X's interactions with UPS have an additional level of privacy. However, such an additional level of privacy may be deemed optional in certain embodiments and driver device "X" may not be required to run a virtual machine, i.e., "X" may interact with UPS without such an intervening software layer.

It is instructive to re-consider step 12a above wherein the device "X" utilizes an out-of-band method to process a payment from the user computing device made with a credit card credential. As has been discussed above, the credential is secure and preserves the privacy of the user.

However, avid readers may observe that UPS conveys its precise location to device "X" in step 8a. Device X also knows where @john123 was dropped off. That is, the total knowledge of device X about the user after the above process comprises of the elements: "identifier=@john123", credential CCr, and the pickup and destination locations. The identifier @john123 preserves the user's privacy, as does credential CCr; however, X's knowledge of the pickup and drop off locations may be deemed to be problematic about user privacy. We observe as follows.

First, the device "X" knows that it picked up @john123 from a first location and dropped him at a second location, without knowing the identity of the person.

Second, device "X" acquires user's pickup and drop off location information in a virtual machine, VM2, that is cleared when the device is de-registered, i.e., "X's" knowledge is ephemeral.

Thirdly, the device "X" is removed from the session containing RS and UPS.

Finally, once device "X" has been cleared from the session, the UPS is also cleared from the session. Any information related to the user that may remain with RS comprises only obfuscated objects. Thus, the service provider does not retain any user attribute information provided by the consumer during service provisioning, other than obfuscated identifiers and cryptographic objects that are opaque.

In an alternative embodiment, the program RS, since it runs in a session created by the DBP, may also be removed. Furthermore, the DBP may be asked to tear down the session itself. The DBP may then initiate a new session running a new copy of the computer program RS that accepts new ride sharing requests. Thus, the service provider may not retain any user attribute information.

Illustrative Computing Environment

Aspects of the subject matter described herein may be described in the general context of computer-executable instructions, such as program modules, being executed by a computer. Generally, program modules include routines, programs, objects, components, data structures, and so forth, which perform particular tasks or implement particular abstract data types. Aspects of the subject matter described herein may also be practiced in distributed computing environments where tasks are performed by remote processing devices that are linked through a communications network. In a distributed computing environment, program modules may be located in both local and remote computer storage media including memory storage devices.

Also, it is noted that some embodiments have been described as a process which is depicted as a flow diagram or block diagram. Although each may describe the operations as a sequential process, many of the operations can be performed in parallel or concurrently. In addition, the order of the operations may be rearranged. A process may have additional steps not included in the figure.

The claimed subject matter may be implemented as a method, apparatus, or article of manufacture using standard programming and/or engineering techniques to produce software, firmware, hardware, or any combination thereof to control a computer to implement the disclosed subject matter. For instance, the claimed subject matter may be implemented as a computer-readable storage medium embedded with a computer executable program, which encompasses a computer program accessible from any computer-readable storage device or storage media. For example, computer readable storage media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). However, computer readable storage media do not include transitory forms of storage such as propagating signals, for example. Of course, those skilled in the art will recognize many modifications may be made to this configuration without departing from the scope or spirit of the claimed subject matter.

Moreover, as used in this application, the terms "component," "module," "engine," "system," "apparatus," "interface," or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

The foregoing described embodiments depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediary components. Likewise, any two components so associated can also be viewed as being "operably connected", or "operably coupled", to each other to achieve the desired functionality.

The invention claimed is:

1. A method for facilitating delivery of a product and/or service to a user, comprising:
    causing a first executable computer code to be inserted into a computing environment in which a user session is established, the first executable computer code being associated with an entity that provides the product and/or service;
    establishing a user session in the computing environment;
    in response to the first executable computer code being inserted into the user session, creating a first virtual machine in the user session;
    executing the first executable computer code in the first virtual machine, wherein executing the first executable computer code includes obtaining, over a communications network and from a user computing device of the user, a first proper subset of all information needed from the user computing device that is required to fulfill delivery of the product and/or service, the first proper subset of all the information being less than a complete set of all the information needed from the user computing device that is required to fulfill delivery of the product and/or service, the first proper subset of the information being processed by the first executable computer code, the first executable computer code producing first output data;
    selectively enabling or disabling mediation of the information in the first proper subset of information through an entity that obfuscates user information attributes of the user before the first information is obtained by the first executable computer code;
    terminating the first virtual machine upon completion of executing the first executable computer code;
    obtaining a second executable computer code based at least on a first portion of the first output data produced by the first executable computer code;
    causing the second executable computer code to be inserted into the user session established in the computing environment;
    in response to the second executable computer code being inserted into the user session, creating a second virtual machine in the user session;
    executing the second executable computer code in the second virtual machine, wherein executing the second executable computer code includes obtaining, over the communications network and from the user computing device, a second proper subset of all the information needed from the user computing device that is required to fulfill delivery of the product and/or service, the second proper subset of all the information being less than the complete set of all the information needed from the user computing device that is required to fulfill delivery of the product and/or service and including information not included in the first proper subset of the information, the second proper subset of the information being processed by the second executable computer code, the second executable computer code producing second output data;
    selectively enabling or disabling mediation of the information in the second proper subset of information through the entity that obfuscates user information attributes of the user before the second information is obtained by the second executable computer code;
    terminating the second virtual machine upon completion of executing the second executable computer code; and
    based at least in part on the second output data produced by the second executable computer code, causing the product and/or service to be delivered to the user of the user computing device.

2. The method of claim 1, wherein the user information attributes include an identity of the user.

3. The method of claim 1, wherein the first and/or second proper subset of information includes an authentication credential associated with the user, the authentication credential authenticating the user upon being verified by a verifying entity without disclosing an identity of the user.

4. The method of claim 1, wherein the first and/or second proper subset of information includes a cryptographic credential associated with the user, the cryptographic credential representing user data that is authenticated upon being verified by a verifying entity without disclosing the user data.

5. The method of claim 4, wherein the user data includes biometric data of the user.

6. The method of claim 4, wherein the user data includes user preference data of the user.

7. The method of claim 4, wherein the user data includes credit card information of the user.

8. The method of claim 1, wherein selectively enabling or disabling mediation of the information in the first and second proper subset of information is determined by the user.

9. The method of claim 1, wherein executing the second executable computer code includes executing the second executable computer code using at least a second portion of the first output data produced by the second executable computer code.

10. The method of claim 1, wherein the first portion of the first output data includes an identifier of the second executable computer code.

11. The method of claim 10, wherein at least some of the first output data produced by the first executable computer code is encrypted with an encryption key associated with the user computing device, wherein executing the second computing device includes obtaining the encryption key to decrypt the output data encrypted by the first executable computer code.

12. The method of claim 1, further comprising terminating the user session after causing the product and/or service to be delivered to the user of the user computing device.

13. The method of claim 12, further comprising terminating the user session in response to user action.

14. The method of claim 12, further comprising terminating the user session in response to action of the computing environment.

15. The method of claim 12, wherein terminating the user session includes clearing memory of the user session from the computing environment.

16. The method of claim 1, further comprising storing the first and second proper subsets of the information in a data store included in the user session.

17. A method for performing a transaction over a communications network, comprising:
responsive to a user request received over the communications network, establishing a user session in a computing environment;
executing a plurality of executable computer codes that each perform a portion of the transaction, wherein executing each of the executable computer codes includes obtaining over a communications network and from a user computing device of the user, a different proper subset of all information needed from the user computing device that is required to complete the transaction, each of the proper subsets of all the information being less than a complete set of all the information needed from the user computing device that is required to complete the transaction, each of the executable computer codes processing the respective subset of information that it obtains;
selectively enabling or disabling mediation of the information in the different proper subsets of information through an entity that obfuscates user information attributes of the user before the information is obtained by the executable computer codes;
wherein information is only exchanged between and among the plurality of executable computer codes during execution of each of the executable computer codes by obtaining encrypted output information that was previously output from one of the executable computer codes, the encrypted output information being encrypted such that one or more decryption keys are required from the user in order to decrypt the output information; and
after completing execution of a final one of the executable computer codes necessary to complete the transaction, terminating the user session so that each of the subsets of information no longer exist in the computing environment.

18. The method of claim 17, wherein each of the executable computer codes is executed in a different virtual machine that is terminated after execution is completed and prior to executing a subsequent one of the executable computer codes.

19. The method of claim 10, further comprising monitoring the plurality of executable computer codes to ensure that no individual one of the executable computer code obtains all of the information needed from the user computing device that is required to complete the transaction.

20. The method of claim 12, further comprising alerting the user if any information provided by the user is communicated by any of the executable computer codes in the clear to another executable computer code.

* * * * *